(12) United States Patent
Tago et al.

(10) Patent No.: US 10,545,961 B2
(45) Date of Patent: Jan. 28, 2020

(54) DATA PROCESSING METHOD, APPARATUS AND PROGRAM FOR PROCESSING DATA IDENTIFIED IN VARIABLE RANGE

(71) Applicant: FUJITSU LIMITED, Kawasaki-shi, Kanagawa (JP)

(72) Inventors: Shinichiro Tago, Shinagawa (JP); Takashi Katoh, Yokohama (JP); Tatsuya Asai, Kawasaki (JP); Hiroya Inakoshi, Tama (JP); Masataka Matsuura, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 509 days.

(21) Appl. No.: 15/009,032

(22) Filed: Jan. 28, 2016

(65) Prior Publication Data
US 2016/0292202 A1 Oct. 6, 2016

(30) Foreign Application Priority Data

Mar. 30, 2015 (JP) .................................. 2015-068640

(51) Int. Cl.
| | | |
|---|---|---|
| G06F 16/00 | (2019.01) | |
| G06F 16/2455 | (2019.01) | |
| G06F 16/21 | (2019.01) | |
| G06F 16/22 | (2019.01) | |

(52) U.S. Cl.
CPC .......... *G06F 16/2455* (2019.01); *G06F 16/21* (2019.01); *G06F 16/2272* (2019.01)

(58) Field of Classification Search
None
See application file for complete search history.

(56) References Cited

U.S. PATENT DOCUMENTS

| | | | |
|---|---|---|---|
| 2007/0112724 A1* | 5/2007 | Beach | ............... G06F 17/30286 |
| 2009/0216727 A1* | 8/2009 | Dozoretz | .......... G06F 17/30035 |
| 2012/0271845 A1* | 10/2012 | Netz | ..................... G06F 16/244 |
| | | | 707/769 |

FOREIGN PATENT DOCUMENTS

| | | |
|---|---|---|
| JP | H6-114174 | 4/1994 |
| JP | 2000-331104 | 11/2000 |
| JP | 2008-171250 | 7/2008 |

OTHER PUBLICATIONS

"Dynamic Name Range", https://www.excel-easy.com/examples/dynamic-named-range.html, all pages. (Year: 2013).*

(Continued)

*Primary Examiner* — Son T Hoang
(74) *Attorney, Agent, or Firm* — Staas & Halsey LLP

(57) ABSTRACT

A data processing method includes steps of; allowing establishment of a first flag or a second flag for each of a plurality of items where corresponding values are inputted sequentially; upon detecting that a value associated with an item where the first flag is established in an Nth place is inputted and that a value associated with an item where the second flag is established in an Mth place (M is equal to or larger than N) is inputted, executing a predetermined processing to values in a range from the value that is inputted by associating with the item where the first flag is established in the Nth place to the value that is inputted by associating with the item where the second flag is established in the Mth place; and executing a processing of outputting a processed result in order from the item in the Nth place.

9 Claims, 40 Drawing Sheets

(56) References Cited

OTHER PUBLICATIONS

N. Yugami et al., "Advanced Analytics of Big Data for Convergence Abstract Services", Fujitsu, vol. 64, No. 1, pp. 52-58, Jan. 2013.
Japanese Office Action dated Jan. 15, 2019 from Japanese Patent Application No. 2015-068640, 7 pages.

* cited by examiner

| | T4 | |
|---|---|---|
| DATE | SALES | |
| 1/1 | 100 | } W13 |
| 1/2 | 200 | |
| 1/3 | 100 | } W14 |
| 1/4 | 130 | |
| 1/5 | 200 | |

| DATE | SALES | START | END |
|------|-------|-------|-----|
| 1/1  | 100   | 1     | 0   |
| 1/2  | 200   | 0     | 1   |
| 1/3  | 100   | 0     | 0   |
| 1/4  | 130   | 0     | 0   |
| 1/5  | 200   | 1     | 0   |
| 1/6  | 220   | 1     | 1   |
| 1/7  | 150   | 0     | 1   |
| 1/8  | 220   | 1     | 1   |

| DATE | SALES | START | END |
|------|-------|-------|-----|
| 1/1  | 100   | 1     | 0   |
| 1/2  | 200   | 0     | 1   |
| 1/3  | 100   | 2     | 1   |
| 1/4  | 130   | 1     | 2   |
| 1/5  | 200   | 2     | 0   |
| 1/6  | 220   | 0     | 1   |
| 1/7  | 150   | 1     | 1   |
| 1/8  | 220   | 0     | 1   |

| DATE | SALES | START | END |
|------|-------|-------|-----|
| 1/1  | 100   | 5     | 0   |
| 1/2  | 200   | 0     | 1   |
| 1/3  | 100   | 0     | 1   |
| 1/4  | 130   | 0     | 0   |
| 1/5  | 200   | 0     | 1   |
| 1/6  | 220   | 0     | 1   |
| 1/7  | 150   | 0     | 1   |
| 1/8  | 220   | 0     |     |

| DATE | SALES | START | END |
|------|-------|-------|-----|
| 1/1  | 100   | −1    | 0   |
| 1/2  | 200   | 0     | 1   |
| 1/3  | 100   | 0     | 1   |
| 1/4  | 130   | 0     | 0   |
| 1/5  | 200   | 0     | 1   |
| 1/6  | 220   | 0     | 1   |
| 1/7  | 150   | 0     | 1   |
| 1/8  | 220   | 0     | 1   |

| DATE | SALES | SPECIAL | START | END |
|------|-------|---------|-------|-----|
| 1/1  | 100   | 0       | -1    | 0   |
| 1/2  | 200   | 0       | 0     | 1   |
| 1/3  | 100   | 0       | 0     | 1   |
| 1/4  | 130   | 0       | 0     | 0   |
| 1/5  | 200   | 0       | 0     | 1   |
| 1/6  | 220   | 1       | 1     | 0   |
| 1/7  | 150   | 0       | 1     | 1   |
| 1/8  | 220   | 0       | 0     | 1   |

| DATE | SALES | SPECIAL | START | END |
|------|-------|---------|-------|-----|
| 1/1  | 100   | 0       | -1    | 1   |
| 1/2  | 200   | 0       | 0     | 1   |
| 1/3  | 100   | 0       | 0     | 1   |
| ...  |       |         |       |     |
| 1/31 | 200   | 0       | 0     | 1   |
| 2/1  | 220   | 1       | -1    | 1   |
| 2/2  | 150   | 0       | 0     | 1   |
| 2/3  | 220   | 0       | 0     | 1   |

W1001, W1003, W1031, W1002, W2001, W2003, W2002

DATA PROCESSING METHOD, APPARATUS AND PROGRAM FOR PROCESSING DATA IDENTIFIED IN VARIABLE RANGE

CROSS-REFERENCE TO RELATED APPLICATION

This application is based upon and claims the benefit of priority of the prior Japanese Patent Application No. 2015-068640, filed on Mar. 30, 2015, the entire contents of which are incorporated herein by reference.

FIELD

The embodiments discussed herein are related to a data processing method, a data processing apparatus, and a data processing program.

BACKGROUND

A processing apparatus configured to execute data processing to a plurality of records in accordance with a query has been proposed. Each record includes data corresponding to each of a plurality of attributes.

The record is, for example, a record including the sales of a store, and the sales record includes the date as a first attribute and the sales of the date (such as sales proceeds and sales quantity) as a second attribute. For example, a first record includes the sales "1 million" yen of January 1st, and a second record includes the sales of "2 million" yen of January 2nd.

The query includes, for example, identification information for identifying the range of processing target records and processing information indicating the content of data processing. The range of processing target records may be referred to as the range of processing target data.

The processing apparatus inputs records and stores the records into a memory thereof. The processing apparatus then identifies the range of processing target records among a plurality of records stored in the memory based on identification information of the inputted query. Then, the processing apparatus executes data processing to data of the identified record (in a processing target data range) based on processing information of the inputted query. The processing apparatus deletes records within the identified range from the memory after execution of data processing in order to improve utilization efficiency of the memory, for example. Related techniques are disclosed in, for example, Japanese Laid-open Patent Publication Nos. 2000-331104 and 2008-171250.

The user of the processing apparatus sometimes requests the processing apparatus to execute a new query. Assume that the new query includes a request to execute a predetermined processing to data of a plurality of records deleted from the memory. That is, assume that data of the processing target record is data of the record deleted from the memory. The processing apparatus changes the range of the processing target data by executing the new query. Since the processing target record has been deleted from the memory, the processing apparatus has to again input the record deleted from the memory before executing the new query.

However, when inputting a record once inputted again, the processing apparatus has to execute various processings such as a processing of searching the record to be inputted again and a processing of inputting the searched record. This causes disadvantages such as increase of the processing load and prolonged processing time. In light of such disadvantages, inputting the record again is not practical.

As described above, when a new query is inputted after execution of data processing, it is difficult for the processing apparatus to execute the query by changing the range of the processing target data.

According to an aspect of the embodiments discussed herein, it is an object of the present disclosure to enable execution of a new query by changing the range of the processing target data even after execution of data processing.

SUMMARY

According to an aspect of the invention, a data processing method includes steps of; allowing establishment of a first flag or a second flag for each of a plurality of items where corresponding values are inputted sequentially; upon detecting that a value associated with an item where the first flag is established in an Nth place is inputted and that a value associated with an item where the second flag is established in an Mth place (M is equal to or larger than N) is inputted, executing a predetermined processing to values in a range from the value that is inputted by associating with the item where the first flag is established in the Nth place to the value that is inputted by associating with the item where the second flag is established in the Mth place; and executing a processing of outputting a processed result in order from the item in the Nth place.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a first illustrating data processing according to the present embodiment;

FIG. 9 is a second illustrating data processing according to the present embodiment;

FIG. 10 is a third illustrating data processing according to the present embodiment;

FIG. 11 is a fourth illustrating data processing according to the present embodiment;

FIG. 12 is a fifth illustrating data processing according to the present embodiment;

FIG. 13 is a sixth illustrating data processing according to the present embodiment;

DESCRIPTION OF EMBODIMENTS

[Query and Processing Target Data Range]

Figure 1:
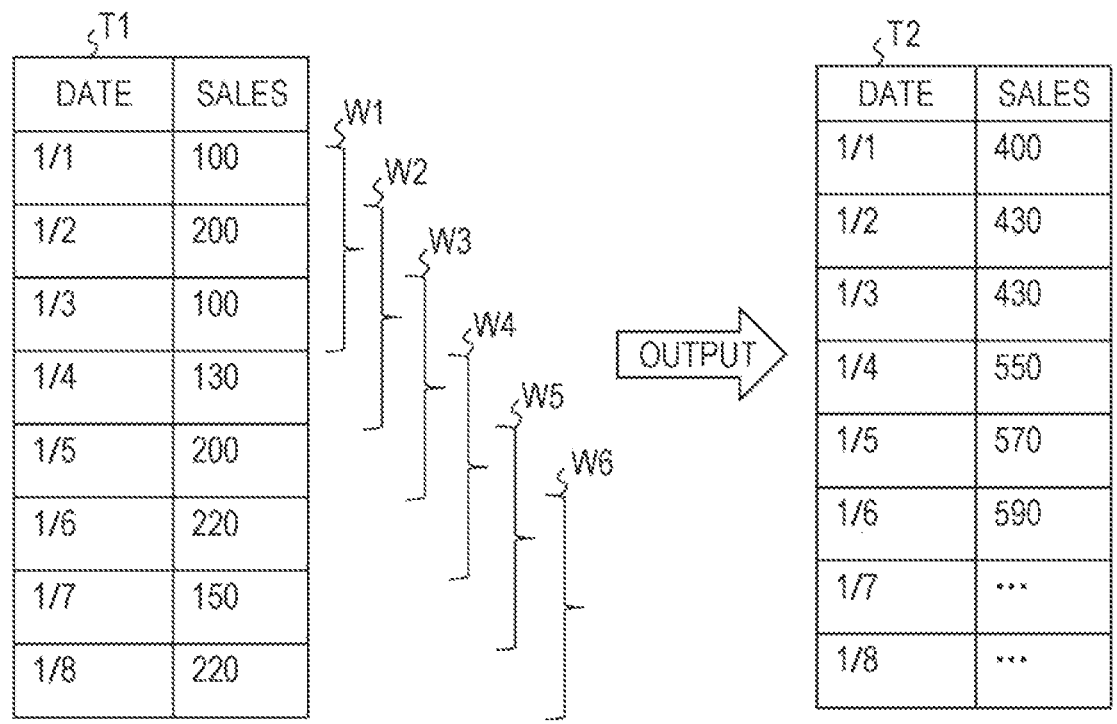
FIG. 1 is a first illustrating a query and a processing target data range.
Figure 2:
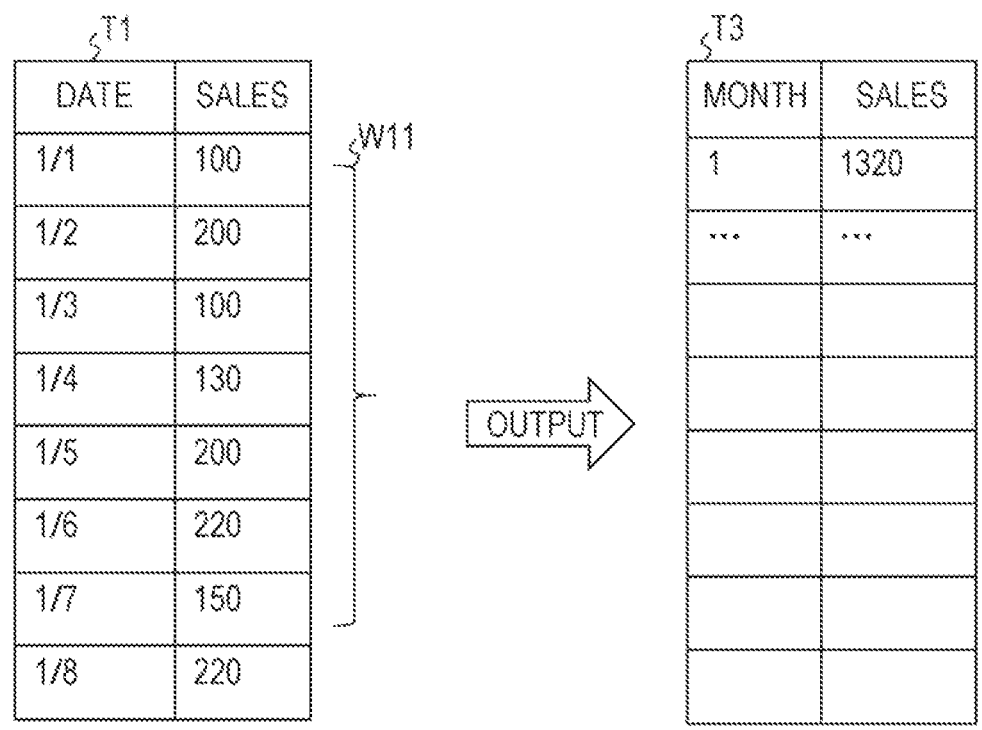
FIG. 2 is a second illustrating a query and a processing target data range.

FIGS. 1 and 2 are first and second diagrams illustrating a query and a processing target data range. In the following description of drawings, the same element is assigned with the same reference numeral, and thereby description of the once described element is omitted.

Processing target data range is described with reference to FIG. 1. The processing apparatus executing data processing inputs records sequentially. Table T1 of FIG. 1 illustrates records inputted by the processing apparatus in a table format. The processing apparatus stores the input record into a memory thereof.

Table T1 stores one record in each of second and subsequent lines. Date field of the table T1 stores date of the record. Sales field of the table T1 stores sales (referred to as sales as appropriate) of the record. Unit of the sales is, for example, in 10,000 yen. In the diagram, "---" indicates that the content in the field is omitted.

Assume that a first query for calculating the total sales for three days while sliding day by day is inputted to the processing apparatus. The first query is, for example, a query described with "SELECT FIRST_VALUE (date), sum (sales) RANGE 3 DAYS, SLIDE 1 DAY FROM data".

In the example of FIG. 1, the processing apparatus calculates the total amount of sales from pth day of January to (p+2)th day of January while sliding day by day (lower-case letter "p" is an integer equal to or larger than 1 and equal to or smaller than 29). Then, the processing apparatus outputs the calculation result.

Sales from pth day of January to (p+2)th day of January is the processing target data range (hereinafter referred to as first data range as appropriate). Hereinafter, pth day of January is referred to as first day of the first data range, and (p+2)th day of January is referred to as last day of the first data range. Also, hereinafter, pth day of January is referred to as "1/p" as appropriate.

Table T2 illustrates a calculation result in a table format. Table T2 stores the calculation result in each of second and subsequent lines. Date field of the table T2 stores the first day of the first data range. Total sales field of the table T2 stores the total sales in the first data range.

In FIG. 1, a reference numeral Wp represents a window indicating the first data range. However, to simplify description, only windows W1 to W6 are illustrated in FIG. 1. A window indicates start and end of the data processing range. For example, the window W1 is a window for calculating the total sales between January 1st and January 3rd.

The processing apparatus calculates, for example, the sum of sales between January 1st and January 3rd (400=100+200+100) (see a second line of table T2). Next, the processing apparatus calculates the sum of sales between January 2nd and January 4th (430=200+100+130) (see a third line of table T2). The window W2 is a window for calculating the total sales from January 2nd to January 4th.

Thereafter, the processing apparatus performs the above-mentioned data processing. When a record of data processing target may be discarded, the processing apparatus deletes the record to improve memory utilization efficiency. For example, upon completing calculation of the total sales between January 2nd and January 4th, the processing apparatus deletes the sales record of January 2nd (record in the second line of Table T1) from the memory therein.

In data processing, sliding the window as illustrated in FIG. 1 is called slide window.

Next, processing target data range is described with reference to FIG. 2. The processing apparatus executing data processing inputs records sequentially as described with reference to FIG. 1. The table T1 of FIG. 2 and the table T1 of FIG. 1 are the same table.

A second query for calculating the total sales between the first day and the seventh day for each month is inputted into the processing apparatus. The second query is, for example, a query described with "SELECT FIRST_VALUE (month), sum (sales) RANGE 7 DAYS SLIDE 1 MONTH FROM data".

In the example of FIG. 2, the processing apparatus calculates the total sales between January 1st and January 7th, and outputs calculation results.

Sales from January 1st to January 7th is the processing target data range (hereinafter referred to as second data range as appropriate). Hereinafter, January 1st is referred to as a first day of the second data range, and January 7th is referred to as a last day of the second data range. Table T3 illustrates calculation results in a table format. Table T3 stores the calculation result in each of second and subsequent lines. Month field of the table T3 stores the month of first day in the second data range. Total sales field of the table T3 stores the total sales of the second data range.

In FIG. 2, a reference numeral W11 represents a window indicating the second data range. For example, the window W11 is an window for calculating the total sales of the sales of January 1st to the sales of January 7th. The processing apparatus calculates, for example, the sum of sales of the sales of January 1st to the sales of January 7th (see second line of table T2).

In data processing, the window with start condition and end condition designated as described with reference to FIG. 2 is called a logic window. In the example of FIG. 2, the start condition is the sales of January 1st (first day), and the end condition is the sales of January 7th.

In addition to the above windows, there are various other windows in data processing, such as, for example, a time window with the window range and slide width designated by time, and a tuple window with the window range and slide width designated by the number of records.

[Change of Query]

Figures 3, 4:
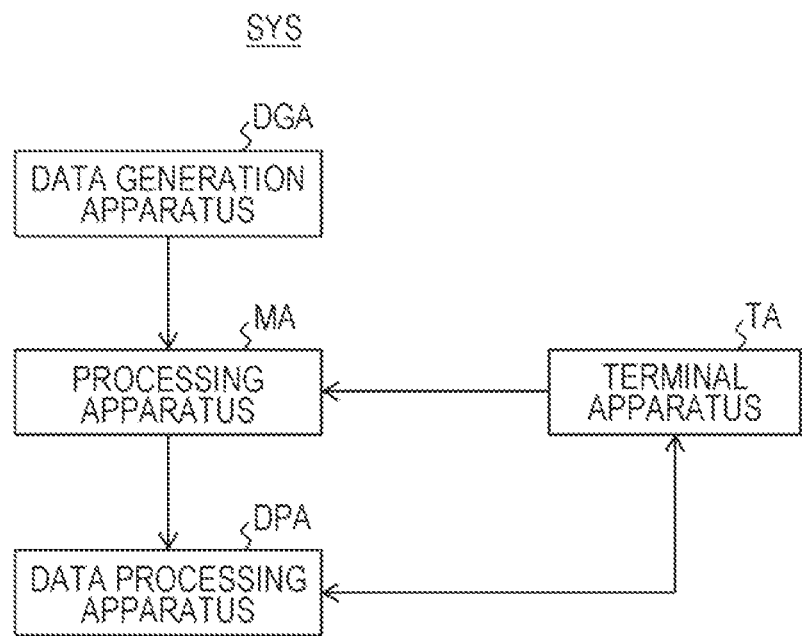
FIG. 3 illustrates a case where a new query is not executable.
FIG. 4 is a configuration diagram of an information processing system SYS including a data processing apparatus according to the present embodiment.

As described above, when the data processing target record may be discarded after completion of data processing, the processing apparatus deletes the record to improve memory utilization efficiency. When the record deletion is performed, there may be a case where a new query is not executable. Execution of the new query may be also referred to as execution of a changed query. FIG. 3 illustrates a case where the new query is not executable.

Table T4 of FIG. 3 illustrates records inputted by the processing apparatus in a table format. The table T4 has the same configuration as the table T1 of FIG. 1. A third query for calculating the total sales of the sales of January 1 to the sales of January 4 is inputted into the processing apparatus. The processing apparatus stores records of January 1 to January 5 into the memory sequentially.

In FIG. 3, a reference numeral W13 represents a window indicating the third data range. Specifically, the window W13 illustrates a window for calculating the total sales of the sales of January 1st to the sales of January 4th.

The processing apparatus calculates the total sales of the sales of January 1st (first day) to January 4th and outputs calculation results. Then, the processing apparatus deletes records of January 1 to January 4 from the memory.

Here, assume that after the record of January 4 has been deleted from the memory, a fourth query for calculating the total sales of the sales of January 3 to the sales of January 5 is inputted into the processing apparatus. In this assumption, when the fourth query is inputted, records of January 1 to January 4 have been deleted from the memory. Therefore, the processing apparatus is unable to calculate the total sales of records (record of January 3 to record of January 5) in the range indicated by the reference numeral W14.

That is, when a new query is inputted (when the query is changed) after starting execution of data processing, it may be difficult to establish a new window (reference numeral W14) while holding the state of the window (see reference numeral W13) prior to the change.

In other words, after starting execution of data processing, the inputted new query is executed. Therefore, it may be difficult to change the processing target data range. Since the processing apparatus executes the inputted new query, it may be difficult to establish a plurality of windows in one or more records so as to overlap each other. In view of the foregoing problem, an aspect of the embodiments provides a data processing system capable of changing the processing target data range even after execution of data processing has been started.

As described above, when the processing apparatus executes a new query, a record deleted from the memory may be inputted again. In other words, entire data processing system may be reset. An example of the resetting comprises rewriting the program for executing data processing in the processing apparatus so as to enable execution of the new query, and inputting records again. However, as described above, it is not practical to input records again. Further, the rewriting of the program is not practical considering the number of rewriting steps.

[System Configuration Diagram]

FIG. 4 is a configuration diagram of an information processing system SYS including a data processing apparatus according to the embodiments discussed herein. The information processing system SYS includes a data generation apparatus DGA, a processing apparatus MA, a data processing apparatus DPA, and a terminal apparatus TA.

The data generation apparatus DGA generates various data such as the record and outputs to the processing apparatus MA. The record includes, for example, an inventory management record, a sales management record, and an event monitoring record. Event monitoring includes monitoring of events related to, for example, natural phenomena such as rainfall and atmospheric temperature. An example of the event monitoring record is a rainfall sum-up record.

The processing apparatus MA inputs various records outputted from the data generation apparatus DGA, and inputs window information into each of the inputted a plurality of records. Inputting window information into the record may be also referred to as embedding of window information into the record. Window information includes information indicating start and end of the data processing range.

Window information may be automatically embedded into the record by a dedicated program. Also, window information may be manually embedded into the record via a record processing program by the user requesting execution of data processing. The user embeds window information into the record so as to match a desired data processing range.

The processing apparatus MA outputs the record including window information to the data processing apparatus DPA.

The data processing apparatus DPA inputs a record including window information, and based on a query inputted from the terminal apparatus TA, executes data processing of a processing target record included in the inputted record. Then, the data processing apparatus DPA outputs processing result to the terminal apparatus TA. Data processing is utilized for event monitoring, Business Integrate (BI), and stream processing.

The terminal apparatus TA is an apparatus configured to operate the processing apparatus MA and the data processing apparatus DPA.

[Data Processing Apparatus DPA]

Figure 5:
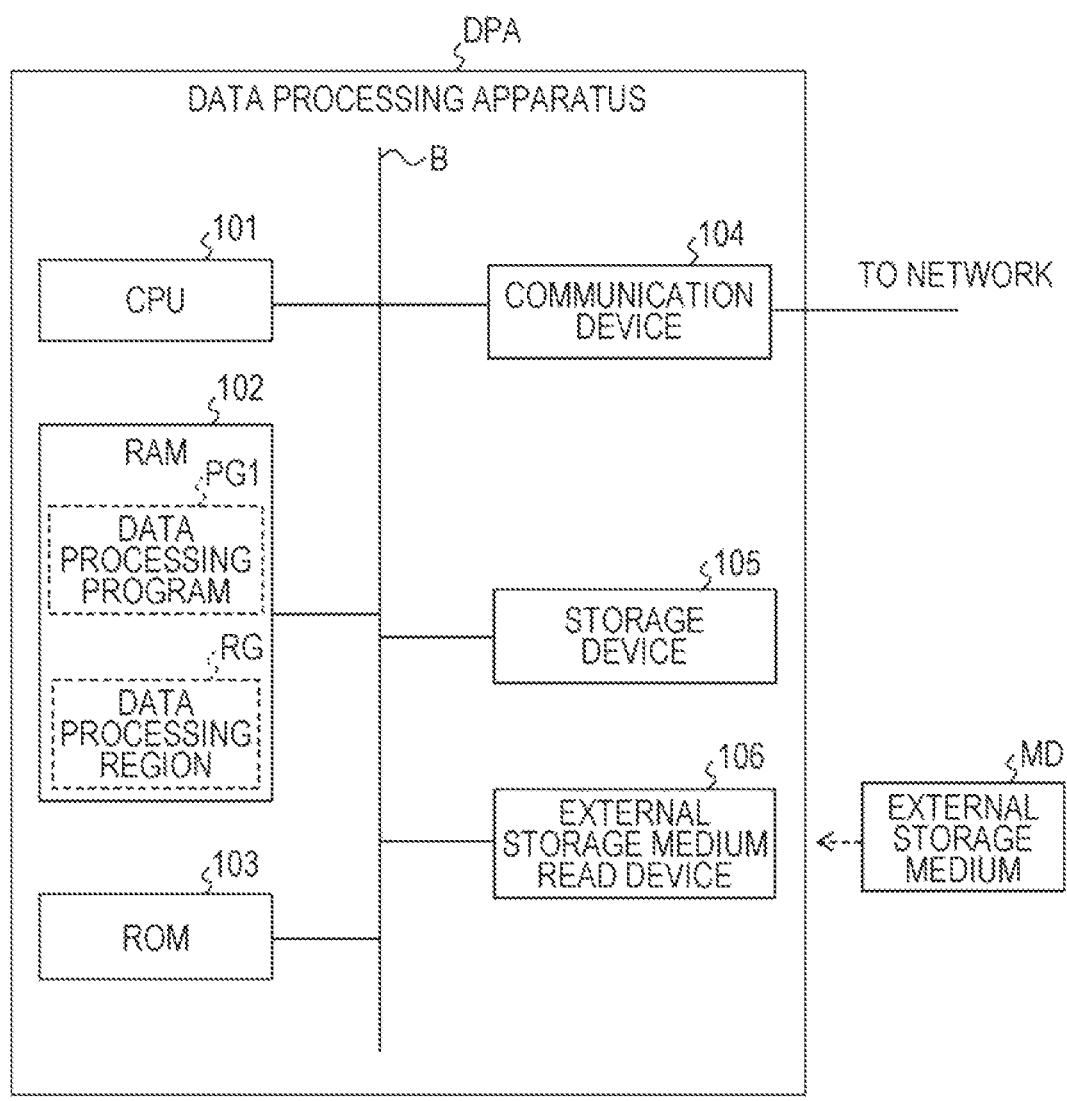
FIG. 5 is a hardware block diagram of the data processing apparatus DPA of FIG. 4.

The data processing apparatus DPA of FIG. 4 is described with reference to FIGS. 5 and 6. FIG. 5 is a hardware block diagram of the data processing apparatus DPA of FIG. 4.

The data processing apparatus DPA includes a CPU 101, a RAM 102, a ROM 103, a communication device 104, a storage device 105, and an external storage medium read device 106, all of which are connected to a bus B. CPU is an abbreviation for "central processing unit", RAM is an abbreviation for "random access memory", and ROM is an abbreviation for "read only memory".

The CPU 101 is a central processing unit configured to control the entire data processing apparatus DPA. The RAM 102 is a storage device configured to temporarily store data generated (calculated) in steps executed by the CPU 101 and in processings executed by the data processing program PG1. The data processing program PG1 is a program configured to execute data processing to the inputted record. The RAM 102 is an example of a storage device storing the record. The RAM 102 includes a data processing region RG configured to store various data related to data processing. The RAM 102 is a semiconductor memory such as, for example, a dynamic random access memory (DRAM).

The ROM 103 is configured to store various data. The communication device 104 is a device configured to connect with a network such as, for example, a local area network (LAN). The communication device 104 communicates the processing apparatus MA and the terminal apparatus TA of FIG. 4. The communication device 104 includes, for example, a network interface card (NIC).

The storage device 105 is a data storage device such as, for example, a hard disk drive, a solid state drive, and a nonvolatile semiconductor memory.

The external storage medium read device 106 is a device configured to read data stored in an external storage medium MD. The external storage medium MD is a nonvolatile storage medium, which is, for example, a portable storage device such as, for example, a compact disc read only memory (CD-ROM) and a digital versatile disc (DVD).

An execution file of the data processing program PG1 is stored in the storage device 105. The CPU 101 is configured to read the execution file of the data processing program PG1 from the storage device 105 when the data processing apparatus DPA is activated, and develop into the RAM 102. The execution file of the data processing program PG1 may be stored in the external storage medium MD. The CPU 101 is configured to read the execution file of the data processing program PG1 from the external storage medium MD when the data processing apparatus DPA is activated, and develop into the RAM 102.

Figure 6:
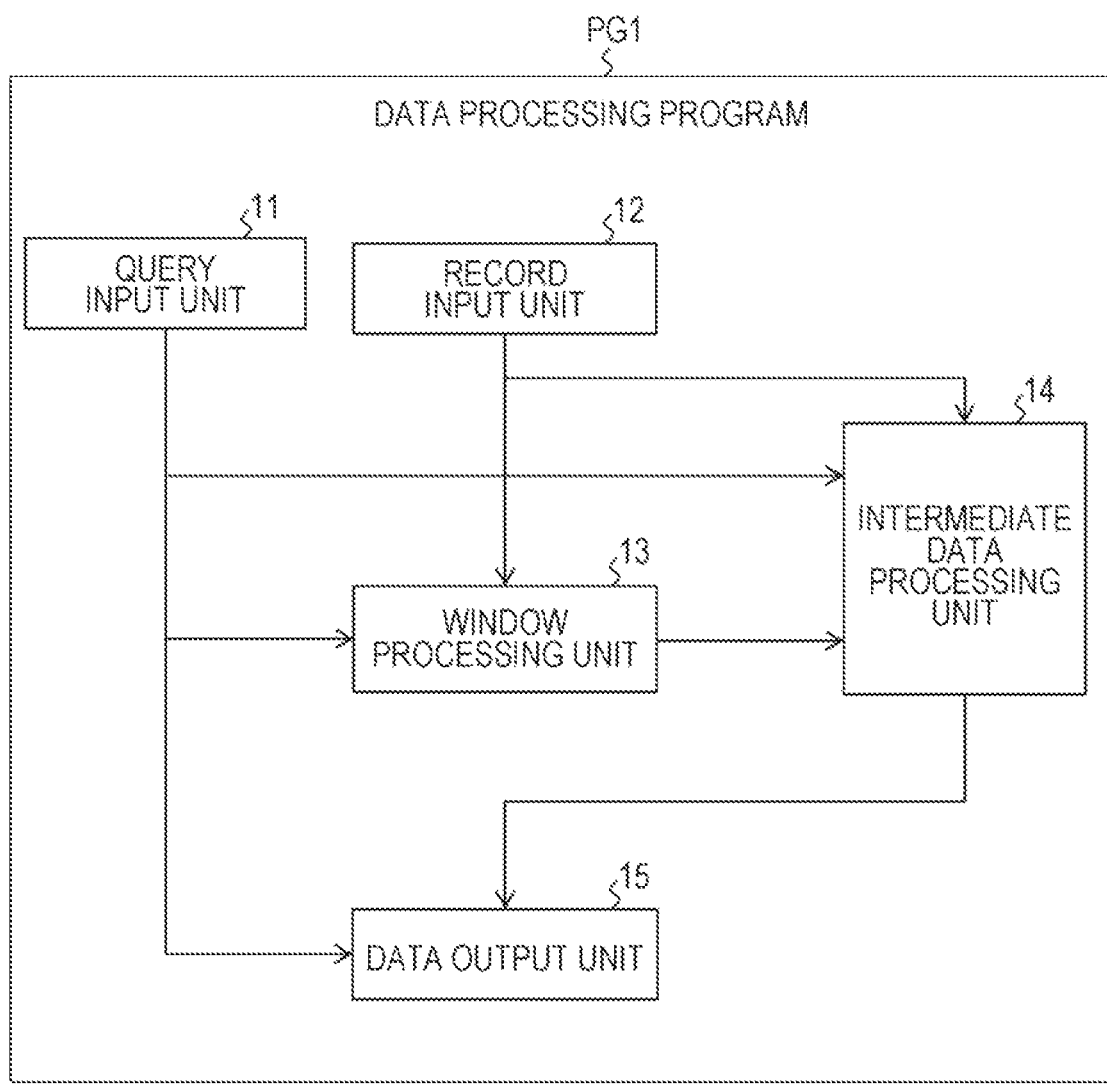
FIG. 6 is a software block diagram of the data processing apparatus DPA of FIG. 4.

FIG. 6 is a software block diagram of the data processing apparatus DPA of FIG. 4. The data processing program PG1 includes a query input unit 11, a record input unit 12, a window processing unit 13, an intermediate data processing unit 14, and a data output unit 15.

The query input unit 11 is configured to input a query outputted from the terminal apparatus TA of FIG. 4, and output to the window processing unit 13, the intermediate data processing unit 14, and the data output unit 15.

The record input unit 12 is configured to input the record outputted from the processing apparatus MA of FIG. 4, and output to the window processing unit 13 and the intermediate data processing unit 14.

The window processing unit 13 is configured to establish a window in the inputted record based on the window information. The intermediate data processing unit 14 is configured to execute, based on the inputted query, data processing to the record where the window is established, and output the processing result to the data output unit 15. The data output unit 15 outputs the processing result to the terminal apparatus TA.

[Processing Apparatus MA]

Figure 7:
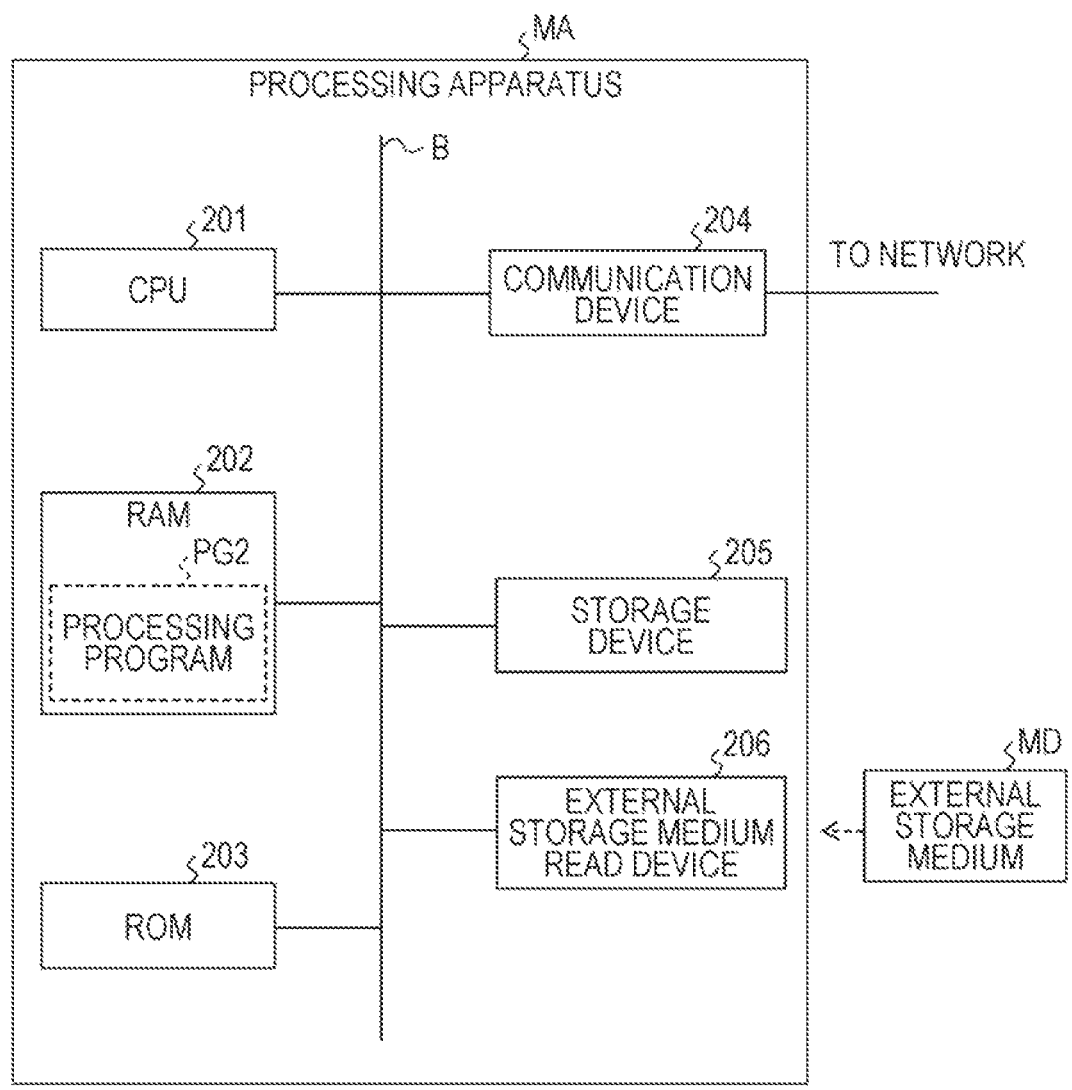
FIG. 7 is a hardware block diagram of the processing apparatus MA of FIG. 4.

FIG. 7 is a hardware block diagram of the processing apparatus MA of FIG. 4. The processing apparatus MA includes a CPU 201, a RAM 202, a ROM 203, a communication device 204, a storage device 205, and an external storage medium read device 206, all of which are connected to a bus B.

The CPU 201 is a central processing unit configured to control the entire processing apparatus MA. The RAM 202 is a storage device configured to temporarily store data generated (calculated) in processings executed by the CPU 201 and in steps executed by the processing program PG2. The RAM 202 is a semiconductor memory such as, for example, a DRAM.

The processing program PG2 is a program configured to process the record outputted from the data generation apparatus DGA. Specifically, the program enables establishment of a first flag and/or establishment of a second flag for each of a plurality of items (for example, records) into which a corresponding value (or may be referred to as data) is inputted sequentially. The processing program PG2 is an example of a dedicated program for embedding window information into the record. The processing program PG2 outputs the processed record to the data processing apparatus DPA. The processing program PG2 is also referred to as a flag generation unit.

The ROM 203 is configured to store various data. The communication device 204 is a device configured to connect with a network such as, for example, LAN. The communication device 204 communicates with the data generation apparatus DGA, the terminal apparatus TA, and the data processing apparatus DPA, as illustrated in FIG. 4. The communication device 204 includes, for example, a network interface card.

The storage device 205 is a data storage device such as, for example, a hard disk drive, a solid state drive, and a nonvolatile semiconductor memory.

The external storage medium read device 206 is a device configured to read data stored in an external storage medium MD.

The execution file of the processing program PG2 is stored in the storage device 205. The CPU 201 is configured to read the execution file of the processing program PG2 from the storage device 205 when the processing apparatus MA is activated, and develop into the RAM 202. The execution file of the processing program PG2 may be stored in the external storage medium MD. The CPU 201 is configured to read the execution file of the processing program PG2 from the external storage medium MD when the processing apparatus MA is activated, and develop into the RAM 202.

[Data Processing]

FIGS. 8 to 15 are first to eighth diagrams for illustrating data processing in this embodiment. First data processing is described with reference to FIG. 8.

[First Data Processing]

Table T11 of FIG. 8 illustrates records inputted by the record input unit 12 in a table format. The record includes date as a first attribute, sales as a second attribute, start information indicating start of the window as a third attribute, and end information indicating the end of the window as a fourth attribute. Start information is information indicating a start of the data processing range. End information is information indicating an end of the data processing range. That is, the window information described with reference to FIG. 4 includes start information and end information.

The data generation apparatus DGA of FIG. 4 outputs a record including date as the first attribute and sales as the second attribute to the processing apparatus MA of FIG. 4. The processing program PG2 (see FIG. 7) of the processing apparatus MA receives the record outputted from the data generation apparatus DGA, and embeds start information and end information into the received record, as described with reference to FIG. 4. The processing program PG2 of the processing apparatus MA outputs the record to the data processing apparatus DPA.

The record input unit 12 of the data processing apparatus DPA inputs the record outputted from the processing apparatus MA and stores into the RAM 102 in the table format illustrated in FIG. 8. The solid line arrow of FIG. 8 indicates that records are inputted sequentially.

Every time one record is inputted, the data processing apparatus DPA executes window establishment processing and data processing described later based on start information and end information.

Table T11 stores one record in each of second and subsequent lines. Date field of the table T11 stores date of the record. Sales field of the table T11 stores sales of the record. Start field of the table T11 stores start information of the record. End field of the table T11 stores end information of the record.

The numeric value in the start field of the table is a start flag. The start flag of a numeric value equal to or larger than 1 or −1 described later is a flag indicating start of the window. The start flag of "0" is a flag not indicating start of the window.

The numeric value in the end field of the table is an end flag. The end flag of a numeric value equal to or larger than 1 or −1 described later is a flag indicating the end of a window. The end flag of "0" is a flag not indicating end of the window.

The dotted arrow of FIG. 8 represents a start flag indicating start of the window and a corresponding end flag indicating end of the window (in other words, an end flag paired with the start flag). The record including the start flag indicated by the arrow is a start point of the window. The record including the end flag indicated by the arrow is an end point of the window.

The window processing unit 13 detects that the value (or data) of the record where a first flag is established in an Nth place is inputted and data associated with a record where a second flag is established in an Mth place is inputted. In other words, the window processing unit 13 detects that a value (or data) associated with a record where the first flag is established in the Nth place is inputted and a value (or data) associated with a record where the second flag is established in the Mth place is inputted. The uppercase letter N is an integer equal to or larger than 1, and the uppercase letter M is an integer equal to or larger than N. The value (data) associated with the record means data included in the record.

The first flag is a flag indicating start of the range of records to be subjected to a predetermined processing. The second flag is a flag corresponding to the first flag and indicating end of the range. Here, the first flag and the second flag are information indicating the number of the ranges. Information indicating the range is, for example, a numeric value.

The first flag is, for example, a record start flag "1". The second flag is, for example, a record end flag "1".

The intermediate data processing unit 14 executes a predetermined processing to data in a range from data which is inputted by associating with a record where the first flag is established in the Nth place to data which is inputted by associating with a record where the second flag is established in the Mth place. Data inputted by associating with the record means data included in the inputted record.

The predetermined processing is a processing based on the processing information of the query. The predetermined processing is, for example, a processing of calculating an average value of the sales included in the record, and a processing for calculating the sum of the sales included in the record. Further, the predetermined processing includes various processings such as a complicated set operation.

In the example of FIG. 8, the start flag and the end flag of the record of January 1 are "1" and "0" respectively. The start flag and the end flag of the record of January 2 are "0" and "1" respectively.

The window processing unit 13 detects that the following first data and second data have been inputted. The first data is data (sales "100") associated with the record of January 1 where the first flag (start flag "1") is established in the Nth place (N is 1). The second data is data (sales "200") associated with the record of January 2 where the second flag (end flag is "1") is established in the Mth place (M is 2).

Then, the intermediate data processing unit 14 executes a predetermined processing (for example, calculating an average value of the sales) to data in the range from the first data to the second data. The data output unit 15 executes a processing of outputting the output result (for example, sales "150") in order from a record in the Nth place (N is 1).

As described above, the record input unit 12 sequentially inputs a plurality of records including processing target data and the first flag and the second flag indicating the range of processing target. The first and second flags are flags indicating the range of processing target.

Then, the window processing unit 13 detects input of the first record including the first flag, and further detects input of the second record including the second flag. When this detection is executed, the intermediate data processing unit 14 executes a predetermined processing to data in the range from processing target data of the first record to processing target data of the second record. Then, the data output unit 15 outputs processing result.

The above processing is described specifically below. The window processing unit 13 establishes a window W21 for the record of January 1 and the record of January 2. Based on the processing information of the query, the intermediate data processing unit 14 executes data processing to the two records where the window W21 is established. The data processing is, for example, to calculate an average value of the sales included in the records where the window is established.

The start flag and the end flag of the records of January 3 and January 4 are "0" and "0" respectively. Therefore, the window processing unit 13 does not establish a window for the records of January 3 and January 4.

The start flag and the end flag of the record of January 5 are "1" and "0" respectively. The start flag and the end flag of the record of January 6 are "1" and "1" respectively. Therefore, the window processing unit 13 establishes a window W22 for the record of January 5 and the record of January 6. Based on the processing information of the query, the intermediate data processing unit 14 executes data processing to two records where the window W22 is established. In the below description, the intermediate data processing unit 14 also executes data processing to the record where a window is established.

The start flag and the end flag of the record of January 6 are "1" and "1" respectively. The start flag and the end flag of the record of January 7 are "0" and "1" respectively. Therefore, the window processing unit 13 establishes a window W23 for the record of January 6 and the record of January 7.

The start flag and the end flag of the record of January 8 are "1" and "1" respectively. Therefore, the window processing unit 13 establishes a window W24 for the record of January 8.

The window establishment method described with reference to FIG. 8 dynamically establishes the window in a manner allowing a change as desired based on the start flag and the end flag of the record. Therefore, the data range of data processing may be dynamically changed during execution of data processing. As a result, the query may be executed even when a new query is inputted, and thereby data processing desired by the user is possible.

For example, assume a case where a fifth query for calculating the sum of the sales included in the record of January 5 and the sales included in the record of January 6 is executed. Here, the window W22 and the window W23 are established one over another for the record of January 6. Thus, the record of January 6 is not deleted until processing of the records of January 6 and January 7 is executed.

Thus, this query is executable even when a sixth query for calculating the sum of the sales included in the record of January 6 and the sales included in the record of January 7 is inputted. That is, even after data processing of the fifth query has started, the processing target data range may be dynamically changed.

In addition, for example, assume a case where monitoring of fluctuation of the sales is desired. In this assumption, the user establishes a start flag "1" to the start flag of the starting record for starting monitoring of the fluctuation and establishes an end flag "0" to the end flag of the starting record. Then, the user establishes an end flag "1" to the end flag of the ending record ending monitoring of the fluctuation ends, and establishes a start flag "0" to the start flag of the ending record. Further, the user establishes "0" to the start flag and the end flag of each of records between the starting record and the ending record.

With the flags established as above, the intermediate data processing unit 14 executes a predetermined data processing (in the above example, calculation of sales fluctuation) to data in the range from processing target data included in the starting record to processing target data included in the ending record.

With the start flag and the end flag established in the record as above, the user may establish a timing of starting to monitor sales fluctuation in a flexible manner according to circumstances. As a result, user's convenience is improved.

The intermediate data processing unit 14 deletes a record which has been subjected to data processing and thereafter is not subjected to data processing, in order to improve utilization efficiency of the memory. That is, when end flags equivalent to the number of start flags up to the target record are inputted, it may be said that the target record is no longer used.

[Second Data Processing]

The second data processing defines start (or end) of a plurality of windows in one record. For example, in FIG. 8, a window is established in the record of January 5 to the record of January 6, and a window is established in the record of January 5 to the record of January 7. Then, the intermediate data processing unit 14 executes data processing to the records where the windows are established.

To define the window as above, for example, an integer equal to or larger than 2 is used as a symbol representing the start flag and the end flag. The window processing unit 13 establishes the window corresponding to a value of the start flag and a value of the end flag in the record.

The window processing unit 13 establishes start of windows of the same number as a numeric value of the start flag in the record including the numeric value of the start flag equal to or larger than 2. Then, the window processing unit 13 establishes the end of the window to which start has been established, in the record including the end flag corresponding to the start flag. Hereinafter, the establishment processing is described with reference to FIGS. 9 and 10.

Table T12 of FIG. 9 illustrates records inputted by the record input unit 12 in a table format. The record includes the same attributes as the record described with reference to FIG. 8. The dotted arrow of FIG. 9 indicates the start flag of the window, and the end flag of the window corresponding to the start flag. In FIG. 10 and subsequent drawings, the arrow indicating the correspondence relationship is not illustrated.

The data generation apparatus DGA of FIG. 4 outputs the record including the same attributes as the record described with reference to FIG. 8 to the data processing apparatus DPA. The record input unit 12 of the data processing apparatus DPA receives the record outputted from the processing apparatus MA and stores into the RAM 102 in the table format illustrated in FIG. 9.

The table T12 has the same configuration as the table T1 of FIG. 8. The numeric value (an integer equal to or larger than 1) of the start flag of the record is the start flag indicating the start of the window. The numeric value (an integer equal to or larger than 1) of the end flag of the record is the end flag indicating the end of the window. Description of the start flag "0" of the record and the end flag "0" of the record is omitted as described with reference to FIG. 8.

In the example of FIG. 9, the start flag and the end flag of the record of January 1 are "1" and "0" respectively. The start flag and the end flag of the record of January 2 are "0" and "1" respectively.

Therefore, the window processing unit 13 establishes a start point of the quantity (1) indicated by a first flag, the start point indicating start of the range, in a record where the first flag (start flag "1" of the record) is established in an Nth place (N is 1). That is, a start point of the quantity indicated by the first flag is established in the record in the Nth place (N is 1). The start point is the start point of the window W31. The range is a range of records to be subjected to a predetermined processing.

The window processing unit 13 establishes an end point indicating the end of the range in a record (record of January 2) of the quantity (1) where a second flag is established, the record inputted after a record in the Nth place (N is 1). The end point is the end point of the window W32.

The above processing is described specifically below. The window processing unit 13 establishes a window W31 in the record of January 1 and the record of January 2. Based on the processing information of the query, the intermediate data processing unit 14 executes data processing to the two records where the window W31 is established. The data processing is, for example, to calculate an average value of the sales of records where the window is established.

The start flag and the end flag of the record of January 3 are "2" and "1" respectively. The start flag and the end flag of the record of January 4 are "1" and "2" respectively. Therefore, the window processing unit 13 establishes the start point of two windows W32 and W33 in the record of January 3. Then, the window processing unit 13 establishes the end point of the window W32 in the record of January 3, and establishes the end point of the window W33 in the record of January 4. That is, the window processing unit 13 establishes the window W32 in the record of January 3, and establishes the window W33 in the record of January 3 and the record of January 4. Further, the window processing unit 13 establishes the start point and the end point of the window W34 in the record of January 4. That is, the window processing unit 13 establishes the window W34 in the record of January 4. As described above, the end point of windows of the quantity same as the numeric value of the end flag is established in the record including the end flag of the numeric value equal to or larger than 2.

The start flag and the end flag of the record of January 5 are "2" and "0" respectively. The start flag and the end flag of the record of January 6 are "0" and "1" respectively. The start flag and the end flag of the record of January 7 are "1" and "1" respectively.

Therefore, the window processing unit 13 establishes the start point of two windows W35 and W36 in the record of January 5. Then, the window processing unit 13 establishes the end point of the window W35 in the record of January 6, and establishes the end point of the window W36 in the record of January 7. That is, the window processing unit 13 establishes the window W35 in the record of January 5 and the record of January 6, and establishes the window W36 in the record of January 5 to the record of January 7.

The start flag and the end flag of the record of January 7 are "1" and "1" respectively. The start flag and the end flag of the record of January 8 are "0" and "1" respectively. The end point of the window W36 has been established in the record of January 7. Therefore, the window processing unit 13 establishes a window W37 in the record of January 7 and the record of January 8.

Here, for example, assume that a fifth query for calculating the sum of the sales included in the record of January 5 and the sales included in the record of January 6 is executed. Here, the window W35 and the window W36 are established one over another in the record of January 5 and the record of January 6. Thus, the record of January 5 and the record of January 6 are not deleted until processing to the records of January 5 to January 7 is executed.

Thus, this query is executable even when a seventh query for calculating the sum of the sales included in the record of January 5 to the sales included in the record of January 7 is inputted. That is, even after data processing of the fifth query has started, the processing target data range may be dynamically changed.

According to the window establishment method described with reference to FIG. 9, a plurality of window starts (or ends) may be defined in one record, and data processing may be executed by establishing a window as desired by the user. Thus, for example, data processing of calculating the total sales from the beginning of the month every week becomes possible.

Next, assume a case where the window processing unit 13 establishes a window in a record illustrated in the table T13 of FIG. 10. The table T13 of FIG. 10 illustrates records inputted by the record input unit 12 in a table format. The record includes the same attributes as the record described with reference to FIG. 8.

In the example of FIG. 10, the start flag and the end flag of the record of January 1 are "5" and "0" respectively. The start flag and the end flag of the records of January 2 and January 3 are "0" and "1" respectively. The start flag and the end flag of the record of January 4 are "0" and "0" respectively. The start flag and the end flag of the records of January 5 to January 7 are "0" and "1" respectively.

Therefore, the window processing unit 13 establishes start points of the quantity (5) indicated by the first flag in a record in an Nth place (N is 1) where the first flag (start flag "5" of the record) is established, the start points indicating a start of the range. That is, the window processing unit 13 establishes the start points of the quantity indicated by the first flag in a record in an Nth place (N is 1). The start points are a start point of the window W41 to the window W45. The range is a range of records to be subjected to a predetermined processing.

The window processing unit 13 establishes the end point indicating the end of the range in records (records of January 2, January 3, January 5, January 6 and January 7) of the quantity (5) where the second flag is established, the records inputted after the record in the Nth place (N is 1). The end point is an end point in the window W41 to the window W45.

As described above, the window processing unit 13 establishes the start points of the quantity (5) indicated by the first flag in a first record (record of January 1) including the first flag, the start point indicating a start of the range. The range is a range of records to be subjected to a predetermined processing. Then, the window processing unit 13 establishes the end point indicating the end of the range in each of second records (records of January 2, January 3, January 5, January 6 and January 7) of the quantity where the second flag is established, the records inputted after the first record.

Then, the intermediate data processing unit 14 executes a predetermined processing to data in a range from processing target data (sales "100") of the first record where the start point is established to processing target data of the second record where the end point is established.

The above processing is described specifically below. The window processing unit 13 establishes the start point of five windows W41 and W45 in the record of January 1. Then, the window processing unit 13 establishes the end point of the window W41 in the record of January 2, establishes the end point of the window W42 in the record of January 3, and establishes the end point of the window W43 in the record of January 5. Then, the window processing unit 13 establishes the end point of the window W44 in the record of January 6, and establishes the end point of the window W45 in the record of January 7.

Then, the intermediate data processing unit 14 executes a predetermined processing (for example, calculation of the average value of the sales) to data of a plurality of records where any one of the window W41 to the window W45 is established. In the above example, the intermediate data processing unit 14 calculates the average value ("150") of data (sales "100", sales "200") of a plurality of records where the window W41 is established. The intermediate data processing unit 14 also calculates the average value ("133")

of data (sales "100", sales "200", "100") of a plurality of records where the window W42 is established.

[Third Data Processing]

In the second data processing, when a plurality of window starts (or ends) are defined in one record, the number of defined windows or the plurality of windows is restricted to a designated number. In other words, the second data processing allows definition of only a predetermined number of window starts (or window ends) in one record.

For example, assume that in the example described with reference to FIG. 10, the user desires to calculate the total sales from January 1 as appropriate after having embedded the start flag "5" into the record of January 1. In this case, the user is unable to increase the number of windows since the number of defined windows is finite. As a result, the user's desire is not satisfied.

Thus, infinite window starts (or ends) are defined in one record. For the purpose of the definition, an infinite code is assigned to either the start flag or the end flag of the record. The infinite code is, for example, "−1". As described above, the first flag is information (infinite code) indicating that the number of ranges is infinite. Hereinafter, this establishment is described with reference to FIG. 11.

For example, assume a case where the window processing unit 13 establishes windows in records illustrated in a table T14 of FIG. 11. The table T14 of FIG. 11 illustrates records inputted by the record input unit 12 in a table format. The record includes the same attributes as the record described with reference to FIG. 8.

In the example of FIG. 11, the start flag and the end flag of the record of January 1 are "−1" (infinite code) and "0" respectively. The start flag and the end flag of the records of January 2 and January 3 are "0" and "1" respectively. The start flag and the end flag of the record of January 4 are "0" and "0" respectively. The start flag and the end flag of records of January 5 to January 8 are "0" and "1" respectively.

Therefore, the window processing unit 13 establishes a start point being infinite in a record in an Nth (N is 1) place where the first flag of the infinite code is established. The start point is a start point of windows W51 to W5q (lower-case letter q is an integer equal to or larger than 2). Next, the window processing unit 13 establishes the end point in each of a plurality of records (records of January 2 to January 8) where the second flag is established, the records inputted after a record in an Nth place.

As described above, the window processing unit 13 establishes a start point being infinite in a first record (record of January 1) where the first flag is established, and establishes the end point in each of a plurality of second records where the second flag is established, the plurality of second records inputted after the first record.

The above processing is described specifically below. The window processing unit 13 establishes the start point of q windows W51 to W5q in the record of January 1. To simplify description, only windows W51 to W56 are illustrated in FIG. 11.

Then, the window processing unit 13 establishes the end point of the window W51 in the record of January 2, establishes the end point of the window W52 in the record of January 3, and establishes the end point of the window W53 in the record of January 5. Then, the window processing unit 13 establishes the end point of the window W54 in the record of January 6, and establishes the end point of the window W55 in the record of January 7. Then, the window processing unit 13 establishes the end point of two windows W56 in the record of January 8.

According to the window establishment method described with reference to FIG. 11, infinite window starts (or ends) may be defined in one record. Thus, the number of windows to be established does not have to be decided when starting data processing. As a result, the user's desire of calculating the total sales from January 1 as appropriate may be satisfied.

[Fourth Data Processing]

The third data processing defines infinite window starts (or ends) in one record. In the fourth data processing, processing of stopping (or canceling) the establishment of infinite windows is described. For the canceling, special information is embedded into the record. The special information is a symbol indicating that the establishment of infinite windows is canceled.

The processing program PG2 of the processing apparatus MA additionally establishes, in the record, special information indicating that the establishment of infinite windows is canceled. The special information is an example of the third flag indicating stop of the establishment of the end point.

That is, the processing program PG2 allows to establish the third flag indicating stop of the establishment of the end point in the record. The processing apparatus MA outputs the record to the data processing apparatus DPA.

The record input unit 12 of the data processing apparatus DPA inputs the record outputted from the processing apparatus MA, the record further including the third flag indicating cancellation of the establishment of the end point, and stores into the RAM 102 in the table format illustrated in FIG. 12.

Table T15 stores one record in each of second and subsequent lines. The table T15 is a table with the special field added to the table T11 of FIG. 8. The special field stores the symbol "1" indicating that the establishment of infinite windows is canceled, or "0" which is a flag having no meaning itself.

In the table T15, the record of January 1 to the record of January 5 are the same as the record of January 1 to the record of January 5 in the table T14 of FIG. 11, except the symbol "0" in the special field. The special information, the start flag and the end flag of the record of January 6 are "1", "1" and "0" respectively. That is, the special information of January 6 is the symbol "1" indicating that the establishment of infinite windows is canceled.

Therefore, the window processing unit 13 establishes the start point of three windows W61 to W63 in the record of January 1. Then, the window processing unit 13 establishes the end point of the window W61 in the record of January 2, establishes the end point of the window W62 in the record of January 3, and establishes the end point of the window W63 in the record of January 5. That is, the window processing unit 13 establishes the window W61 in records of January 1 and January 2, establishes the window W62 in records of January 1 to January 3, and establishes the window W63 in records of January 1 to January 5.

The window processing unit 13 detects input of the record of January 1 where a first flag (infinite code) being information indicating the number of range is infinite is established, and then detects input of the record of January 6 where a third flag (special information "1") is established. Then, upon detecting input of the record of January 6, the window processing unit 13 executes the following processing. That is, the window processing unit 13 cancels the processing of establishing the end point corresponding to the first flag (infinite code) in records following a record where the third flag is established.

As described above, the window processing unit 13 detects input of the first record (record of January 1) where the first flag being information indicating the number of ranges is infinite is established, and then detects input of the record of January 6 where the third flag is established. Then, the window processing unit 13 cancels the processing of establishing the end point in records following a record where the third flag is established.

The above processing is described specifically below. Upon detecting input of the record of January 6 where the third flag is established, the window processing unit 13 cancels the processing of establishing windows having the start point thereof in the record of January 1 as illustrated in FIG. 12.

The special information, the start flag and the end flag of the record of January 6 are "1", "1" and "0" respectively. The special information, the start flag and the end flag of the record of January 7 are "0", "1" and "1" respectively. The special information, the start flag and the end flag of the record of January 8 are "0", "0" and "1" respectively. Therefore, the window processing unit 13 establishes a window W64 in the record of January 6 and the record of January 7. Then, the window processing unit 13 establishes a window W65 in the record of January 7 and the record of January 8.

According to the window establishment method described with reference to FIG. 12, establishment of infinite windows may be canceled. In other words, even when infinite window starts (or ends) are defined in one record, the data range of the data processing target may be re-established (reset).

For example, assume a case where the total sales from the beginning day to a middle day of the month is calculated every day. The middle day is a day between a first day and a last day of the month. In case of January, the middle day is a day among January 1 to January 31. To implement this calculation, an infinite window start is established in a record of the first day of the month, and the end of the window is established in a record of every day of a month.

The record for calculating the total sales from the beginning day to a middle day every day in each month is described with reference to FIG. 13.

The table T16 has the same configuration as the table T15 of FIG. 12. In the table T15, the special information, the start flag and the end flag of the record of January 1 are "0", "−1" and "1" respectively. The special information, the start flag and the end flag of the records of January 2 to January 31 are "0", "0" and "1" respectively. The special information, the start flag and the end flag of the record of February 1 are "1", "−1" and "1" respectively. Therefore, the window processing unit 13 establishes a window W10r in the record of January 1 to the record of 1/r (lowercase letter r is an integer between 01 and 31). Then, the intermediate data processing unit 14 calculates the sum of the sales of each record where the window is established. After the sum of the sales of records where the window W1001 to the window W1031 are established has been calculated, the intermediate data processing unit 14 deletes the records from the RAM 102.

For records of February, windows are established in the same manner as January. The window processing unit 13 establishes windows W2001 to W2003 in the record of February 1 to the record of February 3.

According to the window establishment method described with reference to FIG. 12, the total sales from the first day to a middle day of a month may be calculated for each day as described with reference to FIG. 13.

[Fifth Data Processing]

As described with reference to FIGS. 11 to 13, when an infinite window is established in records, the records have to be stored in the RAM 102 until establishment of the window is canceled or until a record including the special information "1" is inputted. When there are a lot of records where an infinite window is established, the lot of records has to be stored in the RAM 102. As a result, the memory area of the RAM 102 becomes tight due to storage of the lot of records, and thereby efficient utilization of the memory area is hindered.

Thus, when an infinite window is established in a record, the data processing apparatus DPA executes data processing based on the record to generate intermediate data and then deletes the record from the RAM 102.

For example, when executing data processing of records following a record where the start point of a window is established, the intermediate data processing unit 14 performs the following processing. Also, when executing data processing of records preceding a record where the end point of the window is established, the intermediate data processing unit 14 performs the following processing. That is, the intermediate data processing unit 14 stores execution result of the data processing into the buffer and then deletes the inputted record.

Figure 14:
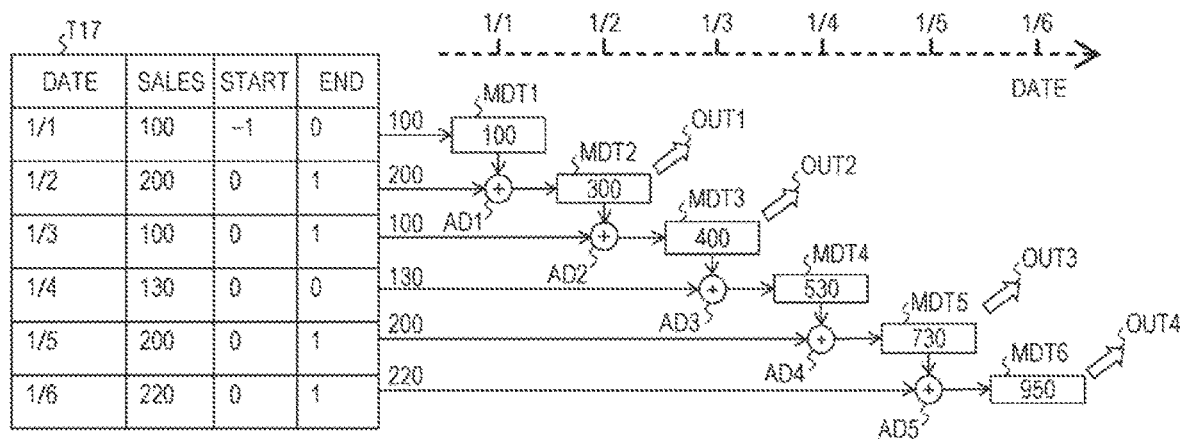
FIG. 14 is a seventh illustrating data processing according to the present embodiment.

Data processing in consideration of efficient utilization of the memory area is described with reference to FIGS. 11 and 14. The data processing is a data processing of calculating the total sales from the first day through a middle day of the month for each day.

Table T17 is a table extracted from the table T14 of FIG. 11. A dotted right arrow of FIG. 14 indicates the date. A numeric value indicated by reference numerals MDT1 to MDT6 represents intermediate data. An arrow indicated by reference numerals OUT1 to OUT4 represents output of intermediate data. Reference numerals AD1 to AD5 indicate addition.

The record input unit 12 sequentially inputs the record of January 1 to the record of 1/s (lowercase letter s is an integer equal to or larger than 1 and equal to or smaller than 6) and stores in the RAM 102. The window processing unit 13 establishes a window W5s (for the window W5s, see FIG. 11) in the record of January 1 to the record of 1/s according to input of the record.

When the record of January 1 is stored in the RAM 102, the intermediate data processing unit 14 calculates the total sales "100" of the record of January 1 and stores into the RAM 102 as intermediate data MDT1. Then, the intermediate data processing unit 14 deletes the record of January 1 from the RAM 102.

Next, when the record of January 2 is stored into the RAM 102, the intermediate data processing unit 14 calculates the total sales "300" by performing addition (see reference numeral AD1) of the sales "200" of the record of January 2 and the intermediate data MD1 ("100") and stores into the RAM 102 as intermediate data MDT2. Since the window W51 (see FIG. 11) is established in records of January 1 and January 2, the data output unit 15 outputs (see reference numeral OUT1) the total sales "300" (see reference numeral MDT2) of the sales of January 1 and the sales of January 2. Then, the intermediate data processing unit 14 deletes the record of January 2 from the RAM 102.

Next, when the record of January 3 is stored in the RAM 102, the intermediate data processing unit 14 calculates the total sales "400" by performing addition (see reference numeral AD2) of the sales "100" of the record of January 3 and the intermediate data MDT2 ("300") and stores into the RAM 102 as intermediate data MDT3. Then, the intermediate data processing unit 14 deletes the record of January 3 from the RAM 102. Here, since the window W52 (see FIG. 11) is established in records of January 1 to January 3, the data output unit 15 outputs (see reference numeral OUT2) the total sales "400" (see reference numeral MDT3) of the sales of January 1 to the sales of January 3.

Next, when the record of January 4 is stored in the RAM 102, the intermediate data processing unit 14 calculates the total sales "530" by performing addition (see reference numeral AD3) of the sales "130" of the record of January 4 and the intermediate data MDT3 ("400") and stores into the RAM 102 as intermediate data MDT4. Then, the intermediate data processing unit 14 deletes the record of January 4 from the RAM 102. Here, since no window is established in records of January 1 to January 4, the data output unit 15 does not output the total sales "530" (see reference numeral MDT4) of the sales of January 1 to the sales of January 4.

Next, when the record of January 5 is stored in the RAM 102, the intermediate data processing unit 14 calculates the total sales "730" by performing addition (see reference numeral AD4) of the sales "200" of the record of January 5 and the intermediate data MDT4 ("530") and stores into the RAM 102 as intermediate data MDT5. Then, the intermediate data processing unit 14 deletes the record of January 5 from the RAM 102. Here, since the window W53 (see FIG. 11) is established in records of January 1 to January 5, the data output unit 15 outputs (see reference numeral OUT3) the total sales "730" (see reference numeral MDT5) of the sales of January 1 to the sales of January 5.

Next, the intermediate data processing unit 14 calculates the total sales "950" by performing addition (see reference numeral AD5) of the sales "220" of the record of January 6 and the intermediate data MDT5 ("730") and stores into the RAM 102 as intermediate data MDT6. Then, the intermediate data processing unit 14 deletes the record of January 6 from the RAM 102. Here, since the window W54 (see FIG. 11) is established in records of January 1 to January 6, the data output unit 15 outputs (see reference numeral OUT4) the total sales "950" (see reference numeral MDT6) of the sales of January 1 to the sales of January 6.

As described above, data processing may be executed and processing result may be outputted by utilizing latest records and intermediate data without executing data processing to records stored in the RAM 102 every time the window or the processing target data range is changed.

That is, when infinite windows are established in a record, the data processing apparatus DPA executes data processing based on the record to generate intermediate data and then deletes the record from the RAM 102. As a result, a record may be deleted from the memory area of the RAM 102 as appropriate, and thereby the memory area of the RAM 102 may be utilized efficiently.

Next, data processing in consideration of efficient utilization of the memory area is described with reference to FIGS. 11 and 15. The data processing is a data processing of outputting the sales of the first day of the month and the sales of two days before the reference record. The reference record is a record including the reference date of two days before.

Figure 15:
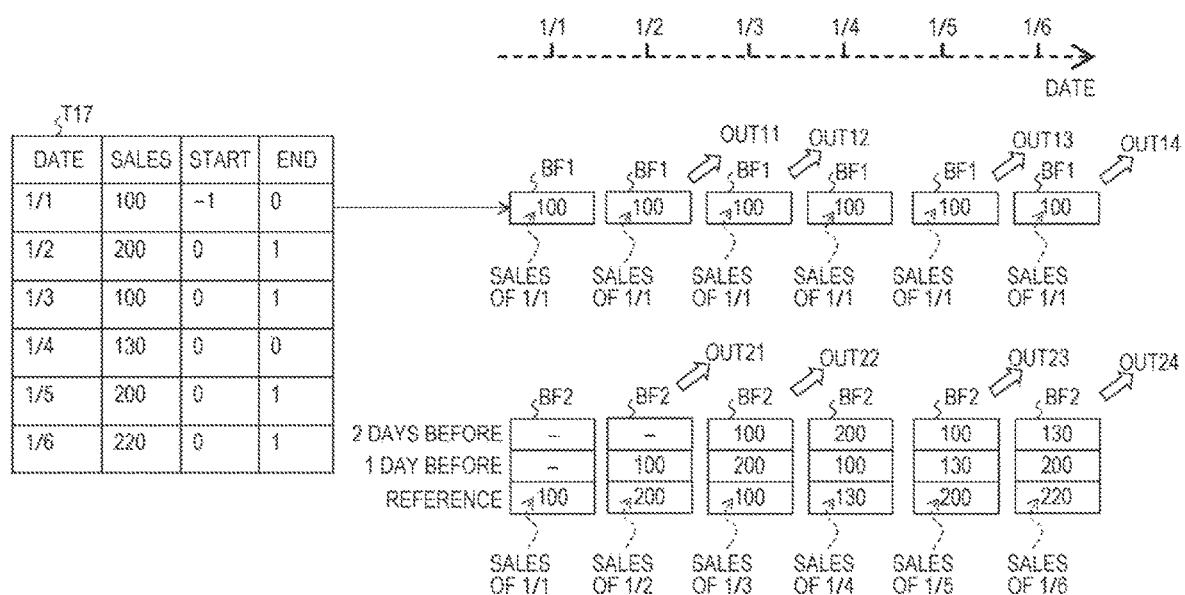
FIG. 15 is an eighth illustrating data processing according to the present embodiment.

A dotted right arrow of FIG. 15 indicates the date. Arrows indicated by reference numerals OUT11 to OUT14 and reference numerals OUT21 to OUT24 represent output of intermediate data.

A reference numeral BF1 represents a buffer configured to store the sales for one day. A reference numeral BF2 represents a buffer configured to store the sales for three days. The buffer BF1 is a buffer configured to store the sales of a first day of the output target month. The buffer BF2 is a buffer configured to store the sales up to two days before the reference record. The buffer BF2 is a queue of FIFO (First In, First Out). The intermediate data processing unit 14 stores the sales of the reference record in a lower most area (see "REFERENCE" in FIG. 15) of the buffer BF2. The intermediate data processing unit 14 stores the sales of the record one day before the reference record in a middle area (see "ONE DAY BEFORE" in FIG. 15) of the buffer BF2. The intermediate data processing unit 14 stores the sales of the record two days before the reference record in an upper most area (see "TWO DAYS BEFORE" in FIG. 15) of the buffer BF2. "-" in the buffer BF2 indicates that data is not stored therein.

The intermediate data processing unit 14 secures the area of buffers BF1 and BF2 in the RAM 102 before executing the second data processing.

The record input unit 12 sequentially inputs the record of January 1 into the record of 1/s (lowercase letter s is an integer equal to or larger than 1 and equal to or smaller than 6) and stores in the RAM 102. The window processing unit 13 establishes a window W5s (for the window W5s, see FIG. 11) in the record of January 1 to the record of 1/s.

When the record of January 1 is stored in the RAM 102, the intermediate data processing unit 14 stores the sales "100" of the record of January 1 into the buffer BF1. Then, the intermediate data processing unit 14 stores the sales "100" of the record of January 1 into the lower most area of the buffer BF2. Then, the intermediate data processing unit 14 deletes the record of January 1 from the RAM 102.

When the record of January 2 is stored in the RAM 102, the intermediate data processing unit 14 stores the sales "100" of the record of January 1 into the middle area of the buffer BF2, and stores the sales "200" of the record of January 2 into the lower most area of the buffer BF2. Now, January 2 is the reference day.

Since the window W51 (see FIG. 11) is established in records of January 1 and January 2, the data output unit 15 outputs (reference numeral OUT11) the sales of January 1 and outputs (reference numeral OUT21) the sales of the record two days before January 2, the reference day. Since the sales of the record of two days before the reference day January 2 is not yet stored in the RAM 102, the sales "0" is outputted. Then, the intermediate data processing unit 14 deletes the record of January 2 from the RAM 102.

When the record of January 3 is stored in the RAM 102, the intermediate data processing unit 14 stores the sales "100" of the record of January 1 into the upper most area of the buffer BF2, and stores the sales "200" of the record of January 2 into the middle area of the buffer BF2. Then, the intermediate data processing unit 14 stores the sales "100" of the record of January 3 into the lower most area of the buffer BF2. Now, January 3 is the reference day.

Since the window W52 (see FIG. 11) is established in records of January 1 to January 3, the data output unit 15 outputs (reference numeral OUT12) the sales of January 1 and outputs (reference numeral OUT22) the sales "100" of the record two days before January 3, the reference day. Then, the intermediate data processing unit 14 deletes the record of January 3 from the RAM 102.

When the record of January 4 is stored in the RAM 102, the intermediate data processing unit 14 stores the sales "200" of the record of January 2 into the upper most area of the buffer BF2, and stores the sales "100" of the record of January 3 into the middle area of the buffer BF2. Then, the intermediate data processing unit 14 stores the sales "130"

of the record of January 4 into the lower most area of the buffer BF2. Now, January 4 is the reference day.

When the record of January 5 is stored in the RAM 102, the intermediate data processing unit 14 stores the sales "100" of the record of January 3 into the upper most area of the buffer BF2, and stores the sales "130" of the record of January 4 into the middle area of the buffer BF2. Then, the intermediate data processing unit 14 stores the sales "200" of the record of January 5 into the lower most area of the buffer BF2. Now, January 5 is the reference day.

Since the window W53 (see FIG. 11) is established in records of January 1 to January 5, the data output unit 15 outputs (reference numeral OUT13) the sales of January 1 and outputs (reference numeral OUT23) the sales "100" of the record two days before January 5, the reference day. Then, the intermediate data processing unit 14 deletes the record of January 5 from the RAM 102.

When the record of January 6 is stored in the RAM 102, the intermediate data processing unit 14 stores the sales "130" of the record of January 4 into the upper most area of the buffer BF2, and stores the sales "200" of the record of January 5 into the middle area of the buffer BF2. Then, the intermediate data processing unit 14 stores the sales "220" of the record of January 6 into the lower most area of the buffer BF2. Now, January 6 is the reference day.

Since the window W54 (see FIG. 11) is established in records of January 1 to January 6, the data output unit 15 outputs (reference numeral OUT14) the sales of January 1 and outputs (reference numeral OUT24) the sales "130" of the record two days before January 6, the reference day. Then, the intermediate data processing unit 14 deletes the record of January 6 from the RAM 102.

As described with reference to FIGS. 14 and 15, the intermediate data processing unit 14 stores the result of a predetermined processing into the RAM 102 and thereafter deletes records stored in the RAM 102 from the RAM 102. Every time a record is inputted, the intermediate data processing unit 14 executes a predetermined processing to the result of the predetermined processing stored in the RAM 102 and to the data of the record.

As described with reference to FIGS. 14 and 15, only data desired for data processing may be stored in the RAM 102 and records not desired for data processing may be deleted from the RAM 102. Thus, the memory area of the RAM 102 may be utilized efficiently.

Although flags described with reference to FIGS. 8 to 15 are illustrated with numeric values, the flags may be symbols or characters corresponding to the numeric values. For example, flags "1" to "26" may be replaced with characters "A" to "Z" corresponding to numeric values "1" to "26" respectively.

[Flow of Data Processing]

Figure 16:
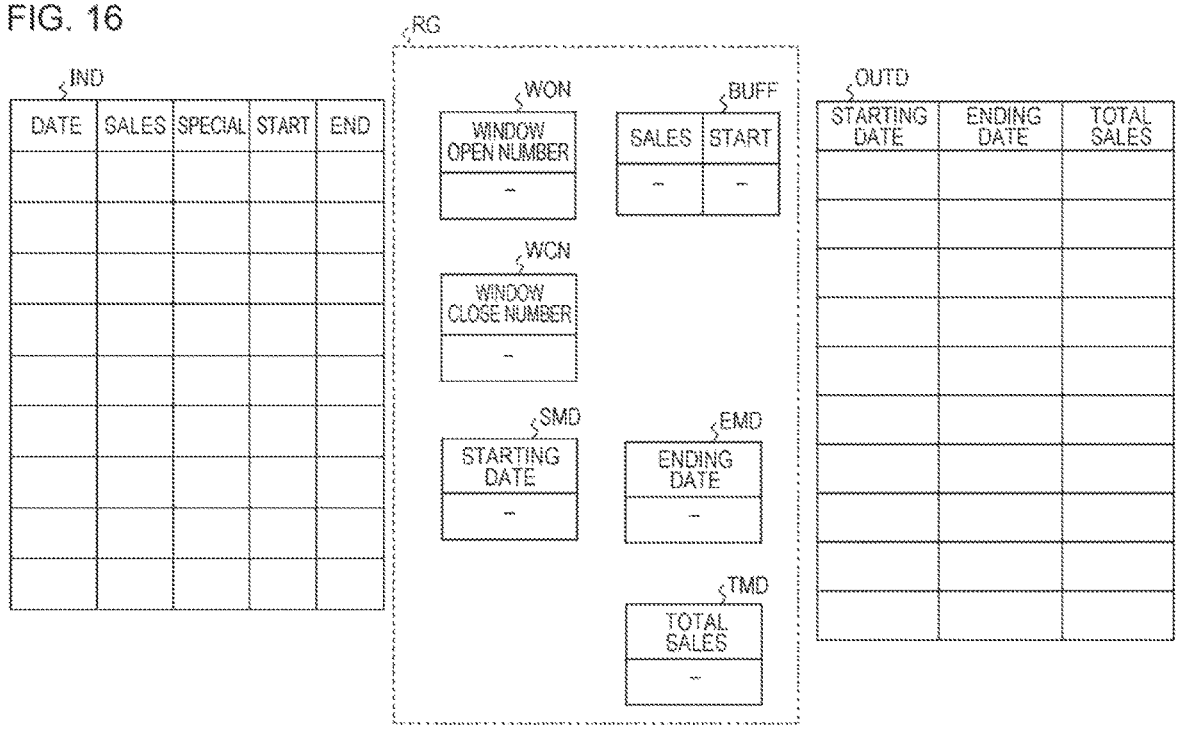
FIG. 16 illustrates data processing according to the present embodiment.

Next, a flow of data processing according to this embodiment is described with reference to FIGS. 16 to 18. FIG. 16 illustrates a data processing according to this embodiment. An input record table IND is a table indicating records (inputted records) outputted by the processing equipment MA of FIG. 4. In the input record table IND, a date field, a sales field, a special field, a start field, and an end field are fields for storing the date, the sales, the special flag, the start flag, and the end flag of the inputted record respectively. The special information is a special flag.

A window open number WON and a window close number WCN are variables for managing the number of windows established in execution of data processing. A buffer BUFF stores processing target data (for example, sales) and the number of window starts (start flags).

The window processing unit 13 performs the following processing when a query is inputted from the query input unit 11. That is, the window processing unit 13 secures an area for storing the window open number WON and the window close number WCN in a data processing region RG of the RAM 102, and further secures an area of the buffer BUFF. In the drawing, the window start number in the buffer BUFF is abbreviated as "START" for convenience of illustrating in the drawing.

Starting date SMD represents the starting date of the intermediate data. Ending date EMD represents the ending date of the intermediate data. Total sales TMD is the total sales.

The intermediate data processing unit 14 performs the following processing when a query is inputted from the query input unit 11. That is, the intermediate data processing unit 14 secures an area for storing the starting date SMD, the ending date EMD, and the total sales TMD in the data processing region RG of the RAM 102.

The output data table OUTD is a table indicating data outputted to the terminal apparatus TA of FIG. 4. As illustrated in FIG. 16, empty state of the window open number WON, the window close number WCN, the buffer BUFF, the starting date SMD, the ending date EMD, and the total sales TMD is indicated with "-" (hyphen). The empty state of the window open number WON, the window close number WCN, and the total sales TMD means that the value of the wind open number WON, the window close number WCN, and the total sales TMD is 0.

(Flow Diagram)

Figure 17:
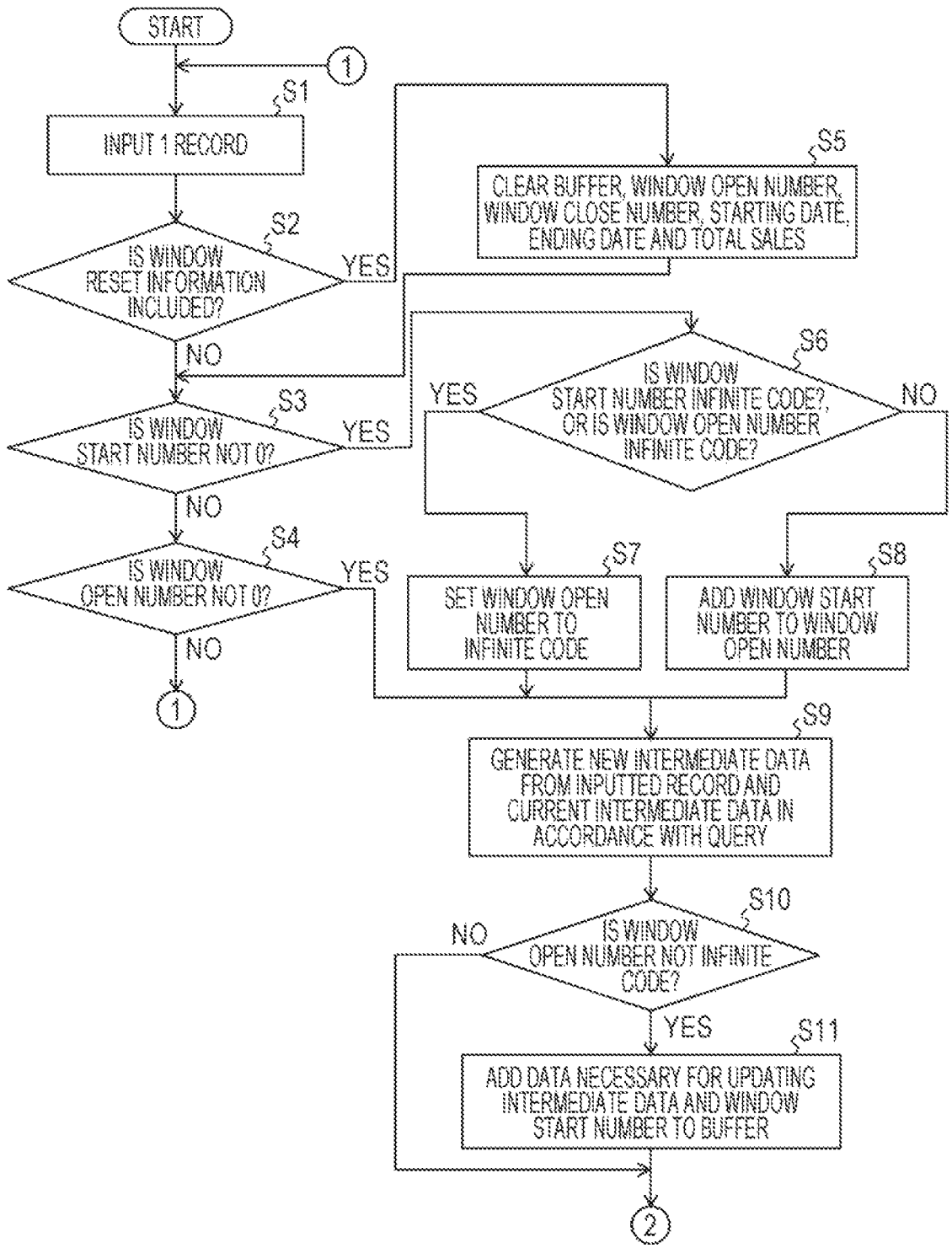
FIG. 17 is a first flow diagram illustrating a flow of data processing executed by a data processing apparatus according to the present embodiment.
Figure 18:
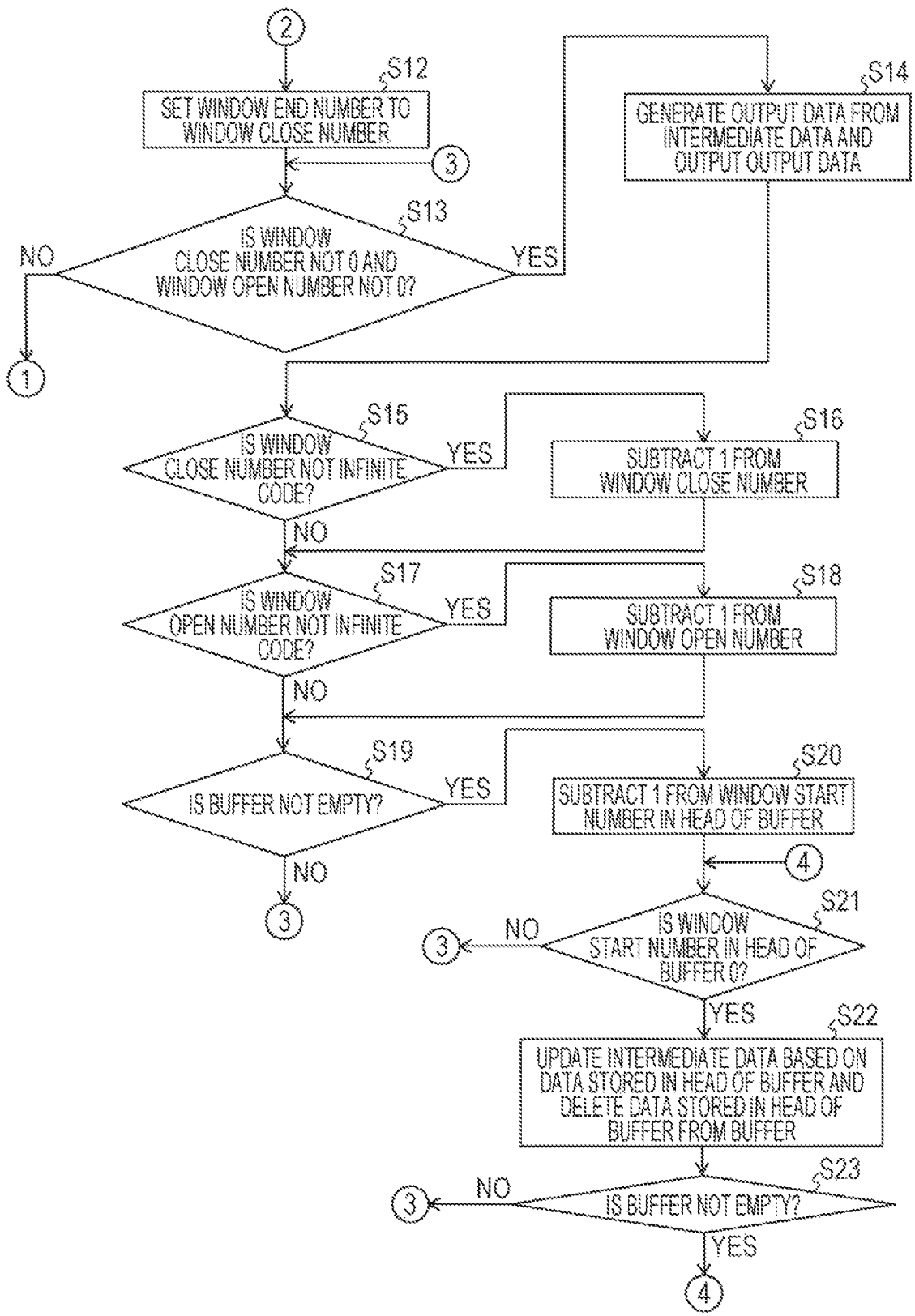
FIG. 18 is a second flow diagram illustrating a flow of data processing executed by a data processing apparatus according to the present embodiment.

FIGS. 17 and 18 are first and second flow diagrams illustrating a flow of data processing executed by the data processing apparatus according to this embodiment. The query input unit 11 is configured to input a query already outputted from the terminal apparatus TA of FIG. 4, and outputs to the window processing unit 13, the intermediate data processing unit 14, and the data output unit 15.

Step S1: The record input unit 12 inputs one record from the processing apparatus MA of FIG. 4 and temporarily stores the inputted record (hereinafter referred to as the input record as appropriate) into the RAM 102. After S1, the processing proceeds to S2.

Step S2: The window processing unit 13 determines whether the inputted record includes window reset information (that is, special flag "1").

If the input record includes the window reset information (S2: YES), the processing proceeds to S5. If the input record does not include the window reset information (S2: NO), the processing proceeds to S3.

Step S3: The window processing unit 13 determines whether the window start number of the input record is not "0". The window start number is a start flag of the record. If the window start number is not "0" (S3: YES), the processing proceeds to S6. If the window start number is "0" (S3: NO), the processing proceeds to S4.

Step S4: The window processing unit 13 determines whether the window open number WON is not "0". If the window open number WON is not "0" (S4: YES), the processing proceeds to S9. If the window open number WON is "0" (S4: NO), the processing proceeds to S1.

Step S5: The window processing unit 13 clears the buffer BUFF, the window open number WON, the window close number WCN, the starting date SMD, the ending date EMD, and the total sales TMD. This clearance stops establishment of infinite windows. After S5, the processing proceeds to S3.

Step S6: The window processing unit 13 determines whether the window start number (start flag) of the inputted record is an infinite code or whether the window open number WON is an infinite code.

If the window start number of the inputted record is an infinite code or if the window open number WON is an infinite code (S6: YES), the processing proceeds to S7. If S6 is not YES (S6: NO), the processing proceeds to S8.

Step S7: The window processing unit 13 sets the window open number WON to the infinite code ("−1"). After S7, the processing proceeds to S9.

Step S8: The window processing unit 13 adds the window start number of the input record to the window open number WON. After S8, the processing proceeds to S9.

Step S9: The intermediate data processing unit 14 generates new intermediate data from the input record and the current intermediate data in accordance with the inputted query (hereinafter referred to as the query C as appropriate). After S9, the processing proceeds to S10.

Step S10: The window processing unit 13 determines whether the window open number WON is an infinite code. If the window open number WON is an infinite code (S10: NO), the processing proceeds to S12 of FIG. 18. If the window open number WON is not an infinite code (S10: YES), the processing proceeds to S11.

Step S11: The window processing unit 13 adds data desired for updating the intermediate data, and the window start number of the input record out of data included in the input record into the buffer BUFF. Data desired for updating the intermediate data is, for example, data processing target data included in the query C. After S11, the processing proceeds to S12 of FIG. 18.

Step S12 of FIG. 18: The window processing unit 13 sets the window end number of the input record to the window close number WCN. The window end number is the end flag of the record. After S12, the processing proceeds to S13.

Step S13: The window processing unit 13 determines whether the window close number WCN is not "0" and the window open number WON is not "0". If the window close number WCN is not "0" and the window open number WON is not "0" (S13: YES), the processing proceeds to S14. If S13 is not YES (S13: NO), the processing proceeds to S1 of FIG. 17.

Step S14: The intermediate data processing unit 14 generates output data from the intermediate data (starting date SMD, ending date EMD, and total sales TMD) of the RAM 102, and the data output unit 15 outputs the output data generated by the intermediate data processing unit 14 to the terminal apparatus TA of FIG. 4. After S14, the processing proceeds to S15.

Step S15: The window processing unit 13 determines whether the window close number WCN is an infinite code. If the window close number WCN is an infinite code (S15: NO), the processing proceeds to S17. If the window close number WCN is not an infinite code (S15: YES), the processing proceeds to S16.

Step S16: The window processing unit 13 subtracts one from the window close number WCN. After S16, the processing proceeds to S17.

Step S17: The window processing unit 13 determines whether the window open number WON is an infinite code. If the window open number WON is an infinite code (S17: NO), the processing proceeds to S19. If the window open number WON is not an infinite code (S17: YES), the processing proceeds to S18.

Step S18: The window processing unit 13 subtracts one from the window open number WON. After S18, the processing proceeds to S19.

Step S19: The window processing unit 13 determines whether the buffer BUFF is not empty. If the buffer BUFF is empty (S19: NO), the processing proceeds to S13. If the buffer BUFF is not empty (S19: YES), the processing proceeds to S20.

Step S20: The window processing unit 13 subtracts one from the window start number stored in the head of the buffer BUFF. After S20, the processing proceeds to S21.

Step S21: The window processing unit 13 determines whether the window start number stored in the head of the buffer BUFF is "0". If the window start number stored in the head of the buffer BUFF is not "0" (S21: NO), the processing proceeds to S13. If the window start number stored in the head of the buffer BUFF is "0" (S21: YES), the processing proceeds to S22.

Step S22: The intermediate data processing unit 14 updates the intermediate data based on the data stored in the head of the buffer BUFF and deletes the data stored in the head of the buffer BUFF from the buffer BUFF. After S22, the processing proceeds to S23.

Step S23: The intermediate data processing unit 14 determines whether the buffer BUFF is empty. If the buffer BUFF is not empty (S23: YES), the processing proceeds to S21. If the buffer BUFF is empty (S23: NO), the processing proceeds to S13.

SPECIFIC EXAMPLE

FIGS. 19 to 43 are first to twenty-fifth diagrams for specifically describing data processing according to this embodiment. The query input unit 11 inputs the query. The query is a query for outputting the starting date and the ending date of the record which defines the range of data processing and the total sales within the range of data processing. Hereinafter, the query is referred to as the query C as appropriate. The data processing program PG1 executes data processing of the input record in accordance with the query C. After the query is inputted, the record input unit 12 inputs one record.

(Record of January 1st)

The record input unit 12 inputs one record from the processing apparatus MA of FIG. 4 and temporarily stores the input record into the RAM 102 (S1). The input record is a record including the date "January 1", the sales "100", the special flag "0", the window start number (start flag) "1", and the window end number (end flag) "0".

Figure 19:
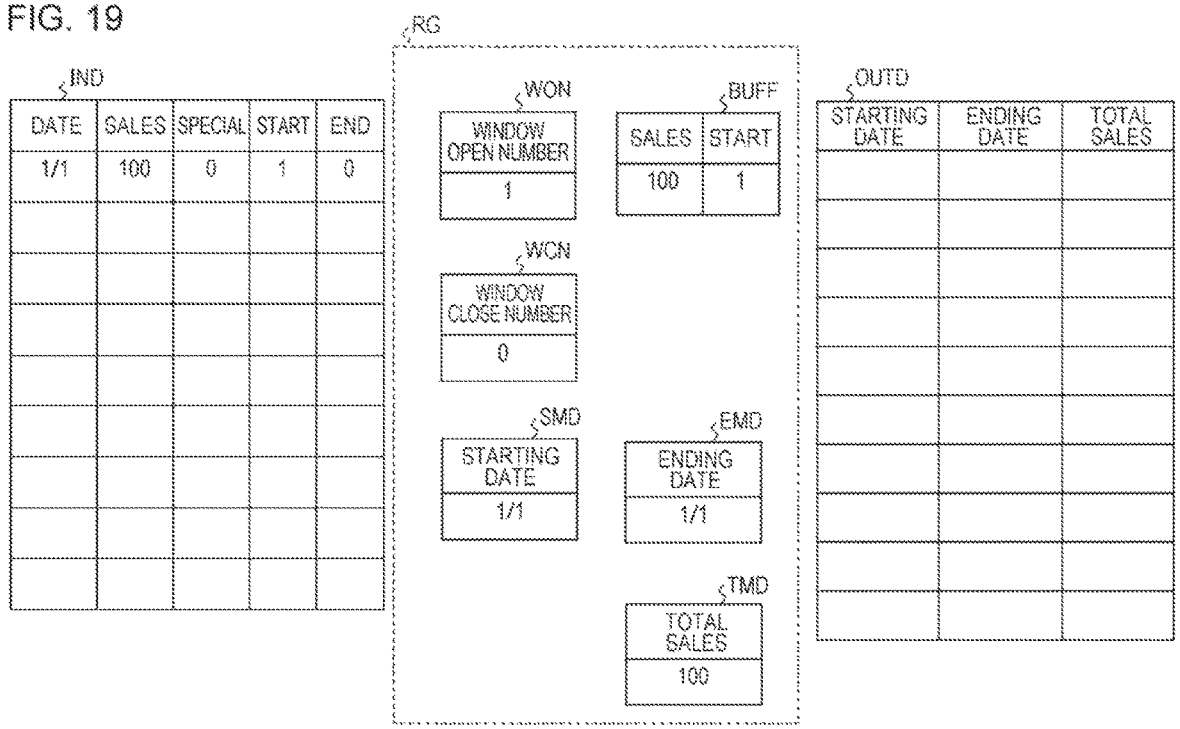
FIG. 19 is a first diagram specifically illustrating data processing according to the present embodiment.

In the input record table IND of FIG. 19, the sales record of January 1st is shown in the second line. Specifically, the second line stores "January 1" in the date field, "100" in the sales field, "0" in the special field, "1" in the start field, and "0" in the end field.

As illustrated in FIG. 16, the window open number WON, the window close number WCN, the buffer BUFF, the starting date SMD, the ending date EMD, and the total sales TMD are empty (in the cleared state) currently.

The input record of January 1 does not include window reset information (or, special flag "1"). The window start number of the input record is "1". The window start number of the input record is not an infinite code (for example, "−1"), or the window open number WON is not an infinite code. Therefore, the window processing unit 13 determines NO in S2, YES in S3 and NO in S6. Then, the window processing unit 13 adds the window start number "1" of the input record to the window open number WON "-" ("0") to get the window open number WON "1" as illustrated in FIG. 19 (S8).

Reference is made to FIG. 19. In accordance with the query C, the window processing unit 13 stores the date "January 1" of the input record of January 1 into the RAM 102 as the starting date SMD, and stores the data "January 1" of the input record into the RAM 102 as the ending date EMD (S9). Then, the intermediate data processing unit 14 stores the sales "100" of the input record into the RAM 102 as the total sales TMD in accordance with the query C (S9).

Since the window open number WON is "1" and not an infinite code, the window processing unit 13 determines as YES in S10. As illustrated in FIG. 19, the intermediate data processing unit 14 stores the sales "100" of the input record of January 1 into the sales field of the buffer BUFF, and stores the window start number "1" of the input record into the start field of the buffer BUFF (S11). The window processing unit 13 sets the window end number "0" of the input record to the window close number WCN (S12).

Since the window close number WCN is "0" and the window open number WON is "1", the window processing unit 13 determines as NO in S13. Then, the processing proceeds to record input processing (S1).

(Record of January 2nd)

The record input unit 12 inputs one record from the processing apparatus MA of FIG. 4 and temporarily stores the input record into the RAM 102 (S1). The input record is a record including the date "January 2", the sales "200", the special flag "0", the window start number (start flag) "1", and the window end number (end flag) "1".

Figure 20:
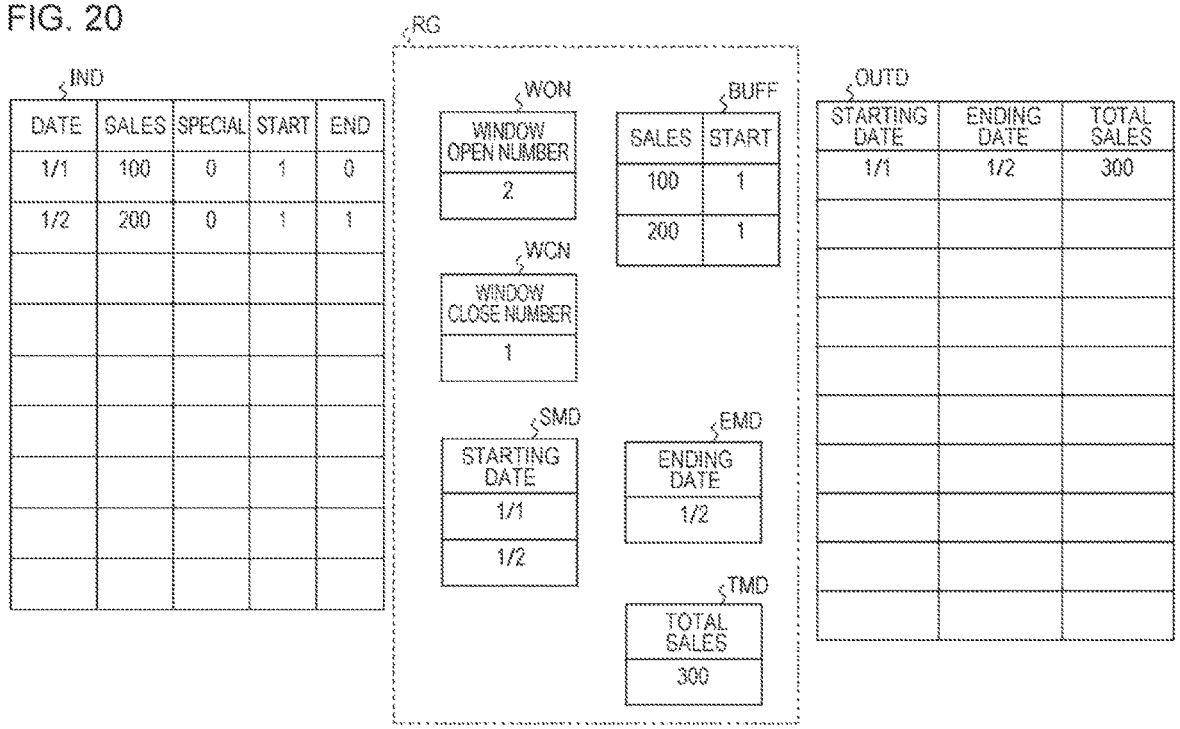
FIG. 20 is a second diagram specifically illustrating data processing according to the present embodiment.

In the input record table IND of FIG. 20, the sales record of January 2nd is shown in the third line. Specifically, the third line stores "January 2" in the date field, "200" in the sales field, "0" in the special field, "1" in the start field, and "1" in the end field.

The input record of January 2 does not include window reset information (or, special flag "1"). The window start number of the input record is "1". The window start number of the input record is not an infinite code (for example, "−1"), or the window open number WON is not an infinite code. Therefore, the window processing unit 13 determines NO in S2, YES in S3 and NO in S6. Then, the window processing unit 13 adds the window start number "1" of the input record to the window open number WON "1" (see FIG. 19) to get the window open number WON "2" as illustrated in FIG. 20 (S8).

Reference is made to FIG. 20. In accordance with the query C, the window processing unit 13 stores the date "January 2" of the input record of January 2 into the RAM 102 as the starting date SMD, and stores the date "January 2" of the input record into the RAM 102 as the ending date EMD (S9). Then, in accordance with the query C, the intermediate data processing unit 14 adds the sales "200" of the input record to the current total sales TMD "100", and stores into the RAM 102 as the total sales TMD "300" (S9).

Since the window open number WON is "2" and not an infinite code, the window processing unit 13 determines as YES in S10. As illustrated in FIG. 20, the intermediate data processing unit 14 stores the sales "200" of the input record of January 2 into the sales field of the buffer BUFF, and stores the window start number "1" of the input record into the start field of the buffer BUFF (S11). The window processing unit 13 sets the window end number "1" of the input record to the window close number WCN (S12).

Since the window close number WCN is "1" and the window open number WON is "2", the window processing unit 13 determines as YES in S13.

The intermediate data processing unit 14 generates output data from the intermediate data (starting date SMD "January 1", ending date EMD "January 2", and total sales TMD "300") of the RAM 102, and the data output unit 15 outputs the output data to the terminal apparatus TA (S14). The output data includes the starting date "January 1", the ending date "January 2" and the total sales "300". The output data is shown in the second line of the output data table OUTD of FIG. 20. Specifically, in the output data table OUTD of FIG. 20, the second line stores "January 1" in the starting date field, "January 2" in the ending date field, and "300" in the total sales field.

As described above, the window processing unit 13 establishes the window start point in the record of January 1 by storing January 1 into the RAM 102 as the starting date SMD. The window processing unit 13 establishes the window end point in the record of January 2 by storing January 2 into the RAM 102 as the ending date EMD. Then, the intermediate data processing unit 14 calculates the sum "300" of the sales "100" of the record of January 1 and the sales "200" of the record of January 2. The data output unit 15 outputs start "January 1" and end "January 2" of data processing and the sum "300".

In FIG. 20, the window close number WCN is "1". Therefore, the window processing unit 13 determines as YES in S15, and subtracts one from the window close number WCN "1" (see FIG. 20) to get the window close number WCN "0" as illustrated in FIG. 21 (S16).

Then, in FIG. 20, the window open number WON is "2". Therefore, the window processing unit 13 determines as YES in S17, and subtracts one from the window open number WON "1" (see FIG. 20) to get the window open number WON "1" as illustrated in FIG. 21 (S18).

Then, in FIG. 20, the buffer BUFF is not empty. Therefore, the window processing unit 13 determines YES in S19, and subtracts one from the window start number "1" (see FIG. 20) stored in the head of the buffer BUFF to get the window start number "0" (see FIG. 21") (S20).

Figure 21:
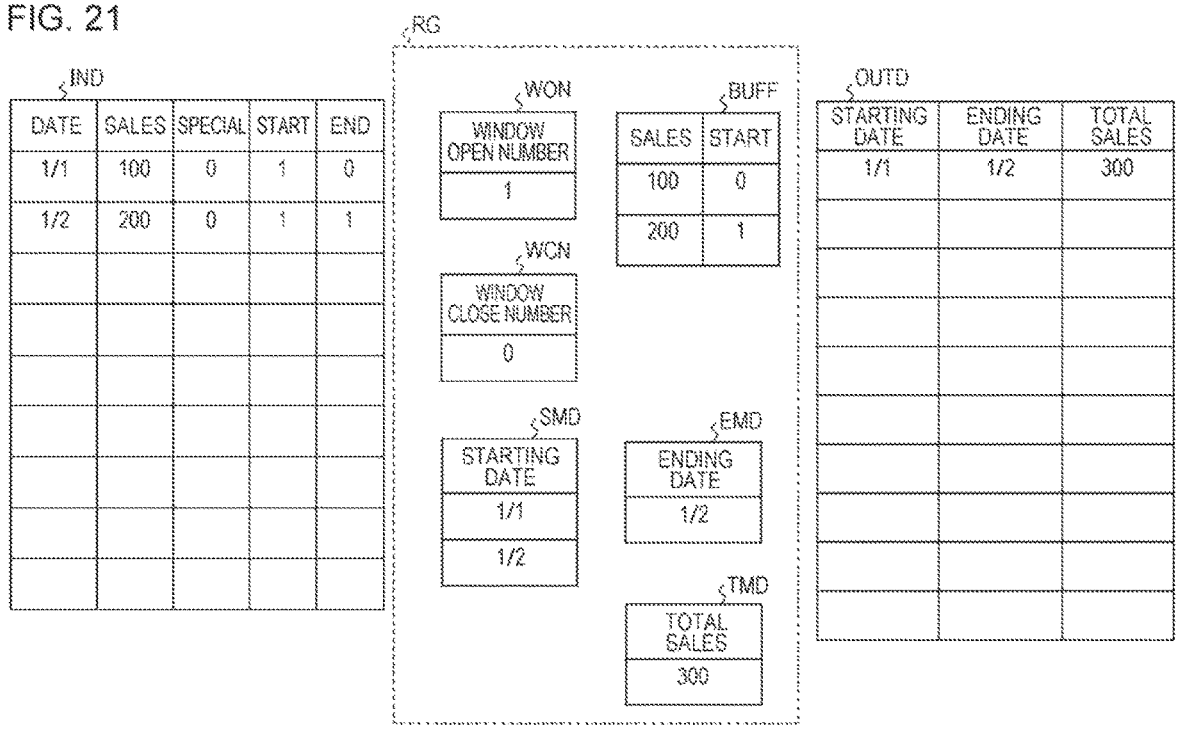
FIG. 21 is a third diagram specifically illustrating data processing according to the present embodiment.

As illustrated in FIG. 21, the window start number stored in the head of the buffer BUFF is "0". Therefore, the intermediate data processing unit 14 determines YES in S21, and updates the intermediate data based on the data stored in the head of the buffer BUFF and deletes the data stored in the head of the buffer BUFF from the buffer BUFF (S22).

Specifically, the intermediate data processing unit 14 subtracts the sales "100" (see FIG. 21) out of data (sales "100", window start number "0") stored in the head of the buffer BUFF from the total sales TMD "300" (see FIG. 21) of the intermediate data to get the total sales TMD "200" (see FIG. 22) of the intermediate data.

Figure 22:
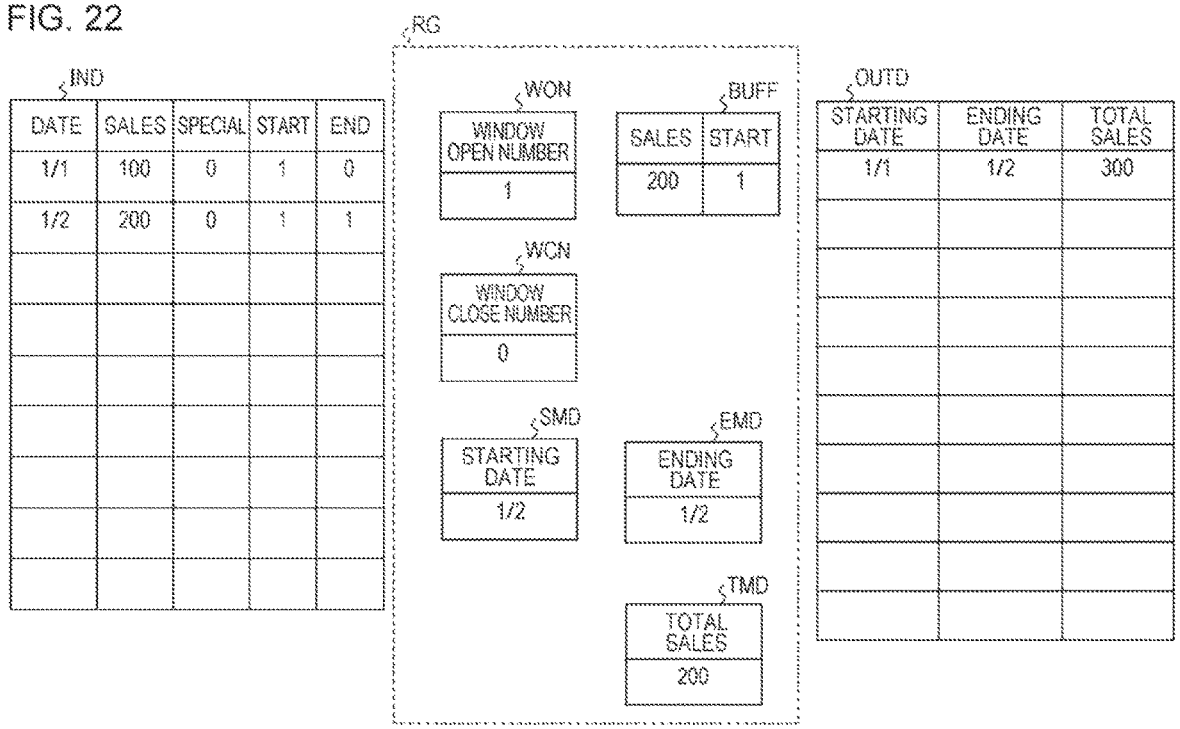
FIG. 22 is a fourth diagram specifically illustrating data processing according to the present embodiment.

Next, the intermediate data processing unit 14 deletes the starting date "January 1" (see FIG. 21) in the head of the starting date SMD in the intermediate data to get the starting date "January 2" (see FIG. 22).

Next, the intermediate data processing unit 14 deletes data (sales "100", window start number "0" (see FIG. 21)) stored in the head of the buffer BUFF to change data stored in the buffer BUFF to the sales "200" and the window start number "1" (see FIG. 22).

As illustrated in FIG. 22, the buffer BUFF is not empty. Therefore, the intermediate data processing unit 14 determines as YES in S23, and the processing proceeds to S21. The window start number stored in the head of the buffer BUFF is "1". Therefore, the window processing unit 13 determines NO in S21, and the processing proceeds to S13.

As illustrated in FIG. 22, since the window open number WON is "1" and the window close number WCN is "0", the window processing unit 13 determines as NO in S13. Then, the processing proceeds to record input processing (S1).

Before executing the processing in S1, the record input unit 12 deletes the record inputted this time (record of January 1) from the RAM 102.

(Record of January 3rd)

The record input unit 12 inputs one record from the processing apparatus MA of FIG. 4 and temporarily stores the input record into the RAM 102 (S1). The input record is a record including the date "January 3", the sales "100", the special flag "0", the window start number (start flag) "1", and the window end number (end flag) "−1".

Figure 23:
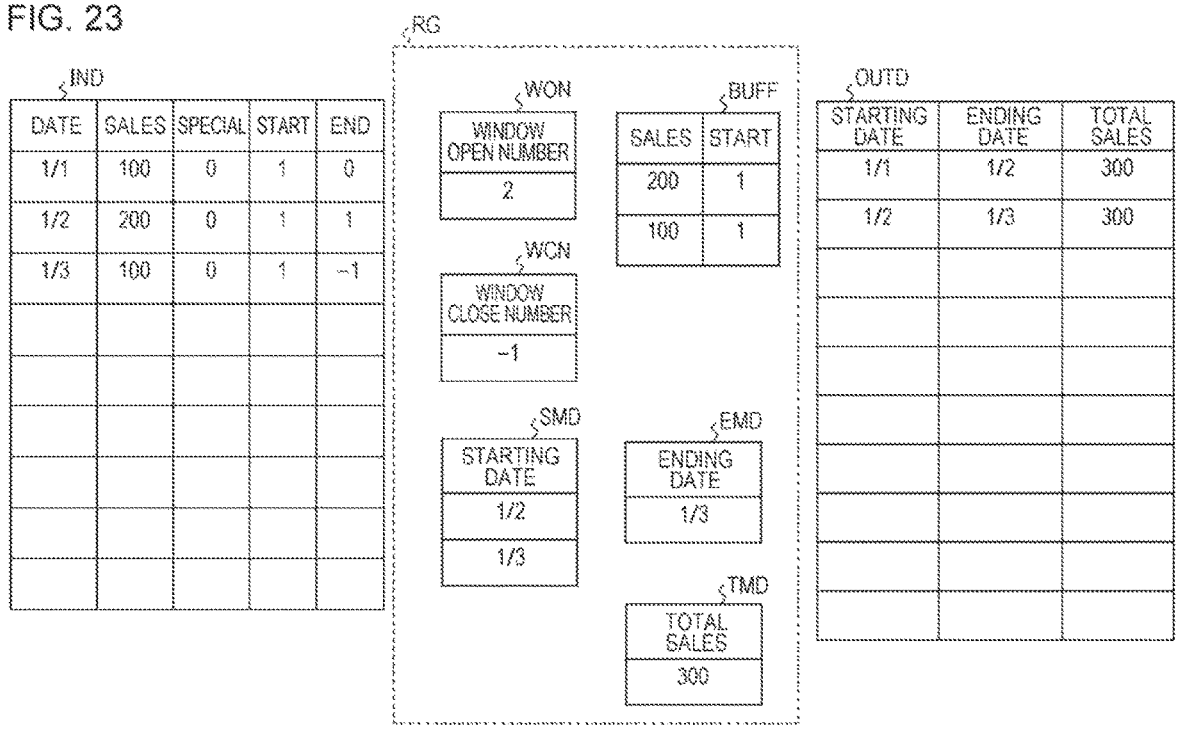
FIG. 23 is a fifth diagram specifically illustrating data processing according to the present embodiment.

In the input record table IND of FIG. 23, the sales record of January 3rd is shown in the fourth line. Specifically, the fourth line stores "January 3" in the date field, "100" in the sales field, "0" in the special field, "1" in the start field, and "−1" in the end field.

The input record of January 3 does not include window reset information (or, special flag "1"). The window start number of the input record is "1". The window start number of the input record is not an infinite code (for example, "−1"), or the window open number WON is not an infinite code (see FIG. 22). Therefore, the window processing unit 13 determines NO in S2, YES in S3 and NO in S6. Then, the window processing unit 13 adds the window start number "1" of the input record to the window open number WON "1" (see FIG. 22) to get the window open number WON "2" as illustrated in FIG. 23 (S8).

Reference is made to FIG. 23. In accordance with the query C, the window processing unit 13 additionally stores the date "January 3" of the input record of January 3 into the RAM 102 as the starting date SMD, and stores the date "January 3" of the input record into the RAM 102 as the ending date EMD by overwriting (S9). Then, in accordance with the query C, the intermediate data processing unit 14 adds the sales "100" of the input record to the current total sales TMD "200", and stores into the RAM 102 as the total sales TMD "300" (S9).

Since the window open number WON is "2" and not an infinite code, the window processing unit 13 determines as YES in S10. As illustrated in FIG. 23, the intermediate data processing unit 14 stores the sales "100" of the input record of January 3 into the sales field of the buffer BUFF, and stores the window start number "1" of the input record into the start field of the buffer BUFF (S11). As illustrated in FIG. 23, the window processing unit 13 sets the window end number "−1" of the input record to the window close number WCN (S12).

Since the window close number WCN is "−1" and the window open number WON is "2", the window processing unit 13 determines as YES in S13.

The intermediate data processing unit 14 generates output data from the intermediate data (starting date SMD "January 2", ending date EMD "January 3", and total sales TMD "300") of the RAM 102, and the data output unit 15 outputs the output data to the terminal apparatus TA (S14). The output data includes the starting date "January 2", the ending date "January 3" and the total sales "300". The output data is shown in the third line of the output data table OUTD of FIG. 23. Specifically, in the output data table OUTD of FIG. 23, the third line stores "January 2" in the starting date field, "January 3" in the ending date field, and "300" in the total sales field.

As described above, the window processing unit 13 establishes the window start point in the record of January 2 by storing January 2 into the RAM 102 as the starting date SMD. The window processing unit 13 establishes the window end point in the record of January 3 by storing January 3 into the RAM 102 as the ending date EMD. Then, the intermediate data processing unit 14 calculates the sum "300" of the sales "200" of the record of January 2 and the sales "100" of the record of January 3. The data output unit 15 outputs start "January 2" and end "January 3" of data processing and the sum "300".

In FIG. 23, the window close number WCN is "−1". Therefore, the window processing unit 13 determines NO in S15, and the processing proceeds to S17.

Then, in FIG. 23, the window open number WON is "2". Therefore, the window processing unit 13 determines as YES in S17, and subtracts one from the window open number WON "2" (see FIG. 23) to get the window open number WON "1" as illustrated in FIG. 24 (S18).

Then, in FIG. 23, the buffer BUFF is not empty. Therefore, the window processing unit 13 determines YES in S19, and subtracts one from the window start number "1" (see FIG. 23) stored in the head of the buffer BUFF to get the window start number "0" (see FIG. 24") (S20).

Figure 24:
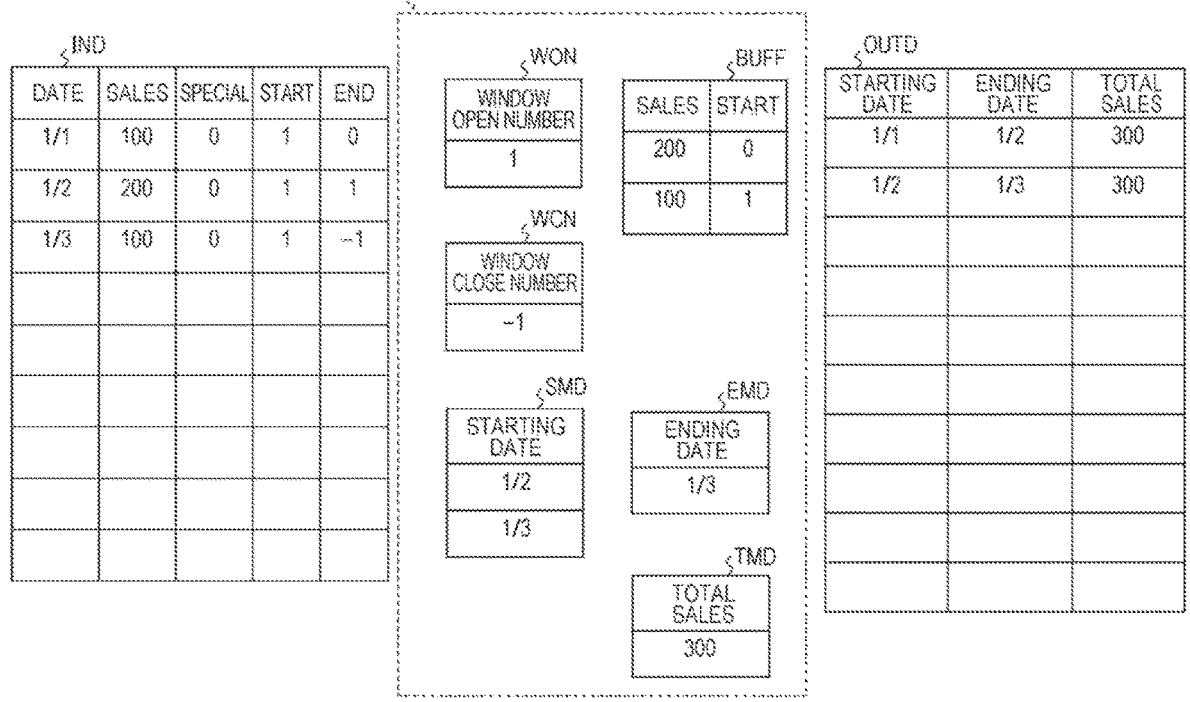
FIG. 24 is a sixth diagram specifically illustrating data processing according to the present embodiment.

As illustrated in FIG. 24, the window start number stored in the head of the buffer BUFF is "0". Therefore, the intermediate data processing unit 14 determines YES in S21, and updates the intermediate data based on the data stored in the head of the buffer BUFF and deletes the data stored in the head of the buffer BUFF from the buffer BUFF (S22).

Specifically, the intermediate data processing unit 14 subtracts the sales "200" (see FIG. 24) out of data (sales "200", window start number "1") stored in the head of the buffer BUFF from the total sales TMD "300" (see FIG. 24) of the intermediate data to get the total sales TMD "100" (see FIG. 25) of the intermediate data.

Figure 25:
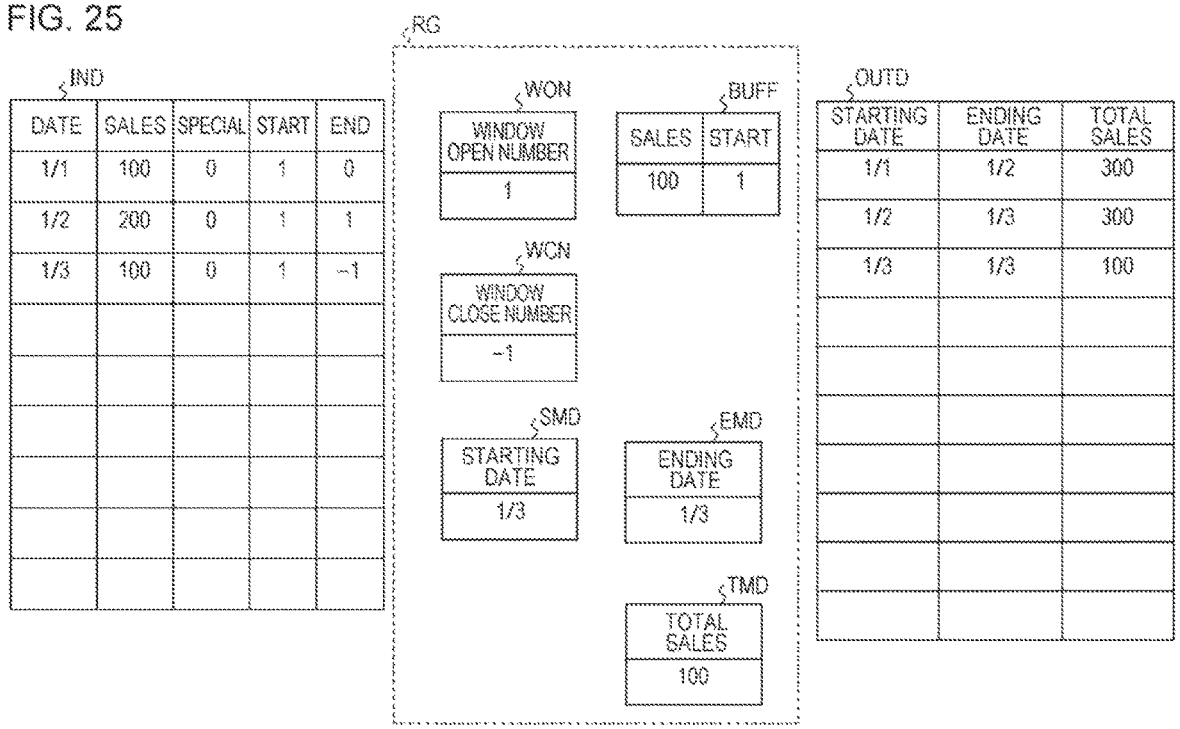
FIG. 25 is a seventh diagram specifically illustrating data processing according to the present embodiment.

Next, the intermediate data processing unit 14 deletes the starting date "January 2" (see FIG. 24) in the head of the starting date SMD in the intermediate data to get the starting date "January 3" (see FIG. 25).

Next, the intermediate data processing unit 14 deletes data (sales "200", window start number "0" (see FIG. 24)) stored in the head of the buffer BUFF and changes data stored in the buffer BUFF to the sales "100" and the window start number "1" (see FIG. 25).

As illustrated in FIG. 25, the buffer BUFF is not empty. Therefore, the intermediate data processing unit 14 determines as YES in S23, and the processing proceeds to S21. The window start number stored in the head of the buffer BUFF is "1". Therefore, the window processing unit 13 determines NO in S21, and the processing proceeds to S13.

As illustrated in FIG. 25, the window close number WCN is "−1", and the window open number WON is "1". That is, the window close number WCN is not "0", and the window open number WON is not "0". Therefore, the window processing unit 13 determines YES in S13.

The intermediate data processing unit 14 generates output data from the intermediate data (starting date SMD "January 3", ending date EMD "January 3", and total sales TMD "100") of the RAM 102, and the data output unit 15 outputs the output data to the terminal apparatus TA (S14). The output data includes the starting date "January 3", the ending date "January 3" and the total sales "100". The output data is shown in the fourth line of the output data table OUTD of FIG. 25. Specifically, in the output data table OUTD of FIG. 25, the third line stores "January 3" in the starting date field, "January 3" in the ending date field, and "100" in the total sales field.

As described above, the window end number of the record of January 3 is the infinite code "−1", and the window start number of the record of January 3 is "1". Therefore, the window processing unit 13 establishes the window start point in the record of January 3 by storing January 3 into the RAM 102 as the starting date SMD. The window processing unit 13 establishes the window end point in the record of January 3 by storing January 3 into the RAM 102 as the ending date EMD. Then, the data output unit 15 outputs the sales "100" of the record of January 3.

In FIG. 25, the window close number WCN is "−1". That is, the window close number WCN is an infinite code. Therefore, the window processing unit 13 determines NO in S15, and the processing proceeds to S17. In FIG. 25, the window open number WON is "1". Therefore, the window processing unit 13 determines as YES in S17, and subtracts one from the window open number WON "1" (see FIG. 25) to get the window open number WON "0" as illustrated in FIG. 26 (S18).

Then, in FIG. 25, the buffer BUFF is not empty. Therefore, the window processing unit 13 determines YES in S19, and subtracts one from the window start number "1" (see FIG. 25) stored in the head of the buffer BUFF to get the window start number "0" (see FIG. 26) (S20).

Figure 26:
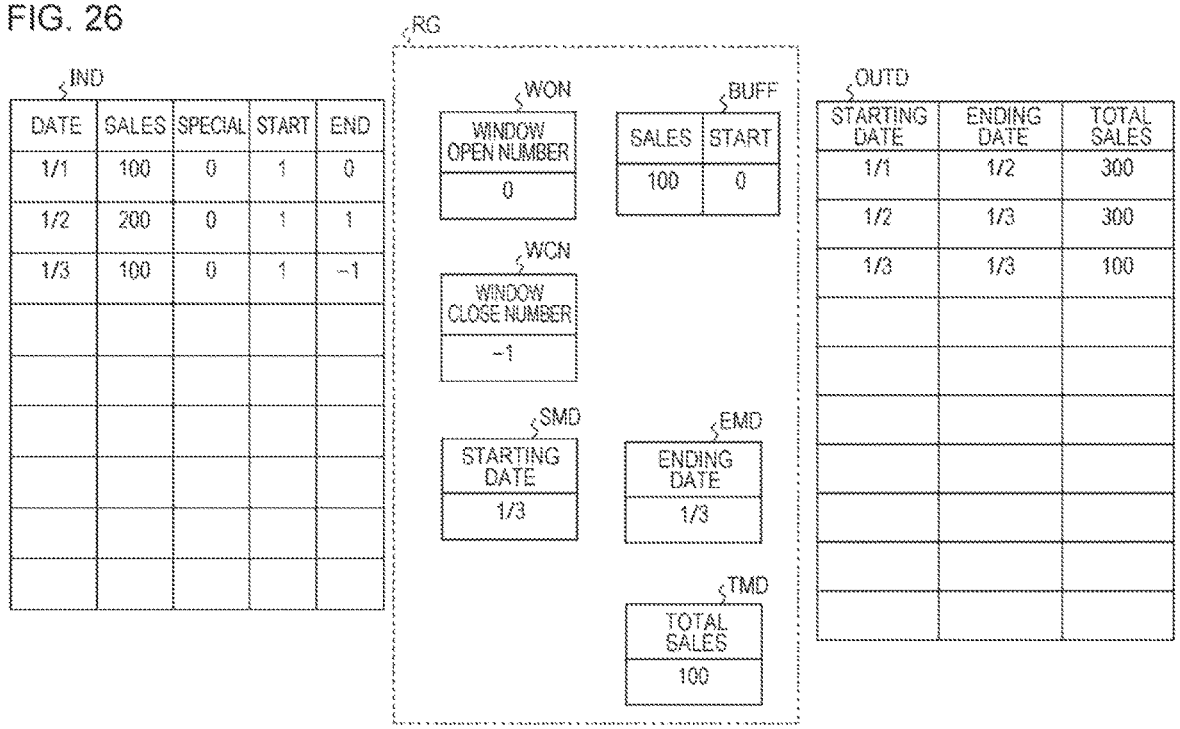
FIG. 26 is an eighth diagram specifically illustrating data processing according to the present embodiment.

Then, as illustrated in FIG. 26, the window start number stored in the head of the buffer BUFF is "0". Therefore, the intermediate data processing unit 14 determines YES in S21, and updates the intermediate data based on the data stored in the head of the buffer BUFF and deletes the data stored in the head of the buffer BUFF from the buffer BUFF (S22).

Specifically, the intermediate data processing unit 14 subtracts the sales "100" (see FIG. 26) out of data (sales "100", window start number "0") stored in the head of the buffer BUFF from the total sales TMD "100" (see FIG. 26) of the intermediate data to get the total sales TMD "0" (see FIG. 27) of the intermediate data.

Figure 27:
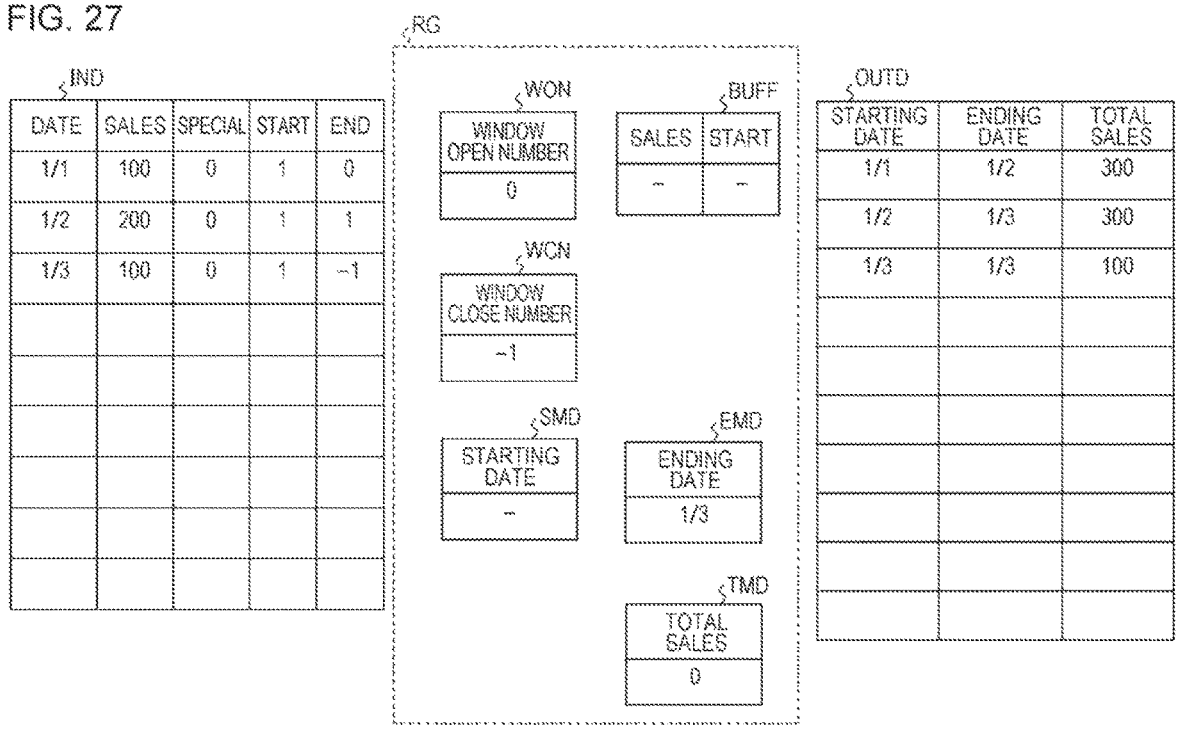
FIG. 27 is a ninth diagram specifically illustrating data processing according to the present embodiment.

Next, the intermediate data processing unit 14 deletes the starting date "January 3" (see FIG. 26) in the head of the starting date SMD in the intermediate data as illustrated in FIG. 27.

Next, the intermediate data processing unit 14 deletes data (sales "100", window start number "0" (see FIG. 26)) stored in the head of the buffer BUFF to empty the buffer BUFF (see FIG. 27).

As illustrated in FIG. 27, the buffer BUFF is empty. Therefore, the intermediate data processing unit 14 determines as NO in S23, and the processing proceeds to S13. Since the window open number WON is "0" (see FIG. 27), the window processing unit 13 determines as NO in S13. Then, the processing proceeds to record input processing (S1). Before executing the processing in S1, the record input unit 12 deletes the record inputted this time (record of January 3) from the RAM 102.

(Record of January 4th)

The record input unit 12 inputs one record from the processing apparatus MA of FIG. 4 and temporarily stores the input record into the RAM 102 (S1). The input record is a record including the date "January 4", the sales "130", the special flag "0", the window start number (start flag) "2", and the window end number (end flag) "1".

Figure 28:
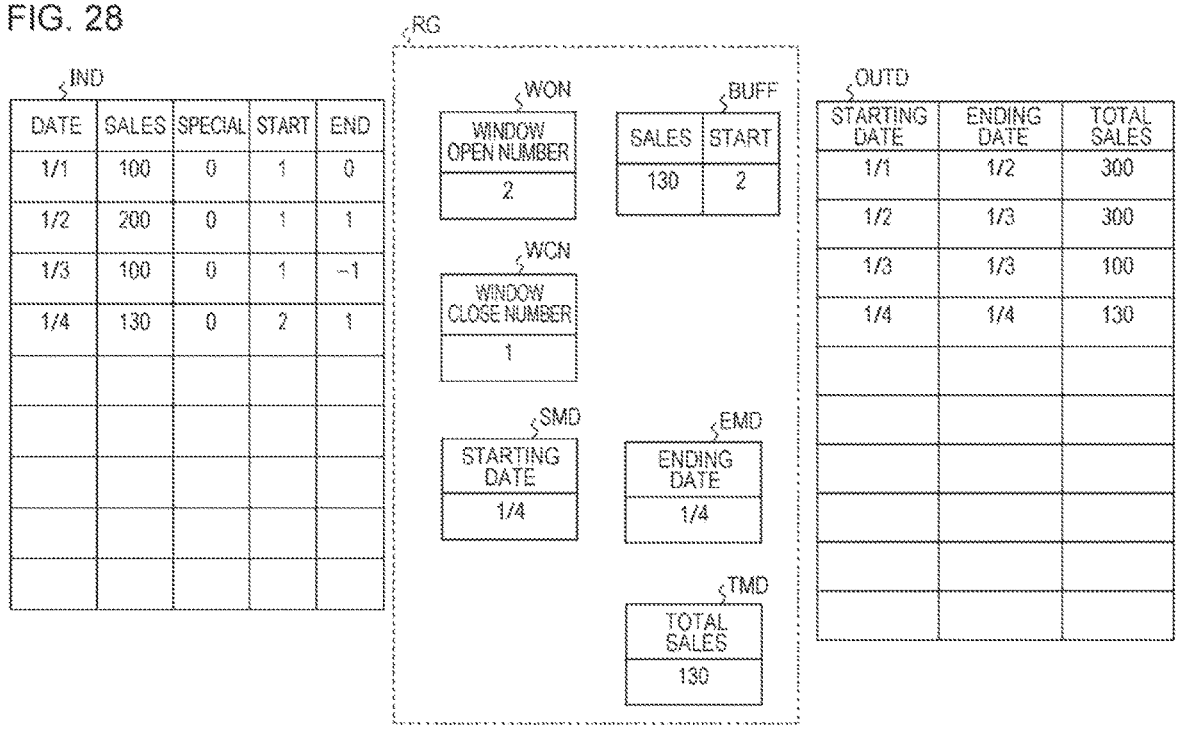
FIG. 28 is a tenth diagram specifically illustrating data processing according to the present embodiment.

In the input record table IND of FIG. 28, the sales record of January 4th is shown in the fifth line. Specifically, the fifth line stores "January 4" in the date field, "130" in the sales field, "0" in the special field, "2" in the start field, and "1" in the end field.

The input record of January 4 does not include window reset information (or, special flag "1"). The window start number of the input record is "2". The window start number of the input record is not an infinite code (for example, "−1"), or the window open number WON is not an infinite code (see FIG. 27). Therefore, the window processing unit 13 determines NO in S2, YES in S3 and NO in S6. Then, the window processing unit 13 adds the window start number "2" of the input record to the window open number WON "0" (see FIG. 27) to get the window open number WON "2" as illustrated in FIG. 28 (S8).

Reference is made to FIG. 28. In accordance with the query C, the window processing unit 13 additionally stores the starting date "January 4" of the input record of January 4 into the RAM 102 as the starting date SMD, and stores the date "January 4" of the input record into the RAM 102 as the ending date EMD by overwriting (S9). Then, in accordance with the query C, the intermediate data processing unit 14 adds the sales "130" of the input record to the current total sales TMD "0", and stores into the RAM 102 as the total sales TMD "130" (S9).

In FIG. 28, the window open number WON is "2" and not an infinite code. Therefore, the window processing unit 13 determines as YES in S10. As illustrated in FIG. 28, the intermediate data processing unit 14 stores the sales "130" of the input record of January 4 into the sales field of the buffer BUFF, and stores the window start number "2" of the input record into the start field of the buffer BUFF (S11). As illustrated in FIG. 28, the window processing unit 13 sets the window end number "1" of the input record to the window close number WCN (S12).

Since the window close number WCN is "1" and the window open number WON is "2", the window processing unit 13 determines as YES in S13.

The intermediate data processing unit 14 generates output data from the intermediate data (starting date SMD "January 4", ending date EMD "January 4", and total sales TMD "130") of the RAM 102, and the data output unit 15 outputs the output data to the terminal apparatus TA (S14). The output data includes the starting date "January 4", the ending date "January 4" and the total sales "130". The output data is shown in the fourth line in the output data table OUTD of FIG. 28. Specifically, in the output data table OUTD of FIG. 28, the third line stores "January 4" in the starting date field, "January 4" in the ending date field, and "130" in the total sales field.

As described above, the window start number of the record of January 4 is "2", and the window end number of the record of January 4 is "1". Therefore, the window processing unit 13 establishes the window start point in the record of January 4 by storing January 4 into the RAM 102 as the starting date SMD. The window processing unit 13 establishes the window end point in the record of January 4 by storing January 4 into the RAM 102 as the ending date EMD. Then, the data output unit 15 outputs the sales "130" of the record of January 4.

In FIG. 28, the window close number WCN is "1". Therefore, the window processing unit 13 determines as YES in S15, and subtracts one from the window close number WCN "1" (see FIG. 28) to get the window close number WCN "0" as illustrated in FIG. 29 (S16).

Then, in FIG. 28, the window open number WON is "2". Therefore, the window processing unit 13 determines as YES in S17, and subtracts one from the window open number WON "2" (see FIG. 28) to get the window open number WON "1" as illustrated in FIG. 29 (S18).

Then, in FIG. 28, the buffer BUFF is not empty. Therefore, the window processing unit 13 determines YES in S19, and subtracts one from the window start number "2" (see FIG. 28) stored in the head of the buffer BUFF to get the window start number "1" (see FIG. 29") (S20).

Figure 29:
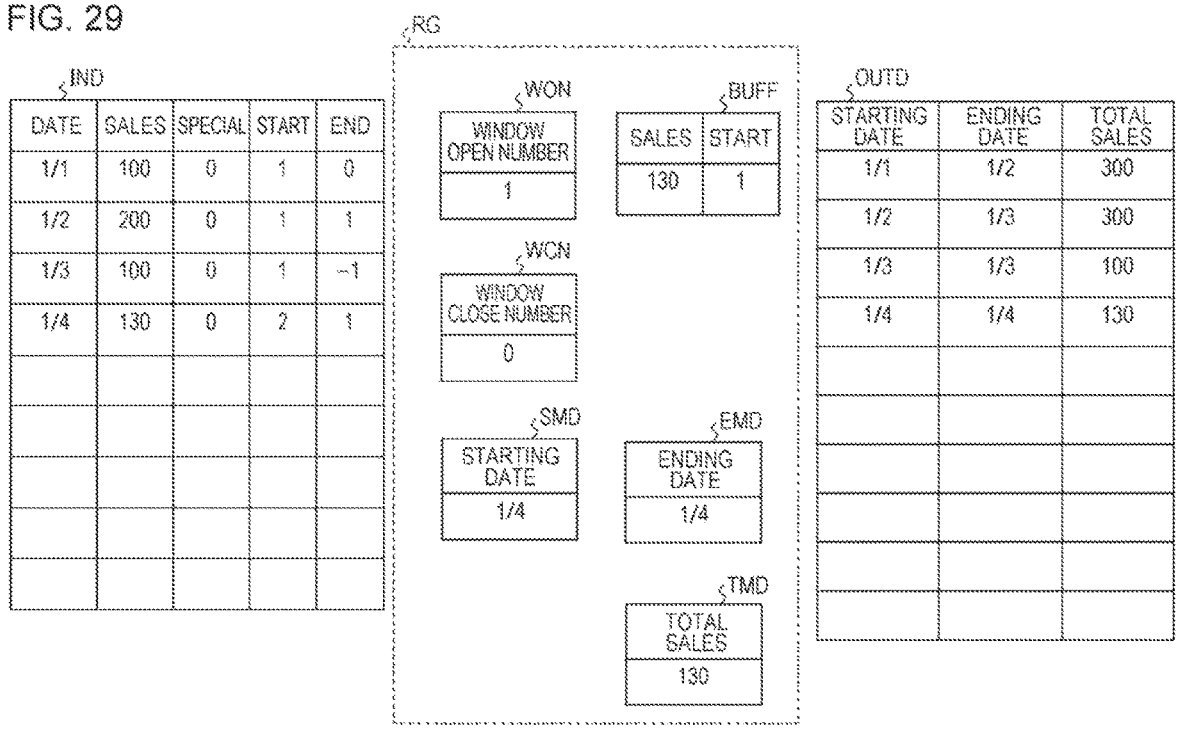
FIG. 29 is an eleventh diagram specifically illustrating data processing according to the present embodiment.

As illustrated in FIG. 29, the window start number stored in the head of the buffer BUFF is "1". Therefore, the intermediate data processing unit 14 determines as NO in S21.

Since the window close number WCN is "0", the window processing unit 13 determines as NO in S13. Then, the processing proceeds to record input processing (S1). Before executing the processing in S1, the record input unit 12 deletes the record inputted this time (record of January 4) from the RAM 102.

(Record of January 5th)

The record input unit 12 inputs one record from the processing apparatus MA of FIG. 4 and temporarily stores the input record into the RAM 102 (S1). The input record is a record including the date "January 5", the sales "200", the special flag "0", the window start number (start flag) "2", and the window end number (end flag) "2".

Figure 30:
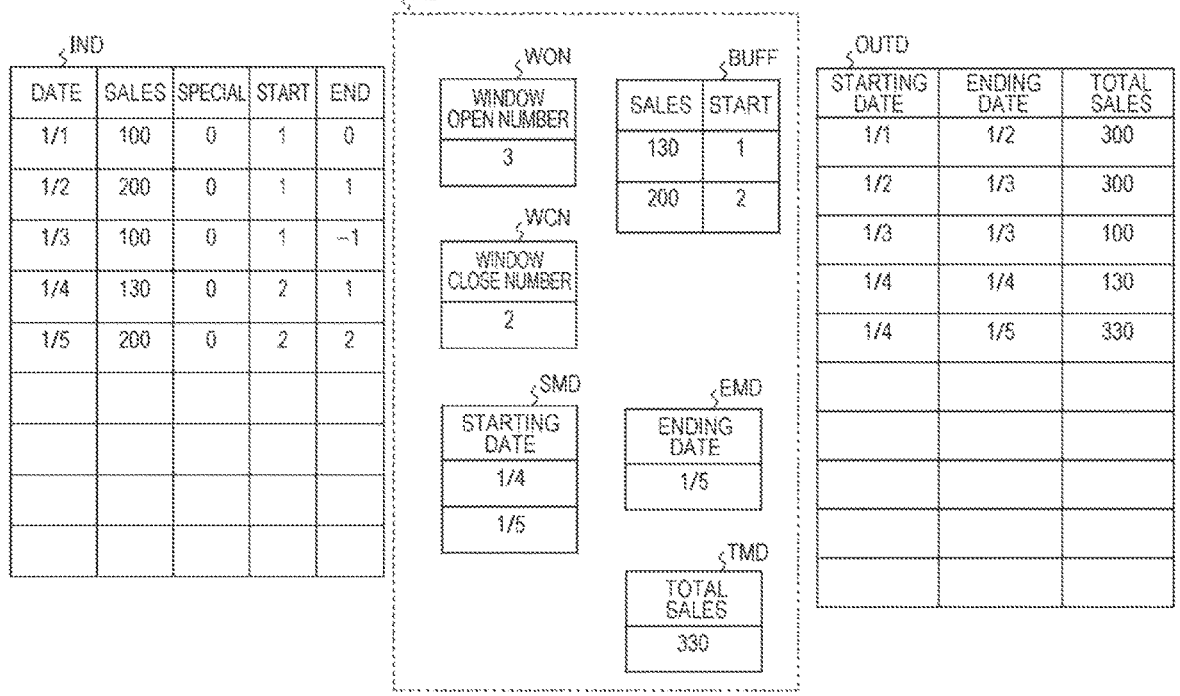
FIG. 30 is a twelfth diagram specifically illustrating data processing according to the present embodiment.

In the input record table IND of FIG. 30, the sales record of January 5th is shown in the sixth line. Specifically, the sixth line stores "January 5" in the date field, "200" in the sales field, "0" in the special field, "2" in the start field, and "2" in the end field.

The input record of January 5 does not include window reset information (or, special flag "1"). The window start number of the input record is "2". The window start number of the input record is not an infinite code (for example, "−1"), or the window open number WON is not an infinite code (see FIG. 29). Therefore, the window processing unit 13 determines NO in S2, YES in S3 and NO in S6. Then, the window processing unit 13 adds the window start number "2" of the input record to the window open number WON "1" (see FIG. 29) to get the window open number WON "3" as illustrated in FIG. 30 (S8).

Reference is made to FIG. 30. In accordance with the query C, the window processing unit 13 additionally stores the starting date "January 5" of the input record of January 5 into the RAM 102 as the starting date SMD, and stores the date "January 5" of the input record into the RAM 102 as the ending date EMD by overwriting (S9). Then, in accordance with the query C, the intermediate data processing unit 14 adds the sales "200" of the input record to the current total sales TMD "130" (see FIG. 29), and stores into the RAM 102 as the total sales TMD "330" (S9).

In FIG. 30, the window open number WON is "3" and not an infinite code. Therefore, the window processing unit 13 determines as YES in S10. As illustrated in FIG. 30, the intermediate data processing unit 14 stores the sales "200" of the input record of January 5 into the sales field of the buffer BUFF, and stores the window start number "2" of the input record into the start field of the buffer BUFF (S11). As illustrated in FIG. 30, the window processing unit 13 sets the window end number "2" of the input record to the window close number WCN (S12).

Since the window close number WCN is "2" and the window open number WON is "3", the window processing unit 13 determines as YES in S13.

The intermediate data processing unit 14 generates output data from the intermediate data (starting date SMD "January 4", ending date EMD "January 5", and total sales TMD "330") of the RAM 102, and the data output unit 15 outputs the output data to the terminal apparatus TA (S14). The output data includes the starting date "January 4", the ending date "January 5" and the total sales "330". The output data is shown in the sixth line of the output data table OUTD of FIG. 30. Specifically, in the output data table OUTD of FIG. 30, the sixth line stores "January 4" in the starting date field, "January 5" in the ending date field, and "330" in the total sales field.

As described above, the window open number of the record of January 4 is "2", and the window end number of the record of January 4 is "1". The window start number of the record of January 5 is "2", and the window end number of the record of January 5 is "2". Therefore, the window processing unit 13 establishes the window start point in the record of January 4 by storing January 4 into the RAM 102 as the starting date SMD. The window processing unit 13 establishes the window end point in the record of January 5 by storing January 5 into the RAM 102 as the ending date EMD. The intermediate data processing unit 14 calculates the sum "330" of the sales "130" of the record of January 4 and the sales "200" of the record of January 5. The data output unit 15 outputs start "January 4" and end "January 5" of data processing and the sum "330".

In FIG. 30, the window close number WCN is "2". Therefore, the window processing unit 13 determines as YES in S15, and subtracts one from the window close number WCN "2" (see FIG. 30) to get the window close number WCN "1" as illustrated in FIG. 31 (S16).

Then, in FIG. 30, the window open number WON is "3". Therefore, the window processing unit 13 determines as YES in S17, and subtracts one from the window open number WON "3" (see FIG. 30) to get the window open number WON "2" as illustrated in FIG. 31 (S18).

Then, in FIG. 30, the buffer BUFF is not empty. Therefore, the window processing unit 13 determines YES in S19. Then, the window processing unit 13 subtracts one from the window start number "1" (see FIG. 30) stored in the head of the buffer BUFF to get the window start number "0" (see FIG. 31) (S20).

Figure 31:
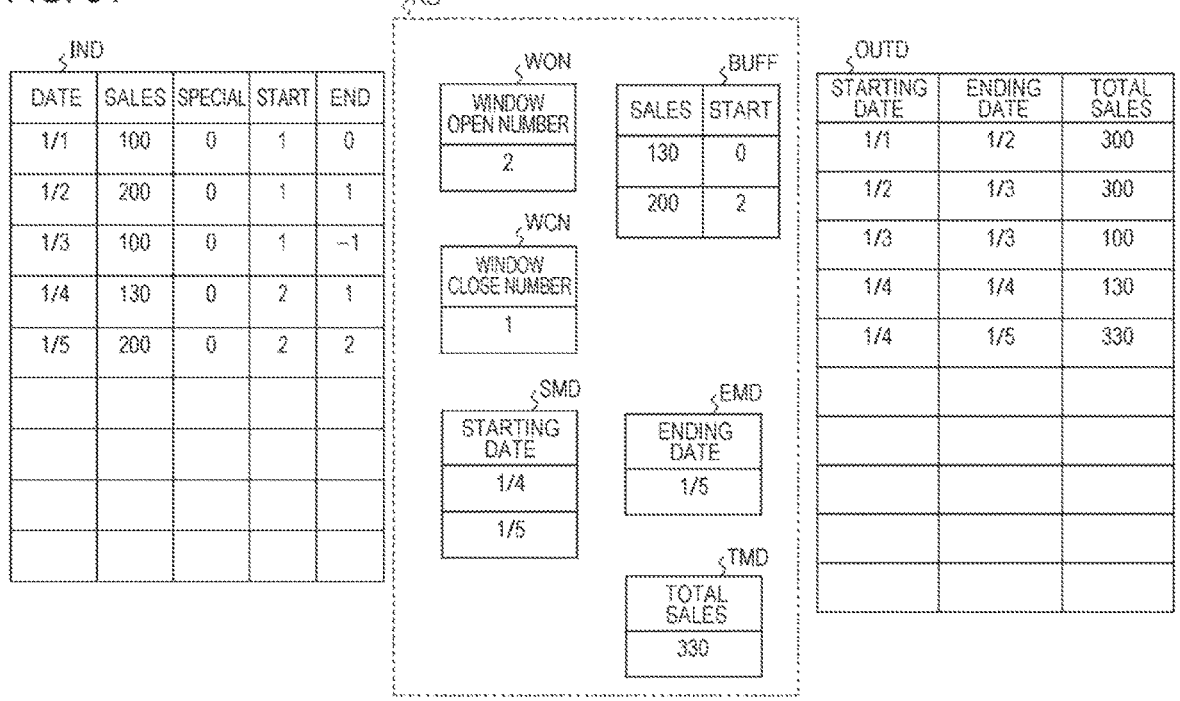
FIG. 31 is a thirteenth diagram specifically illustrating data processing according to the present embodiment.

As illustrated in FIG. 31, the window start number stored in the head of the buffer BUFF is "0". Therefore, the intermediate data processing unit 14 determines YES in S21, and updates the intermediate data based on the data stored in the head of the buffer BUFF and deletes the data stored in the head of the buffer BUFF from the buffer BUFF (S22).

Specifically, the intermediate data processing unit 14 subtracts the sales "130" (see FIG. 31) out of data (sales "130", window start number "0") stored in the head of the buffer BUFF from the total sales TMD "330" (see FIG. 31) of the intermediate data to get the total sales TMD "200" (see FIG. 32) of the intermediate data.

Figure 32:
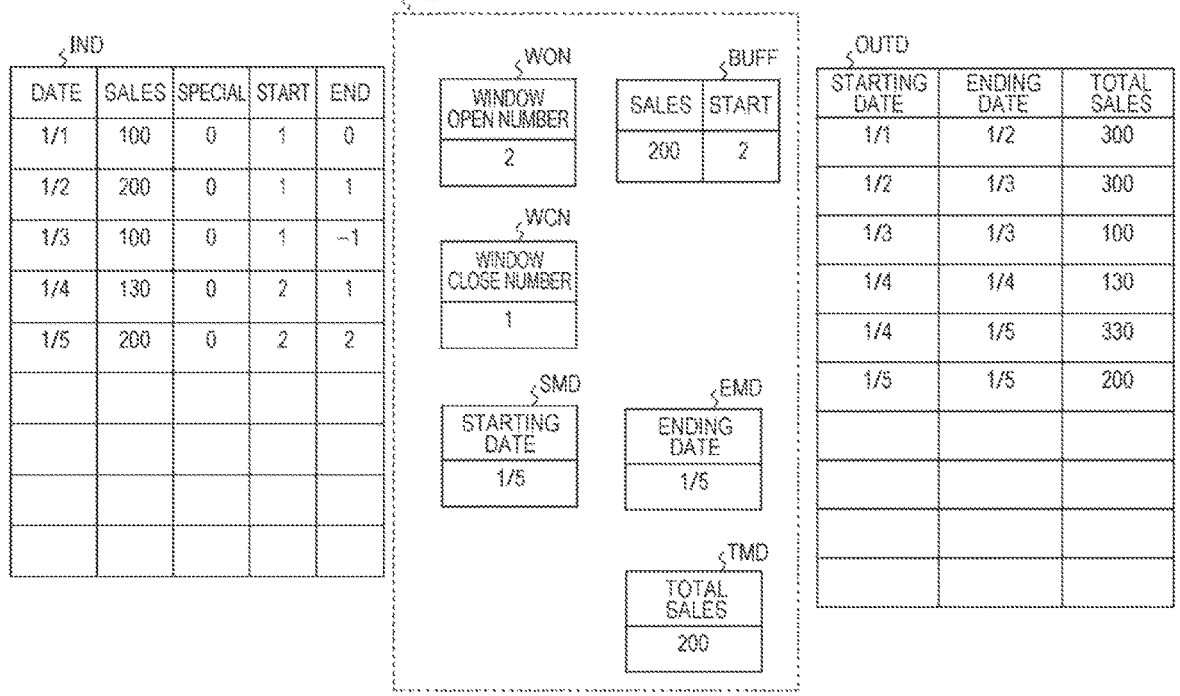
FIG. 32 is a fourteenth diagram specifically illustrating data processing according to the present embodiment.

Next, the intermediate data processing unit 14 deletes the starting date "January 4" (see FIG. 31) in the head of the starting date SMD in the intermediate data to get the starting date "January 5" (see FIG. 32).

Next, the intermediate data processing unit 14 deletes data (sales "130", window start number "0" (see FIG. 31)) stored in the head of the buffer BUFF to change data stored in the buffer BUFF to the sales "200" and the window start number "2" (see FIG. 32).

As illustrated in FIG. 32, the buffer BUFF is not empty. Therefore, the intermediate data processing unit 14 determines as YES in S23, and the processing proceeds to S21. The window start number stored in the head of the buffer BUFF is "2". Therefore, the window processing unit 13 determines NO in S21, and the processing proceeds to S13.

As illustrated in FIG. 32, the window close number WCN is "1", and the window open number WON is "2". That is, the window close number WCN is not "0", and the window open number WON is not "0". Therefore, the window processing unit 13 determines YES in S13.

The intermediate data processing unit 14 generates output data from the intermediate data (starting date SMD "January 5", ending date EMD "January 5", and total sales TMD "200") of the RAM 102, and the data output unit 15 outputs the output data to the terminal apparatus TA (S14). The output data includes the starting date "January 5", the ending date "January 5" and the total sales "200". The output data is shown in the seventh line in the output data table OUTD of FIG. 32. Specifically, in the output data table OUTD of FIG. 32, the seventh line stores "January 5" in the starting date field, "January 5" in the ending date field, and "200" in the total sales field.

As described above, the window start number of the record of January 5 is "2", and the window end number of the record of January 5 is "2". Therefore, the window processing unit 13 establishes the window start point in the record of January 5 by storing January 5 into the RAM 102 as the starting date SMD. The window processing unit 13 establishes the window end point in the record of January 5 by storing January 5 into the RAM 102 as the ending date EMD. Then, the data output unit 15 outputs the sales "200" of the record of January 5.

In FIG. 32, the window close number WCN is "1". Therefore, the window processing unit 13 determines as YES in S15, and subtracts one from the window close number WCN "1" (see FIG. 32) to get the window close number WCN "0" as illustrated in FIG. 33 (S16).

In FIG. 32, the window open number WON is "2". Therefore, the window processing unit 13 determines as YES in S17, and subtracts one from the window open number WON "2" (see FIG. 32) to get the window open number WON "1" as illustrated in FIG. 33 (S18).

Figure 33:
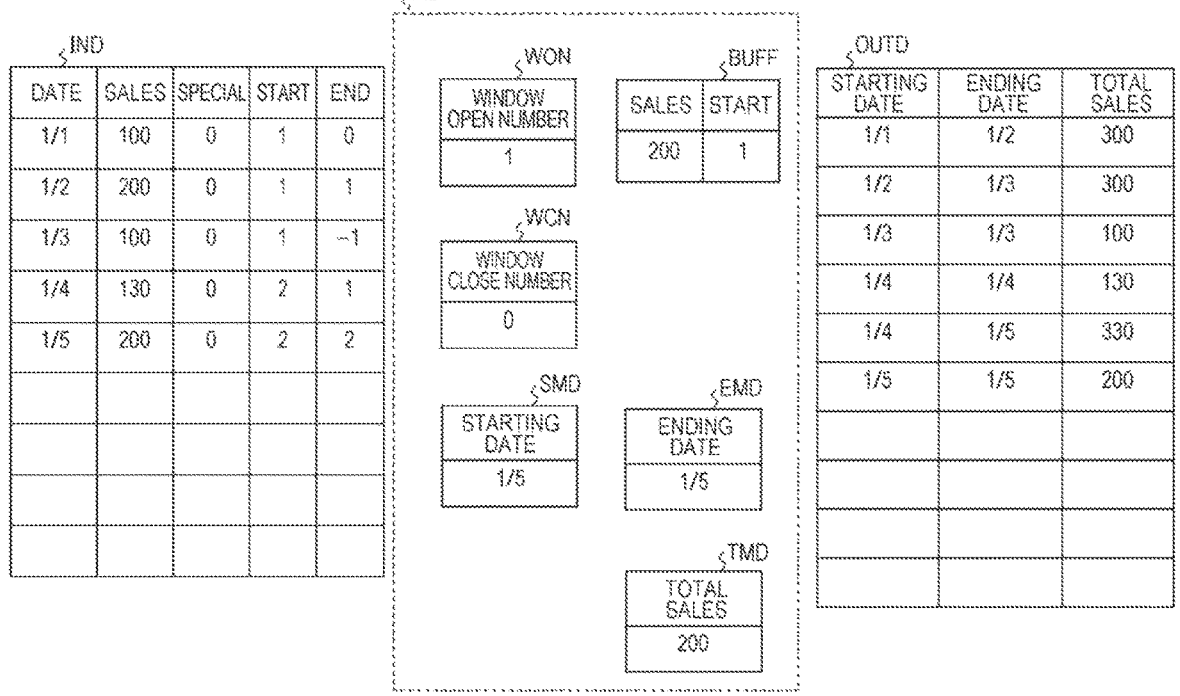
FIG. 33 is a fifteenth diagram specifically illustrating data processing according to the present embodiment.

Then, in FIG. 33, the buffer BUFF is not empty. Therefore, the window processing unit 13 determines YES in S19, and subtracts one from the window start number "2" (see FIG. 32) stored in the head of the buffer BUFF to get the window start number "1" (see FIG. 33") (S20).

As illustrated in FIG. 33, the window start number stored in the head of the buffer BUFF is "1". Therefore, the intermediate data processing unit 14 determines as NO in S21, and the processing proceeds to S13.

Since the window close number WCN is "0" as illustrated in FIG. 33, the window processing unit 13 determines as NO in S13. Then, the processing proceeds to record input processing (S1). Before executing the processing in S1, the record input unit 12 deletes the record inputted this time (record of January 5) from the RAM 102.

(Record of January 6th)

The record input unit 12 inputs one record from the processing apparatus MA of FIG. 4 and temporarily stores the input record into the RAM 102 (S1). The input record is a record including the date "January 6", the sales "220", the special flag "0", the window start number (start flag) "−1", and the window end number (end flag) "1".

Figure 34:
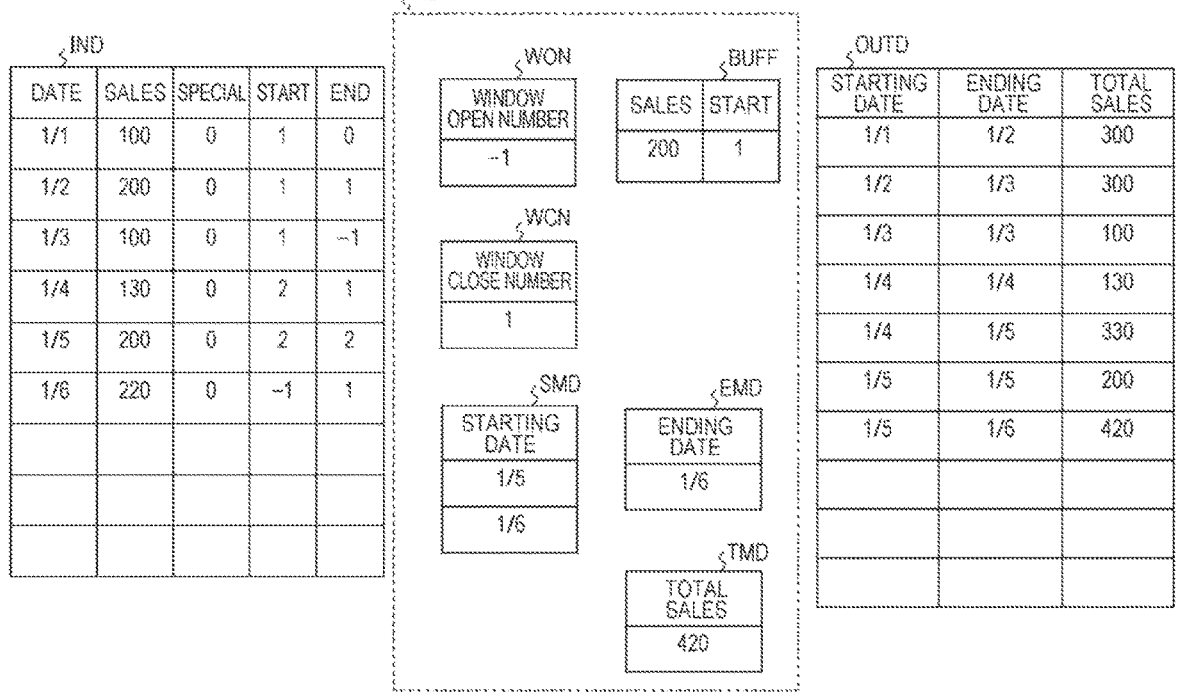
FIG. 34 is a sixteenth diagram specifically illustrating data processing according to the present embodiment.

In the input record table IND of FIG. 34, the sales record of January 6th is shown in the seventh line. Specifically, the seventh line stores "January 6" in the date field, "220" in the sales field, "0" in the special field, "−1" in the start field, and "1" in the end field.

The input record of January 6 does not include window reset information (or, special flag "1"). The window start number of the input record is "−1". That is, the window start number of the input record is an infinite code.

Therefore, the window processing unit 13 determines NO in S2, YES in S3 and YES in S6. Then, the window processing unit 13 sets the window open number WON to the infinite code ("−1") as illustrated in FIG. 34 (S7).

Reference is made to FIG. 34. In accordance with the query C, the window processing unit 13 additionally stores the starting date "January 6" of the input record of January 6 into the RAM 102 as the starting date SMD, and stores the date "January 6" of the input record into the RAM 102 as the ending date EMD by overwriting (S9). Then, in accordance with the query C, the intermediate data processing unit 14 adds the sales "220" of the input record to the current total sales TMD "200" (see FIG. 33), and stores into the RAM 102 as the total sales TMD "420" (S9).

In FIG. 34, the window open number WON is "−1", which is the infinite code. Therefore, the window processing unit 13 determines NO in S10, and the processing proceeds to S12. The window processing unit 13 sets the window end number "1" of the input record to the window close number WCN, as illustrated in FIG. 34 (S12).

Since the window close number WCN is "1" and the window open number WON is "−1", the window processing unit 13 determines as YES in S13.

The intermediate data processing unit 14 generates output data from the intermediate data (starting date SMD "January 5", "January 6", ending date EMD "January 6", and total sales TMD "420") of the RAM 102, and the data output unit 15 outputs the output data to the terminal apparatus TA (S14). The output data includes the starting date "January 5", the ending date "January 6" and the total sales "420". The output data is shown in the eighth line in the output data table OUTD of FIG. 34. Specifically, in the output data table OUTD of FIG. 34, the eighth line stores "January 5" in the starting date field, "January 6" in the ending date field, and "420" in the total sales field.

As described above, the window start number of the record of January 5 is "2", and the window end number of the record of January 5 is "2". The window end number of the record of January 6 is "1". Therefore, the window processing unit 13 establishes the window start point in the record of January 5 by storing January 5 into the RAM 102 as the starting date SMD. The window processing unit 13 establishes the window end point in the record of January 6 by storing January 6 into the RAM 102 as the ending date EMD. The intermediate data processing unit 14 calculates the sum "420" of the sales "200" of the record of January 5 and the sales "220" of the record of January 6. The data output unit 15 outputs start "January 5" and end "January 6" of data processing and the sum "420".

In FIG. 34, the window close number WCN is "1". Therefore, the window processing unit 13 determines as YES in S15, and subtracts one from the window close number WCN "1" (see FIG. 34) to get the window close number WCN "0" as illustrated in FIG. 35 (S16).

Then, in FIG. 34, the window open number WON is "−1". That is, the window open number WON is an infinite code. Therefore, the window processing unit 13 determines NO in S17, and the processing proceeds to S19.

In FIG. 34, the buffer BUFF is not empty. Therefore, the window processing unit 13 determines YES in S19. Then, the window processing unit 13 subtracts one from the window start number "1" (see FIG. 34) stored in the head of the buffer BUFF to get the window start number "0" (see FIG. 35") (S20).

Figure 35:
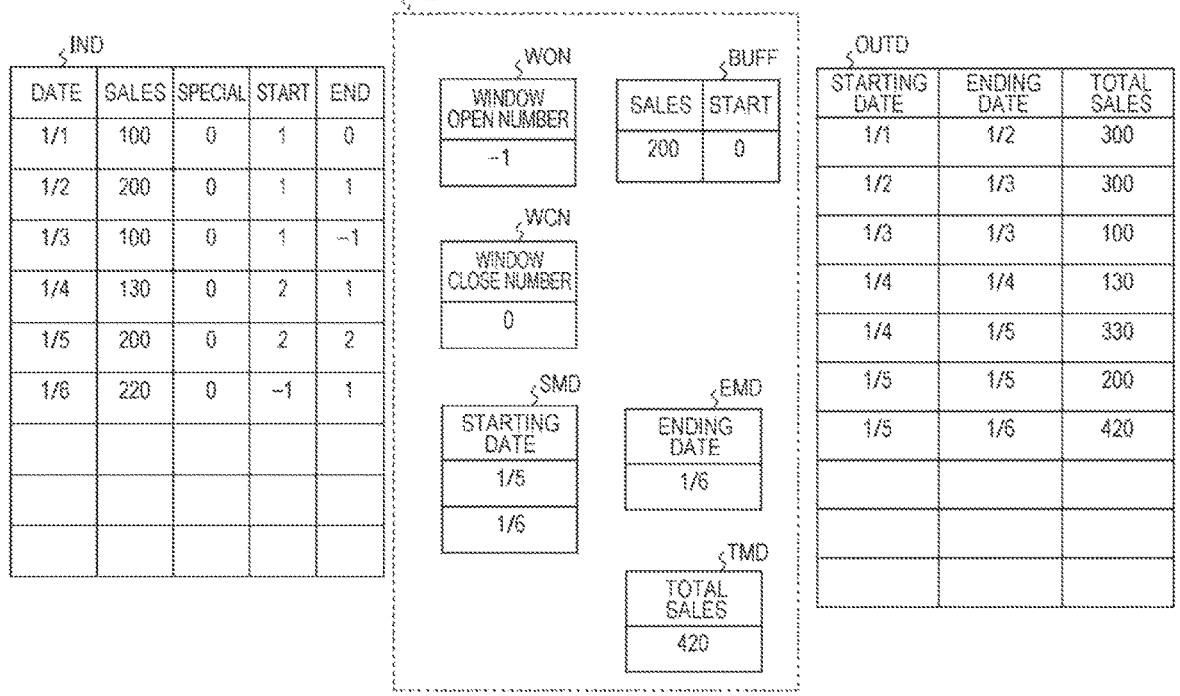
FIG. 35 is a seventeenth diagram specifically illustrating data processing according to the present embodiment.

As illustrated in FIG. 35, the window start number stored in the head of the buffer BUFF is "0". Therefore, the intermediate data processing unit 14 determines YES in S21, and updates the intermediate data based on the data stored in the head of the buffer BUFF and deletes the data stored in the head of the buffer BUFF from the buffer BUFF (S22).

Specifically, the intermediate data processing unit 14 subtracts the sales "200" (see FIG. 35) out of data (sales "200", window start number "0") stored in the head of the buffer BUFF from the total sales TMD "420" (see FIG. 35) of the intermediate data to get the total sales TMD "220" (see FIG. 36) of the intermediate data.

Figure 36:
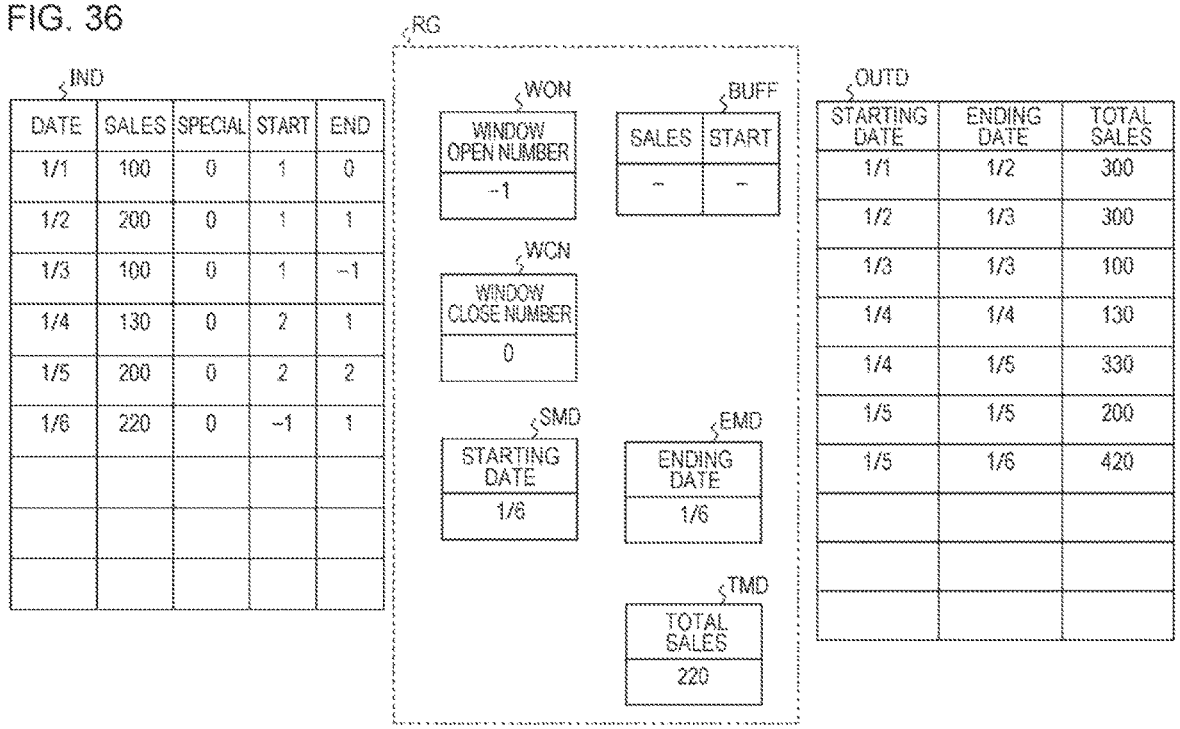
FIG. 36 is an eighteenth diagram specifically illustrating data processing according to the present embodiment.

Next, the intermediate data processing unit 14 deletes the starting date "January 5" (see FIG. 35) in the head of the starting date SMD in the intermediate data to get the starting date "January 6" (see FIG. 36).

Next, the intermediate data processing unit 14 deletes data (sales "200", window start number "0" (see FIG. 35)) stored in the head of the buffer BUFF to empty the buffer BUFF (see FIG. 36).

As illustrated in FIG. 36, the buffer BUFF is empty. Therefore, the intermediate data processing unit 14 determines as NO in S23, and the processing proceeds to S13.

Then, as illustrated in FIG. 36, the window close number WCN is "0". Therefore, the window processing unit 13 determines NO in S13. Then, the processing proceeds to record input processing (S1). Before executing the processing in S1, the record input unit 12 deletes the record inputted this time (record of January 6th) from the RAM 102.

(Record of January 7th)

The record input unit 12 inputs one record from the processing apparatus MA of FIG. 4 and temporarily stores the input record into the RAM 102 (S1). The input record is a record including the date "January 7", the sales "150", the special flag "0", the window start number (start flag) "0", and the window end number (end flag) "1".

Figure 37:
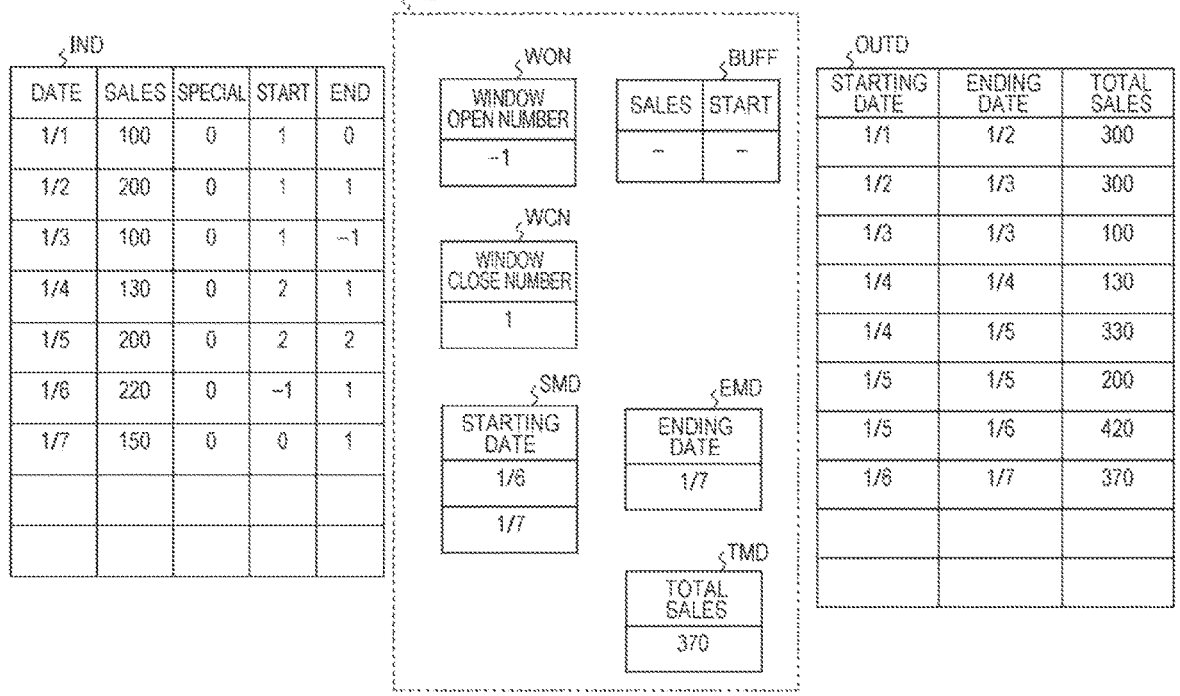
FIG. 37 is a nineteenth diagram specifically illustrating data processing according to the present embodiment.

In the input record table IND of FIG. 37, the sales record of January 7th is shown in the eighth line. Specifically, the eighth line stores "January 7" in the date field, "150" in the sales field, "0" in the special field, "0" in the start field, and "1" in the end field.

The input record of January 7 does not include window reset information (or, special flag "1"). The window start number of the input record is "0". Further, the window open number WON is "−1". Therefore, the window processing unit 13 determines NO in S2, NO in S3 and YES in S4. Then, the processing proceeds to S9.

Reference is made to FIG. 37. In accordance with the query C, the window processing unit 13 additionally stores the starting date "January 7" of the input record of January 7 into the RAM 102 as the starting date SMD, and stores the date "January 7" of the input record into the RAM 102 as the ending date EMD by overwriting (S9). Then, in accordance with the query C, the intermediate data processing unit 14 adds the sales "150" of the input record to the current total sales TMD "220" (see FIG. 36), and stores into the RAM 102 as the total sales TMD "370" (S9).

In FIG. 37, the window open number WON is "−1", which is the infinite code. Therefore, the window processing unit 13 determines NO in S10, and the processing proceeds to S12. As illustrated in FIG. 37, the window processing unit 13 sets the window end number "1" of the input record to the window close number WCN (S12).

Since the window close number WCN is "1" and the window open number WON is "−1", the window processing unit 13 determines as YES in S13.

The intermediate data processing unit 14 generates output data from the intermediate data (starting date SMD "January 6", "January 7", the ending date EMD "January 7", and the total sales TMD "370") of the RAM 102, and the data output unit 15 outputs the output data to the terminal apparatus TA (S14). The output data includes the starting date "January 6", the ending date "January 7" and the total sales "370". The output data is shown in the ninth line of the output data table OUTD of FIG. 37. Specifically, in the output data table OUTD of FIG. 37, the ninth line stores "January 6" in the starting date field, "January 7" in the ending date field, and "370" in the total sales field.

As described above, the window start number of the record of January 6 is "−1" (infinite code), and the window end number of the record of January 6 is "1". The window end number of the record of January 7 is "1". Therefore, the window processing unit 13 establishes the window start point in the record of January 6 by storing January 6 into the RAM 102 as the starting date SMD. The window processing unit 13 establishes the window end point in the record of January 7 by storing January 7 into the RAM 102 as the ending date EMD. The intermediate data processing unit 14 calculates the sum "370" of the sales "220" of the record of January 6 and the sales "150" of the record of January 7. The data output unit 15 outputs start "January 6" and end "January 7" of data processing and the sum "370".

In FIG. 37, the window close number WCN is "1". Therefore, the window processing unit 13 determines as YES in S15, and subtracts one from the window close number WCN "1" (see FIG. 37) to get the window close number WCN "0" as illustrated in FIG. 38 (S16).

Then, in FIG. 37, the window open number WON is "−1". That is, the window open number WON is an infinite code. Therefore, the window processing unit 13 determines NO in S17, and the processing proceeds to S19.

Figure 38:
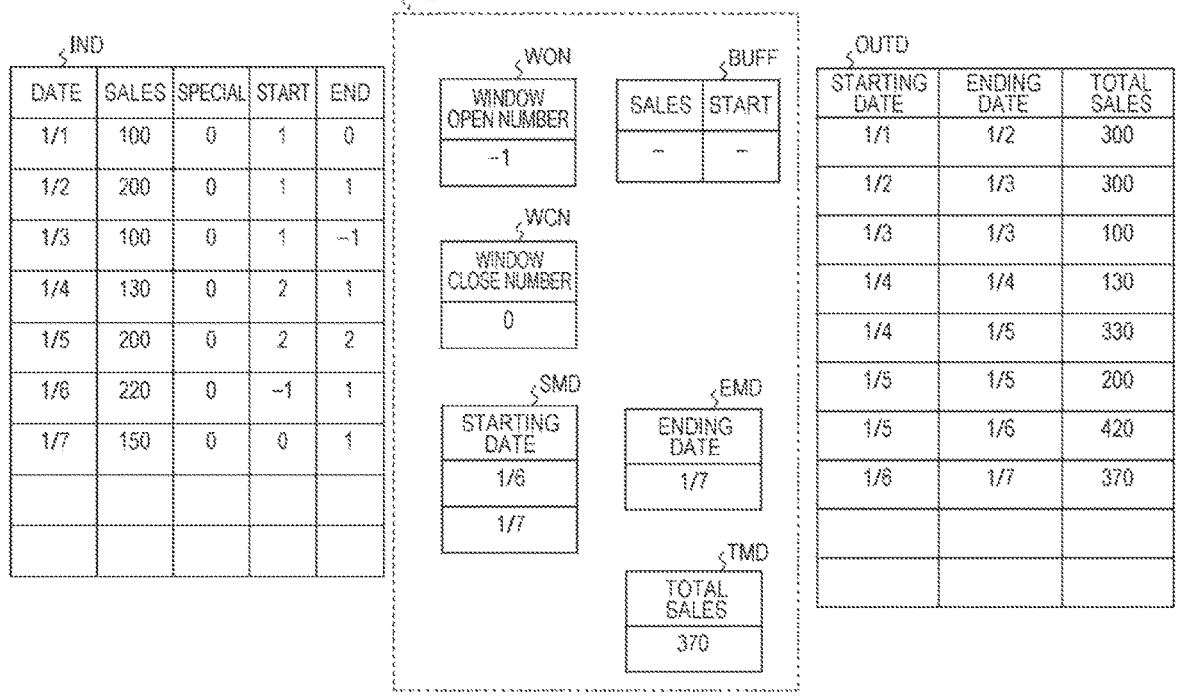
FIG. 38 is a twentieth diagram specifically illustrating data processing according to the present embodiment.

In FIG. 38, the buffer BUFF is empty. Therefore, the window processing unit 13 determines NO in S19, and the processing proceeds to S13.

As illustrated in FIG. 38, the window close number WCN is "0". Therefore, the window processing unit 13 determines as NO in S13. Then, the processing proceeds to record input processing (S1). Before executing the processing in S1, the record input unit 12 deletes the record inputted this time (record of January 7) from the RAM 102.

(Record of January 8th)

The record input unit 12 inputs one record from the processing apparatus MA of FIG. 4 and temporarily stores the input record into the RAM 102 (S1). The input record is a record including the date "January 8", the sales "220", the special flag "1", the window start number (start flag) "−1", and the window end number (end flag) "1".

Figure 39:
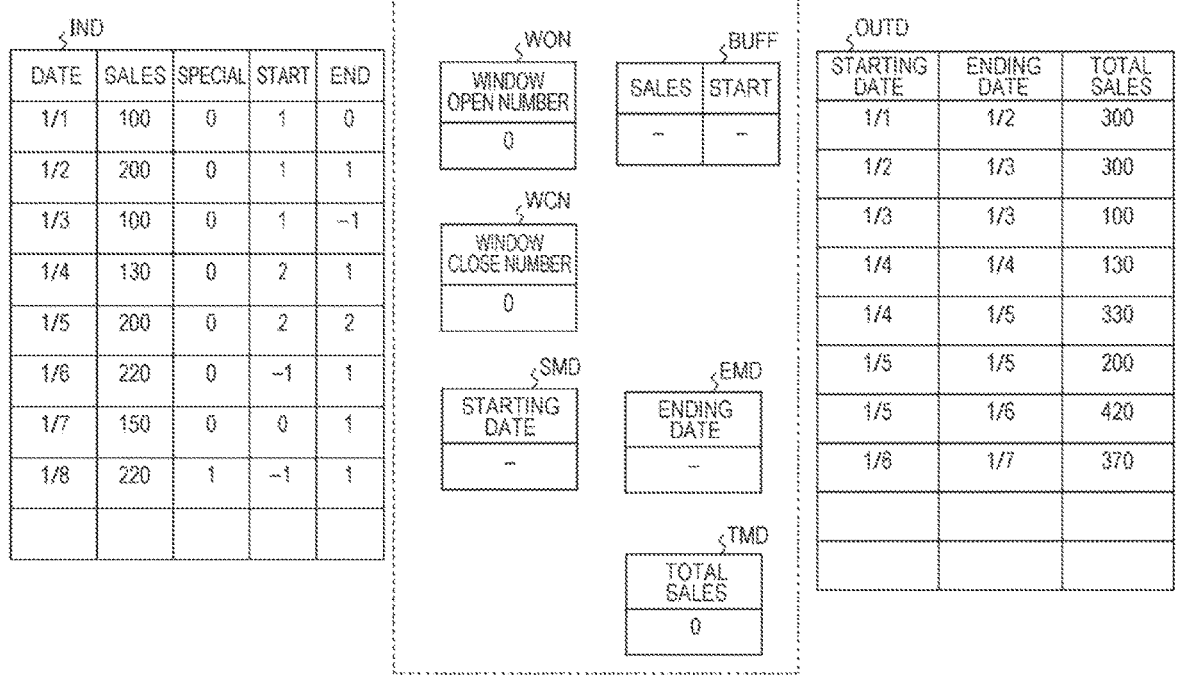
FIG. 39 is a twenty-first diagram specifically illustrating data processing according to the present embodiment.

In the input record table IND of FIG. 39, the sales record of January 8th is shown in the ninth line. Specifically, the ninth line stores "January 8" in the date field, "220" in the sales field, "1" in the special field, "−1" in the start field, and "1" in the end field.

The input record of January 8 includes window reset information (or, special flag "1"). Therefore, as illustrated in FIG. 39, the window processing unit 13 clears (empties) the buffer BUFF, the window open number WON, the window close number WCN, the buffer BUFF, the starting date SMD, the ending date EMD, and the total sales TMD (S5). Next, the processing proceeds to S3. This clearance stops establishment of infinite windows.

The window start number of the input record is "−1". That is, the window start number of the input record is an infinite code.

Therefore, the window processing unit 13 determines YES in S3 and YES in S6. Then, the window processing unit 13 sets the window open number WON to the infinite code ("−1") as illustrated in FIG. 40 (S7).

Figure 40:
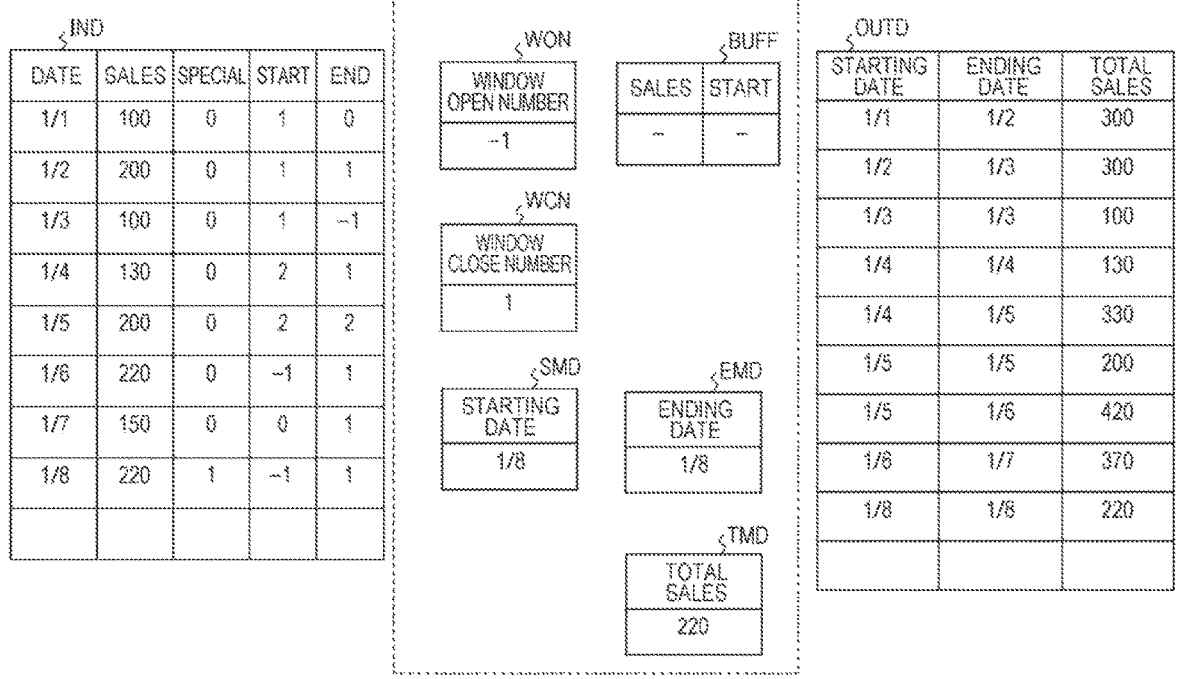
FIG. 40 is a twenty-second diagram specifically illustrating data processing according to the present embodiment.

Reference is made to FIG. 40. In accordance with the query C, the window processing unit 13 additionally stores the starting date "January 8" of the input record of January 8 into the RAM 102 as the starting date SMD, and stores the date "January 8" of the input record into the RAM 102 as the ending date EMD by overwriting (S9). Then, in accordance with the query C, the intermediate data processing unit 14 adds the sales "220" of the input record to the current total sales TMD "0" (see FIG. 39), and stores into the RAM 102 as the total sales TMD "220" (S9).

In FIG. 40, the window open number WON is "−1", which is the infinite code. Therefore, the window processing unit 13 determines NO in S10, and the processing proceeds to S12. The window processing unit 13 sets the window end number "1" of the input record to the window close number WCN as illustrated in FIG. 40 (S12).

Since the window close number WCN is "1" and the window open number WON is "−1", the window processing unit 13 determines as YES in S13.

The intermediate data processing unit 14 generates output data from the intermediate data (starting date SMD "January 8", ending date EMD "January 8", and total sales TMD "220") of the RAM 102, and the data output unit 15 outputs the output data to the terminal apparatus TA (S14). The output data includes the starting date "January 8", the ending date "January 8" and the total sales "220". The output data is shown in the tenth line of the output data table OUTD of FIG. 40. Specifically, in the output data table OUTD of FIG. 40, the tenth line stores "January 8" in the starting date field, "January 8" in the ending date field, and "220" in the total sales field.

As described above, the window start number of the record of January 8 is "−1" (infinite code), and the window end number of the record of January 8 is "1". Therefore, the window processing unit 13 establishes the window start point in the record of January 8 by storing January 8 into the RAM 102 as the starting date SMD. The window processing unit 13 establishes the window end point in the record of January 8 by storing January 8 into the RAM 102 as the ending date EMD. The data output unit 15 outputs start "January 8" and end "January 8" of data processing and the sum "220".

In FIG. 40, the window close number WCN is "1". Therefore, the window processing unit 13 determines as YES in S15, and subtracts one from the window close number WCN "1" (see FIG. 40) to get the window close number WCN "0" as illustrated in FIG. 41 (S16).

In FIG. 40, the window open number WON is "−1". That is, the window open number WON is an infinite code. Therefore, the window processing unit 13 determines NO in S17, and the processing proceeds to S19.

Figure 41:
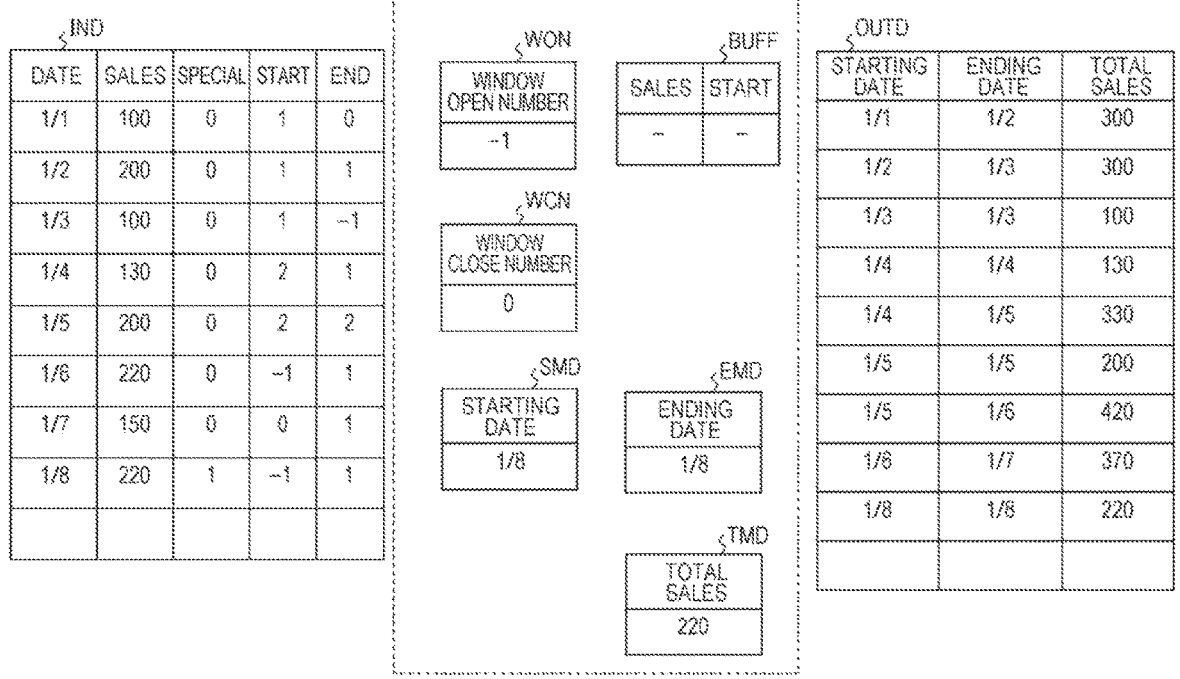
FIG. 41 is a twenty-third diagram specifically illustrating data processing according to the present embodiment.

In FIG. 41, the buffer BUFF is empty. Therefore, the window processing unit 13 determines NO in S19.

In FIG. 41, the window close number WCN is "0". Therefore, the window processing unit 13 determines NO in S13. Then, the processing proceeds to record input processing (S1). Before executing the processing in S1, the record input unit 12 deletes the record inputted this time (record of January 8) from the RAM 102.

(Record of January 9th)

The record input unit 12 inputs one record from the processing apparatus MA of FIG. 4 and temporarily stores the input record into the RAM 102 (S1). The input record is a record including the date "January 9", the sales "180", the special flag "0", the window start number (start flag) "0", and the window end number (end flag) "1".

Figure 42:
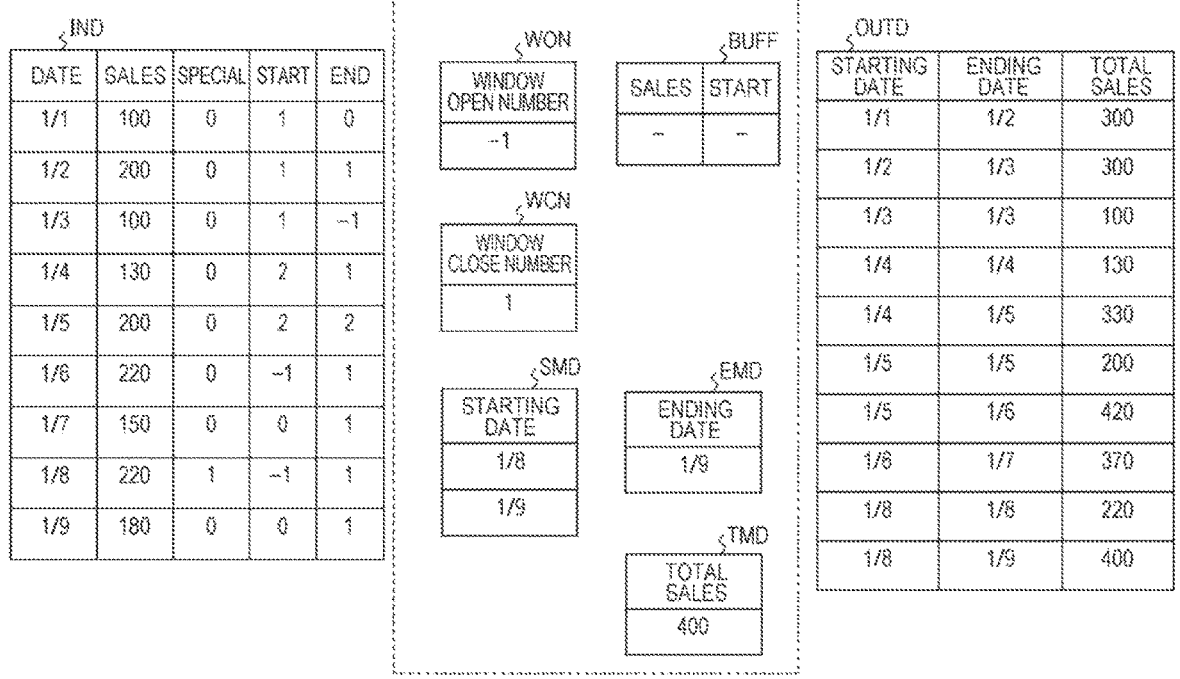
FIG. 42 is a twenty-fourth diagram specifically illustrating data processing according to the present embodiment.

In the input record table IND of FIG. 42, the sales record of January 9th is shown in the tenth line. Specifically, the tenth line stores "January 9" in the date field, "180" in the sales field, "0" in the special field, "0" in the start field, and "1" in the end field. The input record of January 9 does not include window reset information (or, special flag "1"). Then, the window start number of the input record is "0". Then, the window open number WON is "−1".

Therefore, the window processing unit 13 determines NO in S2, NO in S3 and YES in S4, and the processing proceeds to S9.

Reference is made to FIG. 42. In accordance with the query C, the window processing unit 13 additionally stores the starting date "January 9" of the input record of January 9 into the RAM 102 as the starting date SMD, and stores the date "January 9" of the input record into the RAM 102 as the ending date EMD by overwriting (S9). Then, in accordance with the query C, the intermediate data processing unit 14 adds the sales "180" of the input record to the current total sales TMD "220" (see FIG. 41), and stores into the RAM 102 as the total sales TMD "400" (S9).

Figure 43:
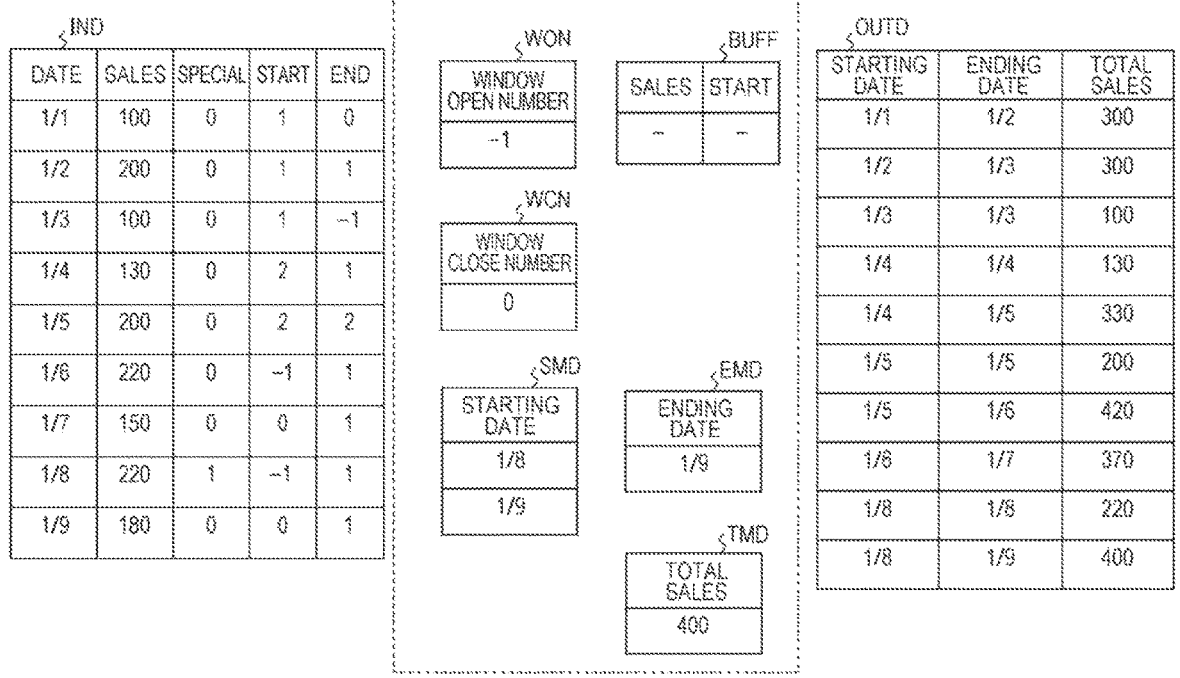
FIG. 43 is a twenty-fifth diagram specifically illustrating data processing according to the present embodiment.

In FIG. 43, the window open number WON is "−1", which is the infinite code. Therefore, the window processing unit 13 determines NO in S10, and the processing proceeds to S12. The window processing unit 13 sets the window end number "0" of the input record to the window close number WCN as illustrated in FIG. 43 (S12).

Since the window close number WCN is "1" and the window open number WON is "−1", the window processing unit 13 determines as YES in S13.

The intermediate data processing unit 14 generates output data from the intermediate data (starting date SMD "January 8", "January 9", ending date EMD "January 9", and total sales TMD "400") of the RAM 102, and the data output unit 15 outputs the output data to the terminal apparatus TA (S14). The output data includes the starting date "January 8", the ending date "January 9" and the total sales "400". The output data is shown in the eleventh line of the output data table OUTD of FIG. 42. Specifically, in the output data table OUTD of FIG. 42, the eleventh line stores "January 8" in the starting date field, "January 9" in the ending date field, and "400" in the total sales field.

As described above, the window start number of the record of January 8 is "−1" (infinite code), the window start number of the record of January 9 is "0", and the window end number of the record of January 9 is "1". Therefore, the window processing unit 13 establishes the window start point in the record of January 8 by storing January 8 into the RAM 102 as the starting date SMD. The window processing unit 13 establishes the window end point in the record of January 9 by storing January 9 into the RAM 102 as the ending date EMD. Then, the intermediate data processing unit 14 calculates the sum "400" of the sales "220" of the record of January 8 and the sales "180" of the record of January 9. The data output unit 15 outputs start "January 8" and end "January 9" of data processing and the sum "400".

In FIG. 42, the window close number WCN is "1". Therefore, the window processing unit 13 determines as YES in S15, and subtracts one from the window close number WCN "1" (see FIG. 42) to get the window close number WCN "0" as illustrated in FIG. 43 (S16).

In FIG. 43, the window open number WON is "−1". That is, the window open number WON is an infinite code. Therefore, the window processing unit 13 determines NO in S17, and the processing proceeds to S19.

In FIG. 43, the buffer BUFF is empty. Therefore, the window processing unit 13 determines NO in S19.

In FIG. 43, the window close number WCN is "0". Therefore, the window processing unit 13 determines as NO in S13. Then, the processing proceeds to record input processing (S1). Before executing the processing in S1, the record input unit 12 deletes the record inputted this time (record of January 9) from the RAM 102. Hereafter, the processing of S1 is executed sequentially.

MODIFIED EXAMPLE

Figure 44:
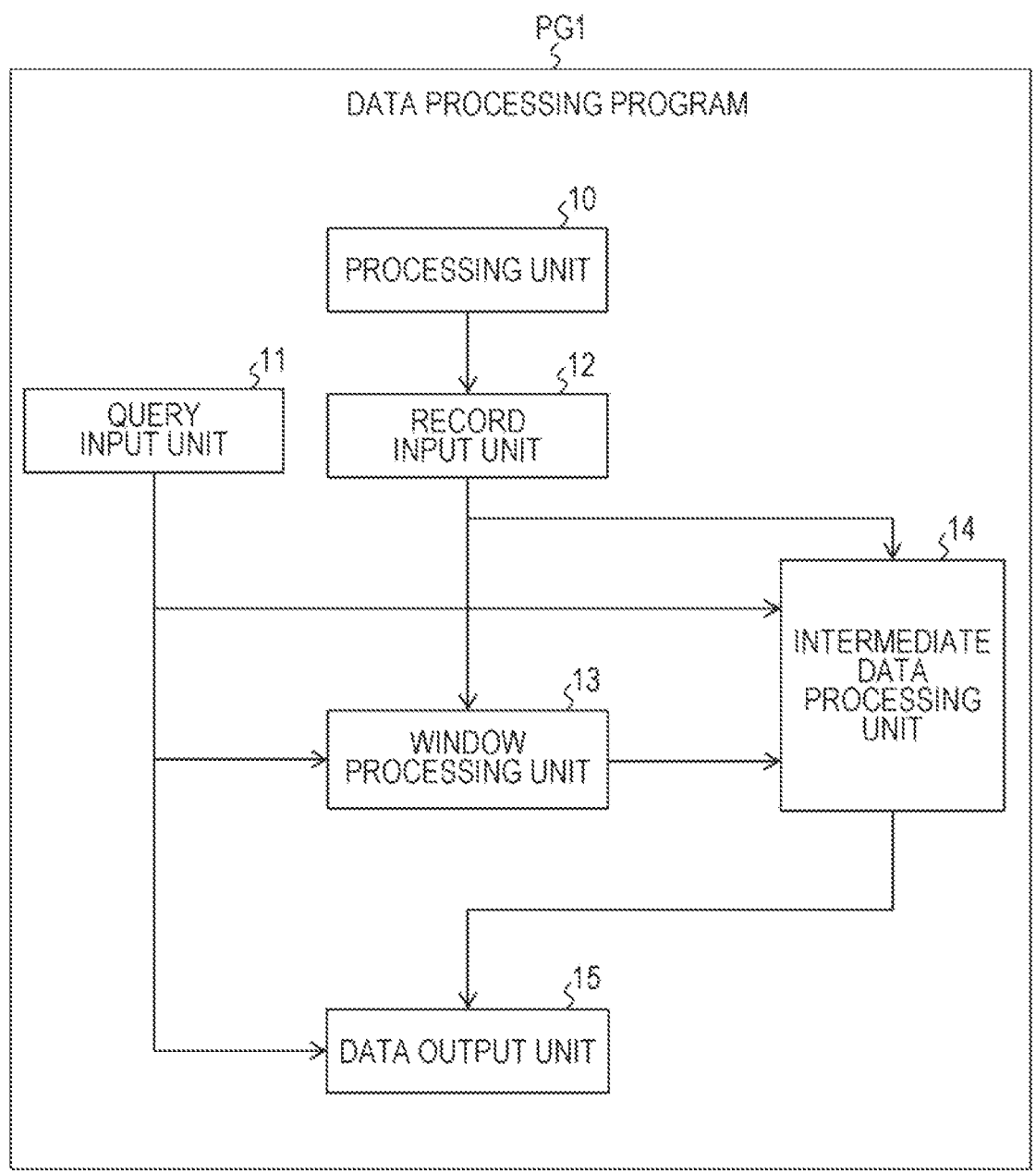
FIG. 44 is another software block diagram of the data processing apparatus DPA of FIG. 4.

FIG. 44 is another software block diagram of the data processing apparatus DPA of FIG. 4. FIG. 44 illustrates a processing unit 10 added to the software block diagram of FIG. 6. The processing unit may be also referred to as an allowance unit. The processing unit 10 includes the same function as the processing program PG2 described with reference to FIG. 7. The processing unit 10 causes the data processing apparatus DPA to implement the function of the processing apparatus MA.

When the data processing apparatus DPA includes the function of the processing unit 10, the data generation apparatus DGA of FIG. 4 outputs various data such as the record to the data processing apparatus DPA without outputting to the processing apparatus MA. In this case, the communication device 104 of the data processing apparatus DPA is communicatable with the data generation apparatus DGA via a network (not shown).

The processing unit 10 of the data processing apparatus DPA processes the record outputted from the data generation apparatus DGA and outputs the processed record (that is, the record into which window information is embedded) to the record input unit 12. The record input unit 12 inputs the record from the processing unit 10.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data processing method comprising:
allowing establishment of a first flag or establishment of a second flag for each of a plurality of items where corresponding values are inputted sequentially;
upon detecting that a value associated with an item where the first flag is established in an Nth place (N is an integer equal to or larger than 1) is inputted and that a value associated with another item where the second flag is established in an Mth place (M is an integer equal to or larger than N) is inputted, executing a predetermined processing of values in at least one processing target data range from the value associated with the item where the first flag is established in the Nth place to the inputted value associated with the other item where the second flag is established in the Mth place, the first and second flags setting the at least one processing target data range; and
executing a processing of outputting a processed result starting from the item in the Nth place, the processing target data range being changeable after the executing the predetermined processing has been started, wherein the first flag indicating a start of a range of items to be subjected to the predetermined processing, the second flag corresponding to the first flag and indicating an end of the at least one processing range, the first flag and the second flag are information indicating a number of data ranges located between the start and the end of the at least one processing range, and
a respective value associated with a respective item, whose respective data ranges include the respective item, is deleted after all the predeterminded processing associated with the data ranges are completed.

2. The data processing method according to claim 1, wherein in the allowing, the establishment of the first flag and the establishment of the second flag to each of the plurality of items are allowed.

3. The data processing method according to claim 1, further comprising:
sequentially inputting values corresponding to the items where the first flag or the second flag is established, wherein
in the detecting,
one or more start points of a quantity of items indicated by the first flag is established in the item in the Nth place where the first flag is established, the one or more start points indicating start of the respective data ranges, and
an end point indicating an end of each of the ranges is established in each of the quantity of items where each second flag is established, the quantity of items being inputted after the item in the Nth place, and
in the execution of the predetermined processing, the predetermined processing is executed to values in a range from where the one or more start points is established to where the end point is established.

4. The data processing method according to claim 3, wherein the first flag indicating that the number of the ranges is infinite, and in the detecting, the start point being infinite is established in the item in the Nth place where the first flag is established, and the end point is established in each of a plurality of items where the second flag is established, the plurality of sterns being inputted after the item in the Nth place.

5. The data processing method according to claim 4, wherein in the allowing, establishment of a third flag indicating stop of establishment of the end point in each of the plurality of items is allowed, and in the detecting, after input of the item where the first flag being information indicating that the number of the ranges is infinite is established is detected, upon detecting input of an item where the third flag is established, establishing the end point in an item inputted after the item where the third flag is established is stopped.

6. The data processing method according to claim 5, wherein in the inputting of the item, the inputted item is stored into a memory, in the execution of the predetermined processing, the processed result of the predetermined processing is stored into the memory, the stored item in the memory is deleted after being processed, and every time the item is inputted, the predetermined processing is executed to the processed result of the predetermined processing stored in the memory and an updated value inputted by associating with the stored item.

7. The data processing method according to claim 1, wherein the information is any of a numeric value, a symbol and a character.

8. A data processing apparatus comprising:
a storage device configured to store a plurality of items where a corresponding value of each item is inputted sequentially; and
a processing device configured to:
upon detecting that a value associated with an item where a first flag is established in an Nth place (N is an integer equal to or larger than 1) and a value associated with another item where a second flag is placed in an Mth place (M is an integer equal to or larger than N), execute a predetermined processing of values in at least one processing target data range from the value associated with the item where the first flag is established in the Nth place to the value associated with the item where the second flag is established in the Mth place, the first and second flags setting the at least one processing target data range, and execute a processing of outputting a processed result starting from the item in the Nth place, the processing target data range being changeable after the execution of the predetermined processing has been started, wherein the first flag indicating a start of a range of items to be subjected to the predetermined processing, the second flag corresponding to the first flag and indicating an end of the at least one processing range, the first flag and the second flag are information indicating a number of data ranges located between the start and the end of the at least one processing range, and a respective value associated with a respective item, whose respective data ranges include the respective item, is deleted after all the predetermined processing associated with the data ranges are completed.

9. A non-transitory and computer-readable recording medium storing a data processing program, the data processing program causing a computer to execute a processing comprising:

allowing establishment of a first flag or establishment of a second flag for each of a plurality of items where corresponding values are inputted sequentially;

upon detecting that a value associated with an item where the first flag is established in an Nth place (N is an integer equal to or larger than 1) is inputted and that a value associated with another item where the second flag is established in an Mth place (M is an integer equal to or larger than N) is inputted, executing a predetermined processing of values in at least one processing target data range from the value associated with the item where the first flag is established in the Nth place to the inputted value associated with the other item where the second flag is established in the Mth place, the first and second flags setting the at least one processing target data range; and executing a processing of outputting a processed result starting from the item in the Nth place, the processing target data range being changeable after the executing the predetermined processing has been started, wherein the first flag indicating a start of a range of items to be subjected to the predetermined processing, the second flag corresponding to the first flag and indicating an end of the at least one processing range, the first flag and the second flag are information indicating a number of data ranges located between the start and the end of the at least one processing range, and a respective value associated with a respective item, whose respective data ranges include the respective item, is deleted after all the predeterminded processing associated with the data ranges are completed.

* * * * *